(12) United States Patent
Conley et al.

(10) Patent No.: US 12,247,134 B2
(45) Date of Patent: Mar. 11, 2025

(54) COATING COMPOSITIONS

(71) Applicant: MATERIA, INC., Pasadena, CA (US)

(72) Inventors: Brian L. Conley, Longmont, CO (US); Shengxi Li, Arcadia, CA (US); Nathan A. Mason, Inglewood, CA (US); Madhura M. Pade, Pasadena, CA (US); Wenliang P. Yang, Ballston Lake, NY (US); John H. Phillips, Los Angeles, CA (US); Brian Edgecombe, Anaheim, CA (US); Kristina Goulinian, Glendale, CA (US); Jenny Parchen, Arcadia, CA (US)

(73) Assignee: MATERIA, INC., Pasadenia, CA (US)

( * ) Notice: Subject to any disclaimer, the term of this patent is extended or adjusted under 35 U.S.C. 154(b) by 811 days.

(21) Appl. No.: 17/311,495

(22) PCT Filed: Dec. 13, 2019

(86) PCT No.: PCT/US2019/066239
§ 371 (c)(1),
(2) Date: Jun. 7, 2021

(87) PCT Pub. No.: WO2020/123946
PCT Pub. Date: Jun. 18, 2020

(65) Prior Publication Data
US 2022/0127491 A1 Apr. 28, 2022

Related U.S. Application Data

(60) Provisional application No. 62/845,052, filed on May 8, 2019, provisional application No. 62/778,901, filed on Dec. 13, 2018.

(51) Int. Cl.
| | | |
|---|---|---|
| C09D 165/00 | (2006.01) | |
| C08G 61/02 | (2006.01) | |
| C08K 3/013 | (2018.01) | |
| C09D 5/08 | (2006.01) | |

(52) U.S. Cl.
CPC ........... *C09D 165/00* (2013.01); *C08G 61/02* (2013.01); *C08K 3/013* (2018.01); *C09D 5/08* (2013.01); *C08G 2150/90* (2013.01); *C08G 2261/3325* (2013.01); *C08G 2261/418* (2013.01)

(58) Field of Classification Search
CPC ........ C09D 165/00; C09D 5/08; C09D 5/086; C09D 7/40; C09D 7/60; C09D 7/61; C08G 61/02; C08G 2150/90; C08G 2261/3325; C08G 2261/418; C08G 2261/14; C08G 2261/141; C08G 2261/1422; C08G 2261/143; C08G 2261/144; C08G 2261/146; C08G 2261/33; C08G 2261/3324; C08G 2261/58; C08G 61/08; C08K 3/013; C08J 7/04; C08J 2323/00; C08L 65/00; B29B 15/12

See application file for complete search history.

(56) References Cited

U.S. PATENT DOCUMENTS

| | | | |
|---|---|---|---|
| 6,962,729 | B2 | 11/2005 | Tokas et al. |
| 7,001,590 | B1 | 2/2006 | Angeletakis |
| 9,207,418 | B2 | 12/2015 | Chen et al. |
| 10,364,340 | B2 | 7/2019 | Pfaendner |
| 2004/0001961 | A1 | 1/2004 | Ono et al. |
| 2009/0156735 | A1 | 6/2009 | Keoniger et al. |
| 2012/0075560 | A1 | 3/2012 | Yoo et al. |
| 2015/0152283 | A1 | 6/2015 | Stephen et al. |
| 2018/0237581 | A1 | 8/2018 | Stephen et al. |

FOREIGN PATENT DOCUMENTS

| | | | |
|---|---|---|---|
| CN | 103038686 | A | 4/2013 |
| CN | 103788571 | A * | 5/2014 |
| CN | 104312235 | A * | 1/2015 |
| CN | 107001698 | A | 8/2017 |
| EP | 1652885 | A1 | 5/2006 |
| EP | 2721106 | A2 | 4/2014 |
| JP | 2001002762 | A | 1/2001 |
| JP | 2004027145 | A | 1/2004 |
| JP | 2014193533 | A | 10/2014 |
| JP | 2014193947 | A | 10/2014 |
| JP | 2017219734 | A | 12/2017 |
| WO | 2011161812 | A1 | 12/2011 |
| WO | WO-2012174502 | A2 * | 12/2012 |

OTHER PUBLICATIONS

Extended European Search Report in European Application No. 19896299. Dated Aug. 10, 2022.
International Search Report and Written Opinion in International Application No. PCT/US2019/066239, dated Feb. 5, 2020.

* cited by examiner

*Primary Examiner* — Anthony J Green
(74) *Attorney, Agent, or Firm* — RAPHAEL BELLUM PLLC

(57) ABSTRACT

This invention relates to compositions suitable for use as coatings. More particularly, this invention relates to compositions suitable for use as industrial coatings such as anti-corrosion coatings, protective coatings and adhesive coatings. This invention relates to compositions and methods for coating substrates. More particularly, the invention relates to coating compositions and methods for coating substrates, where the coating compositions comprise polymerized olefins and cyclic olefins, via different chemical transformations. The invention also relates to methods of applying the coatings to the substrates.

24 Claims, No Drawings

COATING COMPOSITIONS

CROSS-REFERENCE TO RELATED APPLICATIONS

This application claims priority to US patent application 62/778,901, filed Dec. 13, 2018, and to U.S. patent application 62/845,052, filed May 8, 2019; the disclosures of which are incorporated herein by reference.

TECHNICAL FIELD

This invention relates to compositions suitable for use as coatings. More particularly, this invention relates to compositions suitable for use as industrial coatings such as anti-corrosion coatings and protective coatings. This invention relates to compositions and methods for coating substrates. More particularly, the invention relates to coating compositions and methods for coating substrates, where the coating compositions comprise polymerized olefins and cyclic olefins, via different chemical transformations. The invention also relates to methods of applying the coatings to the substrates.

The coating compositions of the invention may be utilized for a wide range of substrates especially ones used in petrochemical and chemical production operations. The invention has utility in the fields of polymers, materials, and manufacture.

BACKGROUND

Materials deteriorate from interaction with the environment by mechanisms including corrosion, erosion and other processes. Protective coatings can provide protection against surface property deterioration of a wide range of substrates. The protective coating can protect metal substrates from corrosion, protect polymer and composite substrates against deterioration due to ice, acid rain, salt water, weathering and UV, protect wood, concrete, brick substrates against deterioration due to moisture ingression and degradation.

According to the National Association of Corrosion Engineers International, corrosion is a naturally occurring phenomenon commonly defined as the deterioration of a material (usually a metal) that results from a chemical or electrochemical reaction with its environment. Corrosion causes severe damage and it is very costly to repair. Protective coatings are an effective way to provide protection against corrosion. Corrosion of metals occurs through either chemical or electrochemical reactions. Electrochemical corrosion is the most common form of metal corrosion. For metals such as iron and/or steel, corrosion happens when they come in contact with oxygen and moisture (e.g., humidity, vapour, immersion), and rust begins to form.

Exposure to water (e.g., ground water, sea water, atmospheric water, etc.), corrosive chemicals, ultraviolet radiation, ozone, and other harmful factors can cause the unprotected surfaces of objects such as, for example, automobiles, buses, boats, trains, other vehicles, aircrafts, bridges, signage, buildings, sidewalks, roads, subterranean pipelines and equipment, and petrochemical and chemical production equipment, to suffer from changes in quality over time leading to deterioration or failure of the object.

Corrosion is so widespread and so costly to repair, it is recommended to take effective precautionary measures when it comes to corrosion prevention.

One of the best ways to prevent corrosion is to apply a protective coating. Such a protective coating protects its substrate by preventing contact between the substrate and harsh environments (atmospheric, chemical, etc.).

Therefore, over the years there has been an ongoing need for coating compositions (e.g., anti-corrosion coating compositions) which provide surface protection to objects from corrosive materials or damaging environmental conditions.

Most pipes and pipelines used in petrochemical and chemical production operations are constructed of metal, typically some grade of steel, and many are jacketed in insulation. If during installation of the pipe or pipeline the insulation material covering the pipe or pipeline becomes damaged or degrades over time, the underlying surface of the pipe or pipeline is now at risk of being in direct contact with the atmospheric environment, which may lead to a host of problems including premature failure of the pipe or pipeline resulting in increased repair and/or replacement costs.

Therefore, there is a need for an underlying coating applied to the pipe or pipeline surface, between the pipe or pipeline surface and the insulation material, which will act as an anti-corrosion barrier in case the insulation material is damaged or degrades. This need has led to the introduction of a number of coating compositions for the purpose of protecting steel pipelines and structures.

Epoxy, polyamide and polyurethane based coating compositions have been used extensively to prevent corrosion of steel pipelines and structures.

The industry has relied on 2K epoxies, however, liquid 2-part epoxies typically require long cure cycles and are not as conducive to rapid coating operations that facilitate manufacturing.

Despite advances achieved in the art in the area of coating compositions, particularly anti-corrosion coating compositions for coating pipelines and structures, a continuing need exists for further improvements.

BRIEF SUMMARY OF THE DISCLOSURE

The present invention is directed to addressing one or more of the aforementioned concerns and relates to coating compositions and methods for coating substrates with the coating compositions of the invention. The coating compositions of the invention may be used for a variety of purposes, including without limitation, decoration; improving the barrier properties of packaging; protection of substrate materials which can be: metals such as steel, stainless steel, aluminum, copper, iron, nickel, titanium, silver, or nonmetals such as glass, concrete, ceramics, porcelain, brick, stone, plastics, rubber, wood, cloth, fabrics, or composites such as reinforced plastics, electronic assemblies; and/or protection of substrate surfaces from time wise changes in quality, or deterioration, due to environmental exposure. In other words, coating compositions of the invention may be applied to substrate surfaces to provide protection, including anti-corrosion protection, against deterioration of the substrate material and/or substrate surface due to environmental exposure.

Coating compositions of the invention may also be used as adhesives.

In particular, the present invention provides coating compositions for coating pipes, pipelines, and structures used in petrochemical and chemical production operations to provide an anti-corrosion barrier against deterioration of the underlying pipe, pipeline, equipment, structure, or object due to environmental exposure and other corrosive materials. The coatings of the invention provide a constant protective lining that helps save pipes from the damaging effects of corrosion. Pipeline coating is one of the most reliable corrosion prevention methods used by industries today.

The coating compositions of the invention offer several advantages over the prior art materials used for providing a protective coating on pipes, pipelines, equipment, structures, and objects used in petrochemical and chemical production operations.

In particular, coating compositions of the invention may be formulated to meet a wide variety of application conditions and needs.

As an example of one advantage, the coating compositions of the invention are designed to provide long term corrosion inhibition by serving as an impermeable barrier to oxygen, water, ions, etc. The coating compositions of the invention are not porous. The coating compositions of the invention can be applied and cured in high humidity conditions and at colder temperatures than common coatings.

As an example of another advantage, the coating compositions of the invention can be formulated to have a wide range of tunable cure times.

For example, the coating compositions of the invention may be formulated to cure quickly ("fast cure") so that they dry to the touch rapidly after being applied to the substrate surface. A fast-cure coating composition of the invention has rapid dry to touch time of less than 20 minutes, preferably less than 10 minutes and more preferably less than 1 minute, even within seconds of being applied to a surface. An article coated with a fast-cure composition of the invention is handleable and has a durable coating in less than 60 minutes, preferably less than 30 minutes and more preferably in 10 minutes or less after application. In comparison, liquid epoxies typically take many hours to cure.

As an example of another advantage, the coating compositions of the invention are solvent free.

As an example of another advantage, the coating compositions of the invention are resistant to cracking and delamination in hot/wet aqueous environments.

The coating compositions of the invention can be prepared by different chemical transformations and can be processed by a variety of methods.

In one embodiment, the invention provides coating compositions cured by ring opening metathesis polymerization (ROMP) comprising reacting at least one cyclic olefin with at least one metal carbene olefin metathesis catalyst.

The coating compositions of the invention may also be cured by vinyl/addition copolymerization of cyclic olefins, optionally with at least one linear olefin, with at least one organometallic catalyst (Progress in Polymer Science 84 (2018) 1-46, Coordination Chemistry Reviews 253 (2009) 827-861). The organometallic complexes suitable for such vinyl/addition polymerization of the cyclic olefins of the invention are comprised of a transition metal, generally a late transition metal, typically palladium or nickel, ligated by monodentate or chelating nitrogen, oxygen, or phosphorous ligands. These complexes may be activated by a cocatalyst such as methylaluminoxane (MAO), tris(pentafluorophenyl)borane, or other Lewis acids.

Alternatively, the coating compositions of the invention may also be cured by free radical polymerization (The Journal of American Science, 4(1), 2008, 1545-1003). Initiators suitable for such radical addition polymerization of the cyclic olefins of the invention are azo compounds including azobisisobutyronitrile (AIBN), organic hydroperoxides including tert-butyl hydroperoxide and cumene hydroperoxide, organic diperoxides including benzoyl peroxide and tert-butyl peroxide, alkoxyamines including (2,2,6,6-tetramethylpiperidin-1-yl)oxyl (TEMPO) and N-tert-Butyl-N-(2-methyl-1-phenylpropyl)-O-(1-phenylethyl) hydroxylamine, and boron amine complexes such as triethylborane-1,3-diaminopropane complex and tri-n-butylborane-3-methoxy-1-propylamine complex. Radical cation initiators may also be employed, including hypervalent iodine activators such as diaryliodonium salts and (diacetoxyiodo)benzene.

In another embodiment, the coating compositions of the invention may be cured by cationic polymerization (Macromolecules 47 (2014) 5470-5483) of at least one cyclic olefin, optionally with at least one linear olefin, with at least one radical or cationic initiator. The activators suitable for such cationic polymerization of the cyclic olefins of the invention are Lewis acids including boron trifluoride, aluminum trichloride, titanium tetrachloride, and tin tetrachloride, optionally activated by an initiator including water, hydrogen chloride, and octanoic acid. Organometallic catalysts suitable for promoting cationic polymerization of the monomers of the invention are metallocene catalysts including $Cp^*TiCl_3$ and $Cp_2AlMe$ activated by Lewis acids including tris(pentafluorophenyl)borane.

A coating composition of the invention may comprise, consist essentially of, or consist of at least one cyclic olefin selected from the group consisting of Formulae (I), (II), and (III); optionally at least one linear olefin of Formula (IV); at least one coating additive; and at least one curing agent selected from an organometallic complex, a free radical initiator and a cationic initiator, preferably at least one metal carbene metathesis catalyst curing agent. The cyclic olefin of Formulae (I), (II), and (III), and the linear olefin of Formula (IV) have the following structures:

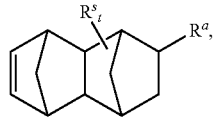

Formula (I)

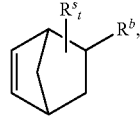

Formula (II)

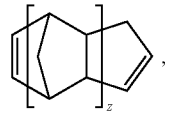

Formula (III)

Formula (IV)

The cyclic olefins of Formulae (I), (II), and (III), and the linear olefins of Formula (IV) are described below.

The invention also provides a method for coating a substrate material, comprising the steps of optionally applying an adhesion promoter onto the substrate surface; applying onto the substrate surface a coating composition comprising, consisting essentially of or consisting of at least one cyclic olefin selected from the group consisting of Formulae (I), (II), and (III); optionally at least one linear olefin of Formula (IV); at least one coating additive; and at least one curing agent selected from an organometallic complex, a free radical initiator and a cationic initiator, preferably at least one metal carbene metathesis catalyst curing agent; and curing the coating applied on the substrate surface.

The invention further relates to articles of manufacture produced by a method of the invention. An article of manufacture of the invention has a substrate coated with a cured coating composition of the invention.

DETAILED DESCRIPTION OF THE DISCLOSURE

Terminology and Definitions

Unless otherwise indicated, the invention is not limited to specific reactants, substituents, catalysts, metal carbene olefin metathesis catalysts, catalyst compositions, olefins, cyclic olefin compositions, coating compositions, reaction conditions, or the like, as such may vary. It is also to be understood that the terminology used herein is for the purpose of describing particular embodiments only and is not to be interpreted as being limiting.

In this specification and in the claims that follow, reference will be made to a number of terms, which shall be defined to have the meanings as described herein.

The term "alkyl" as used herein, refers to a linear, branched, saturated hydrocarbon group typically containing 1 to 24 carbon atoms, preferably 1 to 12 carbon atoms, more preferably 1 to 6 carbon atoms: such as methyl (Me), ethyl (Et), n-propyl (Pr or n-Pr), iso-propyl (i-Pr), n-butyl (Bu or n-Bu), iso-butyl (i-Bu), tert-butyl (t-Bu), octyl (Oct), decyl, and the like.

The term "cycloalkyl" refers to a cyclic alkyl group, can be monocyclic, bicyclic or polycyclic, typically having 3 to 10, preferably 5 to 7, carbon atoms, generally, cycloalkyl groups are cyclopentyl (Cp), cyclohexyl (Cy), adamantyl.

The term "substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkylene" as used herein refers to a difunctional linear, branched alkyl group, where "alkyl" is as defined above.

The term "alkenyl" as used herein refers to a linear, branched hydrocarbon group of 2 to 24 carbon atoms containing at least one double bond, such as ethenyl, n-propenyl, iso-propenyl, n-butenyl, iso-butenyl, octenyl, decenyl, tetradecenyl, hexadecenyl, and the like. Preferred alkenyl groups herein contain 2 to 12 carbon atoms, more preferred alkenyl groups herein contain 2 to 6 carbon atoms.

The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "cycloalkenyl" refers to a cyclic alkenyl group, preferably having 3 to 12 carbon atoms.

The term "alkenylene" as used herein refers to a difunctional linear, branched, where "alkenyl" is as defined above.

The term "alkynyl" as used herein refers to a linear or branched hydrocarbon group of 2 to 24 carbon atoms containing at least one triple bond, such as ethynyl, n-propynyl, and the like. Preferred alkynyl groups herein contain 2 to 12 carbon atoms, more preferred alkynyl groups herein contain 2 to 6 carbon atoms.

The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkynylene" as used herein refers to a difunctional alkynyl group, where "alkynyl" is as defined above.

The term "alkoxy" as used herein refers to an alkyl group bound through a single, terminal ether linkage; that is, an "alkoxy" group may be represented as —O-alkyl where "alkyl" is as defined above. Analogously, "alkenyloxy" refer to an alkenyl group bound through a single, terminal ether linkage, and "alkynyloxy" refers to an alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 6 to 10 carbon atoms. Exemplary aryl groups contain one aromatic ring or two fused or linked aromatic rings, e.g., phenyl (Ph), naphthyl, biphenyl, diphenylether, diphenylamine, benzophenone, phenanthryl and the like.

"Substituted aryl" refers to an aryl moiety substituted with one or more substituent groups, and the terms "heteroatom containing aryl" and "heteroaryl" refer to aryl substituents in which at least one carbon atom is replaced with a heteroatom, as will be described in further detail herein.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 6 to 10 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like.

The terms "alkaryloxy" and "aralkyloxy" refer to substituents of the formula —OR wherein R is alkaryl or aralkyl, respectively, as defined herein.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, or —(CO)-alkynyl wherein "alkyl," "aryl," "aralkyl," "alkaryl," "alkenyl," and "alkynyl" are as defined above. The acetoxy group (—O(CO)CH$_3$, often abbreviated as -OAc) is a common example of an acyloxy group.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "polycyclic ring" refers to alicyclic or aromatic groups that may or may not be substituted and/or heteroatom containing, and that have at least two closed rings tethered, fused, linked via a single bond or bridged. Polycyclic rings include without limitation naphthyl, biphenyl, phenanthryl and the like.

The term "spiro compound" refers to a chemical compound, that presents a twisted structure of two or more rings (a ring system), in which 2 or 3 rings are linked together by one common atom.

The terms "halo" and "halogen" and "halide" are used in the conventional sense to refer to a fluorine (F), chlorine (Cl), bromine (Br), or iodine (I) substituent.

"Hydrocarbyl" refers to univalent hydrocarbyl moieties containing 1 to 24 carbon atoms, preferably 1 to 12 carbon atoms, including linear, branched, cyclic, saturated and unsaturated species, such as alkyl groups, alkenyl groups, alkynyl groups, aryl groups, and the like. "Substituted hydrocarbyl" refers to hydrocarbyl substituted with one or more substituent groups.

"Hydrocarbylene" refers to divalent hydrocarbyl moieties containing 1 to 24 carbon atoms, preferably 1 to 12 carbon atoms, including linear, branched, cyclic, saturated and unsaturated species, formed by removal of two hydrogens from a hydrocarbon. "Substituted hydrocarbylene" refers to hydrocarbylene substituted with one or more substituent groups.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. The term "heteroatom-containing hydrocarbylene" and "heterohydrocarbylene" refer to hydrocarbylene in which at least one carbon atom is replaced with a heteroatom. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

In addition, the aforementioned substituent groups may, if a particular group permits, be further substituted with one or more additional substituent groups or with one or more hydrocarbyl moieties such as those specifically enumerated above. Analogously, the above mentioned hydrocarbyl moieties may be further substituted with one or more substituent groups or additional hydrocarbyl moieties such as those specifically mentioned above. Analogously, the above-mentioned hydrocarbylene moieties may be further substituted with one or more substituent groups or additional hydrocarbyl moieties as noted above.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO—X where X is halo), $C_2$-$C_{24}$ alkylcarbonato (—O—(CO)—O-alkyl), $C_6$-$C_{24}$ arylcarbonato (—O—(CO)—O-aryl), carboxylic acid (—COOH), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), N($C_1$-$C_{24}$ alkyl)($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), N($C_1$-$C_{24}$ alkyl)($C_5$-$C_{24}$ aryl)-substituted thiocarbamoyl (—(CS)—N($C_1$-$C_{24}$ alkyl)($C_5$-$C_{24}$ aryl), —C(O)—NH(alkyl) optionally substituted with a silyl group, —C(O)—N(alkyl)$_2$ optionally substituted with a silyl group, carbamido (—NH—(CO)—NH$_2$), cyano (—C≡N), cyanato (—O—C≡N), thiocyanato (—S—C≡N), isocyanate (—NCO), thioisocyanate (—NCS), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino ((—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CRNH where, R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CRN(alkyl), where R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), arylimino (—CRN(aryl), where R includes without limitation H, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—S(O)$_2$OH), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl (—SO$_2$—N(H) alkyl), $C_1$-$C_{24}$ dialkylaminosulfonyl (—SO$_2$—N(alkyl)$_2$), $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phospho (—PO$_2$), phosphino (—PH$_2$), silyl (—SiR$_3$ wherein R is H, hydrocarbyl or $C_1$-$C_6$ alkoxy), and silyloxy (—O-silyl); hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_6$-$C_{10}$ aryl), $C_6$-$C_{24}$ alkaryl (preferably $C_6$-$C_{16}$ alkaryl), or $C_6$-$C_{24}$ aralkyl (preferably $C_6$-$C_{16}$ aralkyl). The hydrocarbyl, alkyl and aryl groups in the above moieties may themselves be substituted.

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one H atom bound to a carbon (or other) atom is replaced with one or more functional group(s) such as those described hereinabove. The term "functional group" is meant to include any functional species that is suitable for the uses described herein. In some cases, the terms "substituent" and "functional group" are used interchangeably.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and thus, the description includes structures wherein a non-hydrogen substituent is present and structures wherein a non-hydrogen substituent is not present.

The term "nil" as used herein, means absent or nonexistent.

The term "sulfhydryl" as used herein, represents a group of formula "—SH."

The term "hydroxyl" as used herein, represents a group of formula "—OH."

The term "carbonyl" as used herein, represents a group of formula "—C(O)—."

The term "ketone" as used herein, represents an organic compound having a carbonyl group linked to a carbon atom such as —C(O)$R^{x1}$, wherein $R^{x1}$, can be alkyl, aryl, cycloalkyl, cycloalkenyl, heterocycle as defined above.

The term "ester" as used herein, represents an organic compound having a carbonyl group linked to a carbon atom such as —C(O)O$R^{x1}$ wherein $R^{x1}$ can be alkyl, aryl, cycloalkyl, cycloalkenyl, heterocycle as defined above.

The term "amine" as used herein, represents a group of formula "—N$R^x R^y$," wherein R and $R^y$ can be the same or independently H, alkyl, aryl, cycloalkyl, cycloalkenyl, heterocycle as defined above.

The term "carboxyl" as used herein, represents a group of formula "—C(O)O—."

The term "sulfonyl" as used herein, represents a group of formula "—$SO_2^-$."

The term "sulfate" as used herein, represents a group of formula "—O—S(O)$_2$—O—."

The term "sulfonate" as used herein, represents a group of the formula "—S(O)$_2$—O—."

The term "amide" as used herein, represents a group of formula "—C(O)N$R^x R^y$," wherein $R^x$ and $R^y$ can be the same or independently H, alkyl, aryl, cycloalkyl, cycloalkenyl, heterocycle as defined above.

The term "sulfonamide" as used herein, represents a group of formula "—S(O)$_2$N$R^x R^y$" wherein $R^x$ and $R^y$ can be the same or independently H, alkyl, aryl, cycloalkyl, cycloalkenyl, heterocycle as defined above.

The term "sulfoxide" as used herein, represents a group of formula "—S(O)—."

The term "phosphonic acid" as used herein, represents a group of formula "—P(O)(OH)$_2$."

The term "phosphonate ester" as used herein, represents a group of formula "—P(O)(O$R^{x1}$)$_2$," wherein $R^{x1}$ can be alkyl, aryl, cycloalkyl, cycloalkenyl, heterocycle as defined above.

The term "phosphoric acid" as used herein, represents a group of formula "—OP(O)(OH)$_2$."

The term "phosphate ester" as used herein, represents a group of formula "—OP(O)(O$R^{x1}$)$_2$," wherein $R^{x1}$ can be alkyl, aryl, cycloalkyl, cycloalkenyl, heterocycle as defined above.

The term "sulphonic acid" as used herein, represents a group of formula "—S(O)$_2$OH."

The formula "H" as used herein, represents a hydrogen atom.

The formula "O" as used herein, represents an oxygen atom.

The formula "N" as used herein, represents a nitrogen atom.

The formula "S" as used herein, represents a sulfur atom.

Functional groups may be protected in cases where the functional group interferes with the metal carbene olefin metathesis catalyst, and any of the protecting groups commonly used in the art may be employed. Acceptable protecting groups may be found, for example, in Greene et al., *Protective Groups in Organic Synthesis,* 5th Ed. (New York: Wiley, 2014). Examples of protecting groups include acetals, cyclic acetals, boronate esters (boronates), cyclic boronate esters (cyclic boronates), carbonates, or the like. Examples of protecting groups include cyclic acetals or cyclic boronate esters.

The terms "coating" as used herein, refers to a substance temporarily or permanently applied to a surface or substrate for decorative purpose, to impart a function on a surface or substrate such as electrical passivity or conductivity, or to protect the surface or substrate from deterioration or degradation as a result of its reaction with the environment or corrosive agents. In particular, the coatings in this invention are suitable for industrial coatings such as protective coatings and particularly anti-corrosion coatings. Coatings may be applied as liquids, gases (vapor deposition) or solids.

The term "adhesive" or "adhesive coating composition" as used herein refers to a substance applied between two substrates to create a bond or joint.

The term "adhesion promoter" as used herein, refers to an additive or a primer which promotes adhesion of coatings to the substrate of interest. An adhesion promoter usually has an affinity for the substrate and the applied coating.

The term "dispersant" as used herein, refers to agents able to prevent settling or clump and is used interchangeably with "dispersing agent."

The term "antioxidant" is used herein interchangeably with the terms "antiozonant" and is one type of a"stabilizer."

The term "substrate(s)" in the context of the invention refers to an object or a surface of an object upon which property deterioration or corrosion can occur, the surface of which can be protected by a coating. Substrates can be metals such as steel, stainless steel, aluminum, copper, alloys or nonmetals such as glass, concrete, ceramics, porcelain, brick, plastics, rubber, wood, cloth, fabrics, or composites such as reinforced plastics, electronic assemblies, etc.

The term "substrate material(s)" as used herein, refers to the material(s) of construction of a substrate.

Cyclic Olefin Monomers

In general, any cyclic olefin suitable for the reactions disclosed herein may be used, in the present invention. Such cyclic olefins may be optionally substituted, optionally heteroatom-containing, mono-unsaturated, di-unsaturated, or poly-unsaturated $C_5$ to $C_{24}$ hydrocarbons, that may be mono-, di-, or poly-cyclic. When the cyclic olefin comprises more than one ring, the rings may or may not be fused.

The cyclic olefin may generally be any strained or unstrained cyclic olefin, provided the cyclic olefin is able to participate in a polymerization reaction either individually or as part of a cyclic olefin composition.

In one embodiment of the invention, the cyclic olefin is represented by the structure of Formula (I):

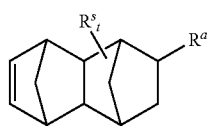

Formula (I)

wherein:
$R^a$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, —CN, —NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, an optionally substituted spiro heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR$^o$R$^p$, —C(R$^h$)(R$^i$)C(O)NR$^o$OR$^n$;

each $R^s$ is independently optionally substituted linear or branched $C_{1-24}$ alkyl, optionally substituted linear or branched $C_{2-24}$ alkenyl, halogen, —C(O)R$^f$, —CH$_2$—C(O)R$^f$, —OR$^g$, —CH$_2$—OR$^g$, —CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR$^o$R$^p$, —C(R$^h$)(R$^i$)C(O)NR$^o$OR$^n$;

t is 0, 1, 2, 3, 4, 5 or 6;

$R^f$ is OH, OR$^k$, NR$^g$R$^h$, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^k$ is optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl; and $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl.

In one embodiment of the invention, the cyclic olefin is represented by Formula (I) wherein:

$R^a$ is H, optionally substituted linear or branched $C_{1-12}$ alkyl, optionally substituted linear or branched $C_{2-12}$ alkenyl, halogen, —C(O)R$^f$, —CH$_2$—C(O)R$^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), an optionally substituted spiro heterocycle, optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR$^o$R$^p$, —C(R$^h$)(R$^i$)C(O)NR$^o$OR$^n$;

each $R^s$ is independently optionally substituted linear or branched $C_{1-12}$ alkyl, optionally substituted linear or branched $C_{2-12}$ alkenyl, halogen, —C(O)R$^f$, —CH$_2$—C(O)R$^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$ (OR$^m$)(OR$^n$), —C(R$^h$)(R$^i$)C(O)NR$^o$R$^p$, —C(R$^h$)(R$^i$)C(O)NR$^o$OR$^n$;

t is 0, 1, 2, 3 or 4;

R$^f$ is OH, OR$^k$, NR$^g$R$^h$, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^g$ is H, optionally substituted linear or branched C$_{1-12}$ alkyl, optionally substituted C$_{5-7}$ cycloalkyl, optionally substituted heterocycle, optionally substituted C$_{6-10}$ aryl, optionally substituted linear or branched C$_{2-12}$ alkenyl, —C(O)-(optionally substituted C$_{6-10}$ aryl), —C(O)-(optionally substituted linear or branched C$_{2-12}$ alkenyl), or optionally substituted C$_{5-12}$ cycloalkenyl;

R$^h$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^i$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^j$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^k$ is optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^l$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^m$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^n$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^o$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl; and R$^p$ is H, optionally substituted linear or branched C$_{1-12}$ alkyl, optionally substituted C$_{5-7}$ cycloalkyl, optionally substituted heterocycle, optionally substituted C$_{6-10}$ aryl or optionally substituted C$_{5-12}$ cycloalkenyl.

In one embodiment of the invention, the cyclic olefin is represented by Formula (I) wherein:

R$^a$ is H, optionally substituted linear or branched C$_{1-6}$ alkyl, optionally substituted linear or branched C$_{2-6}$ alkenyl, halogen, —C(O)R$^f$, —CH$_2$—C(O)R$^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, an optionally substituted spiro heterocycle, —CH$_2$-(optionally substituted heterocycle), optionally substituted C$_{5-7}$ cycloalkyl, —CH$_2$-(optionally substituted C$_{5-7}$ cycloalkyl), optionally substituted C$_{6-10}$ aryl, —CH$_2$-(optionally substituted C$_{6-10}$ aryl), optionally substituted C$_{5-12}$ cycloalkenyl, —CH$_2$-(optionally substituted C$_{5-7}$ cycloalkenyl);

t is 0;

R$^f$ is OH, OR$^k$, NR$^g$R$^h$, optionally substituted linear or branched C$_{1-6}$ alkyl, optionally substituted C$_{5-7}$ cycloalkyl, optionally substituted heterocycle, optionally substituted C$_{6-10}$ aryl or optionally substituted C$_{5-12}$ cycloalkenyl;

R$^g$ is H, optionally substituted linear or branched C$_{1-6}$ alkyl, optionally substituted C$_{5-7}$ cycloalkyl, optionally substituted heterocycle, optionally substituted C$_{6-10}$ aryl, optionally substituted linear or branched C$_{2-6}$ alkenyl, —C(O)-(optionally substituted C$_{6-10}$ aryl), —C(O)-(optionally substituted linear or branched C$_{2-6}$ alkenyl), or optionally substituted C$_{5-12}$ cycloalkenyl;

R$^h$ is H, optionally substituted linear or branched C$_{1-6}$ alkyl, optionally substituted C$_{5-7}$ cycloalkyl, optionally substituted heterocycle, optionally substituted C$_{6-10}$ aryl or optionally substituted C$_{5-12}$ cycloalkenyl; and R$^k$ is optionally substituted linear or branched C$_{1-6}$ alkyl, optionally substituted C$_{5-7}$ cycloalkyl, optionally substituted heterocycle, optionally substituted C$_{6-10}$ aryl or optionally substituted C$_{5-12}$ cycloalkenyl.

Depending on the position of R$^s$ on the tetracyclododeca-3-ene moiety, the cyclic olefin of Formula (I), can be of structure

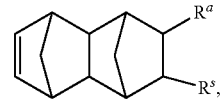

wherein: t is 1, R$^a$ and R$^s$ are as defined herein; and R$^a$ and R$^s$ can form an optionally substituted polycyclic ring with the rest of the molecule.

In one embodiment of the invention, the cyclic olefin is represented by Formula (I) wherein: R$^a$ is

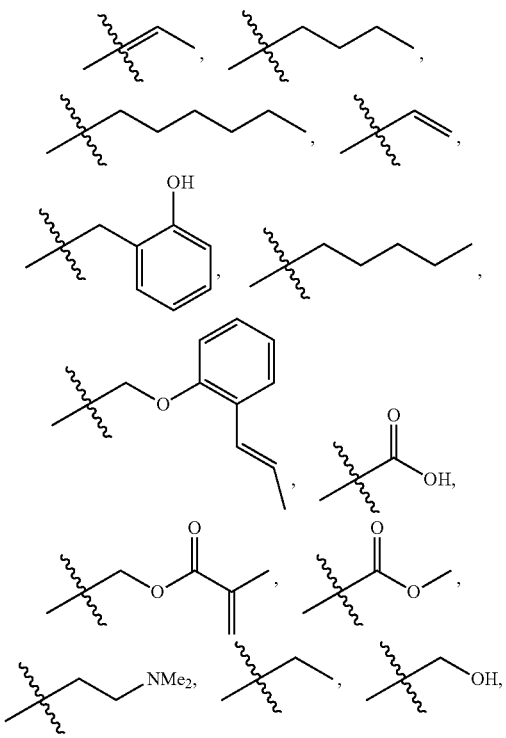

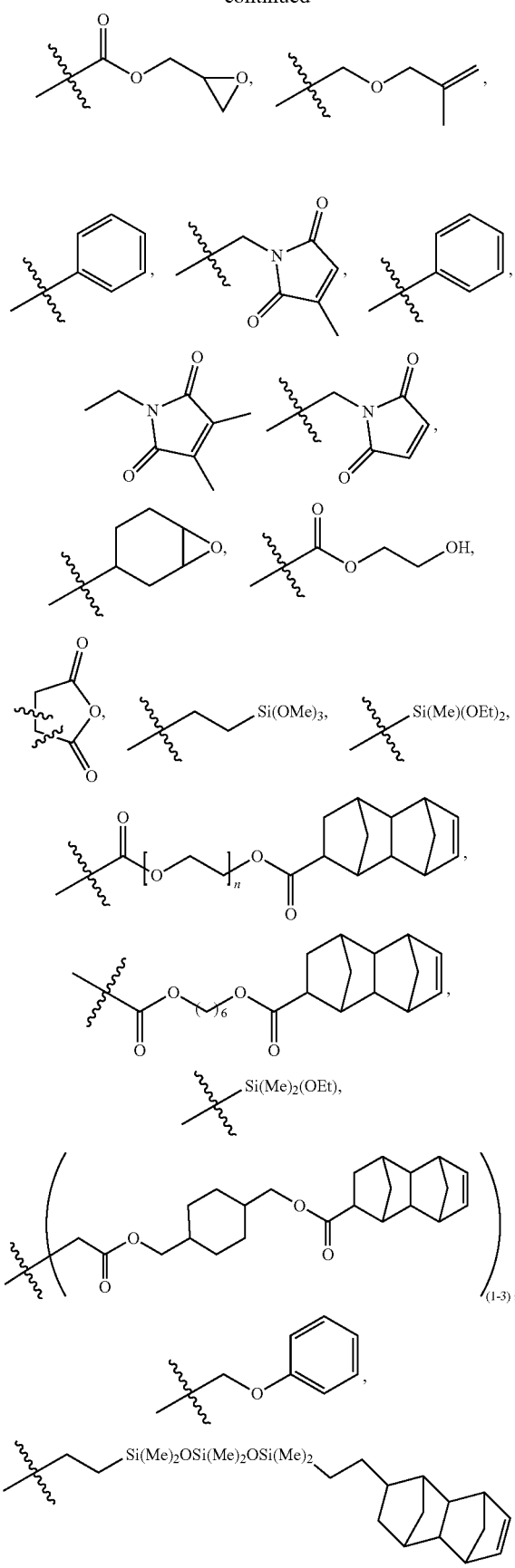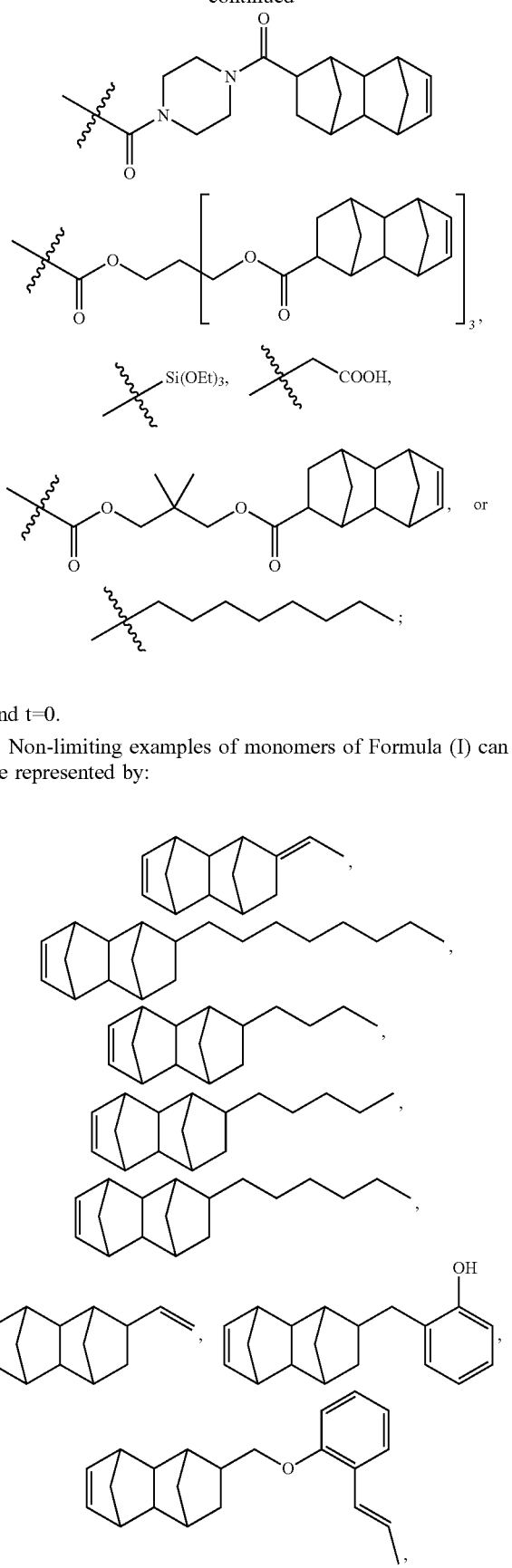
and t=0.
Non-limiting examples of monomers of Formula (I) can be represented by:

-continued
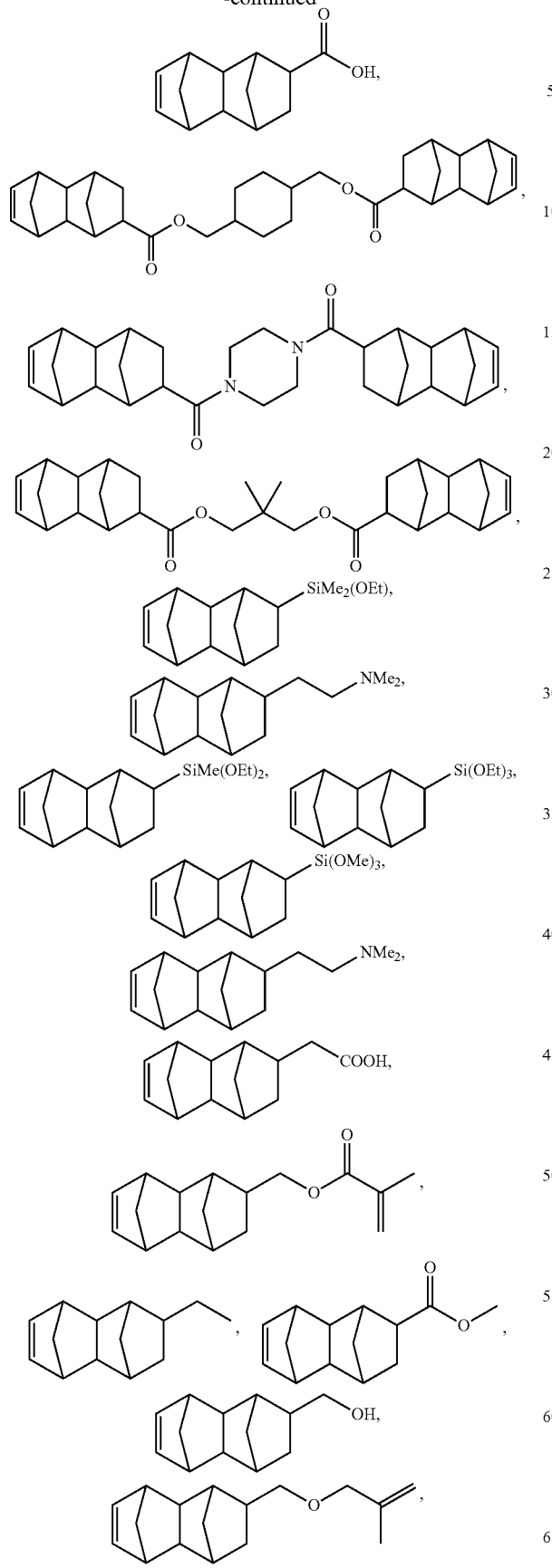
-continued
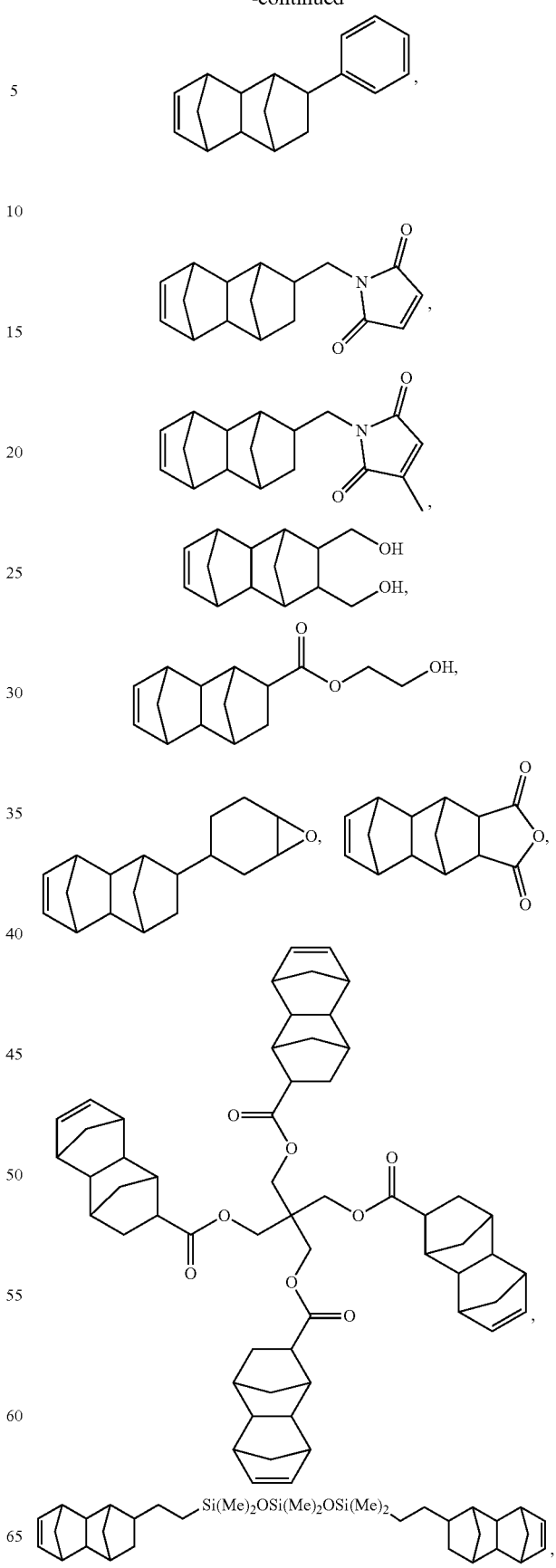

-continued

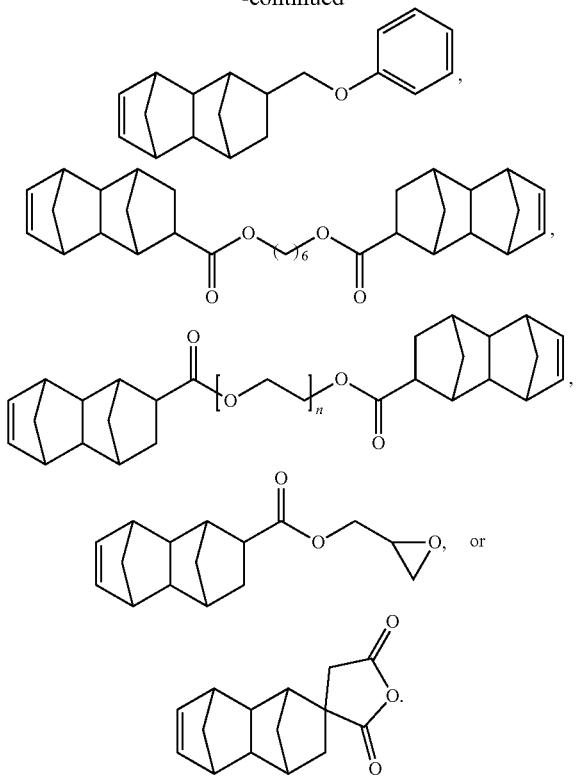

In one embodiment of the invention, the cyclic olefin is represented by the structure of Formula (II):

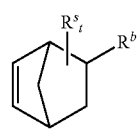

Formula (II)

wherein:
$R^b$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —Si(OR)$_3$, —S(O)$_2$OR$^h$, —OS(O)$_2$R$^h$, optionally substituted heterocycle, an optionally substituted spiro heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR$^o$R$^p$, —C(R$^h$)(R$^i$)C(O)NR$^o$OR$^n$;
each $R^s$ is independently optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR$^o$R$^p$, —C(R$^h$)(R$^i$)C(O)NR$^o$OR$^n$;
t is 0, 1, 2, 3, 4, 5 or 6;
R is OH, OR$^k$, NR$^g$R$^h$, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;
$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^k$ is optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl; and
$R^p$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl.

In one embodiment of the invention, the cyclic olefin is represented by the structure of Formula (II) wherein:
$R^b$ is H, optionally substituted linear or branched $C_{1-12}$ alkyl, optionally substituted linear or branched $C_{2-12}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, an optionally substituted spiro heterocycle, —CH$_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;

each $R^s$ is independently optionally substituted linear or branched $C_{1-12}$ alkyl, optionally substituted linear or branched $C_{2-12}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;

t is 0, 1, 2, 3 or 4;

$R^f$ is OH, $OR^k$, $NR^gR^h$, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^g$ is H, optionally substituted linear or branched $C_{1-12}$ alkyl, optionally substituted $C_{5-7}$ cycloalkyl, optionally substituted heterocycle, optionally substituted $C_{6-10}$ aryl, optionally substituted linear or branched $C_{2-12}$ alkenyl, —C(O)-(optionally substituted $C_{6-10}$ aryl), —C(O)-(optionally substituted linear or branched $C_{2-12}$ alkenyl), or optionally substituted $C_{5-12}$ cycloalkenyl;

$R^h$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^i$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^j$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^k$ is optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^l$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^m$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^n$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^o$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl; and $R^p$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl.

In one embodiment of the invention, the cyclic olefin is represented by Formula (II) wherein:

$R^b$ is H, optionally substituted linear or branched $C_{1-6}$ alkyl, optionally substituted linear or branched $C_{2-6}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, an optionally substituted spiro heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl);

t is 0;

$R^f$ is OH, $OR^k$, $NR^gR^h$, optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^g$ is H, optionally substituted linear or branched $C_{1-6}$ alkyl, optionally substituted $C_{5-7}$ cycloalkyl, optionally substituted heterocycle, optionally substituted $C_{6-10}$ aryl, optionally substituted linear or branched $C_{2-6}$ alkenyl, —C(O)-(optionally substituted $C_{6-10}$ aryl), —C(O)-(optionally substituted linear or branched $C_{2-6}$ alkenyl), or optionally substituted $C_{5-12}$ cycloalkenyl;

$R^h$ is H, optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl; and $R^k$ is optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl.

Depending on the position of $R^s$ on the 2-norbornene moiety, the cyclic olefin of structure Formula (II), can be represented by

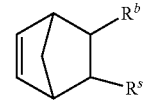

wherein: t=1, $R^s$ and R are as defined herein; and $R^s$ and $R^b$ can form together an optionally substituted polycyclic structure with the rest of the molecule.

In one embodiment of the invention, the cyclic olefin is represented by Formula (II) wherein:

$R^b$ is

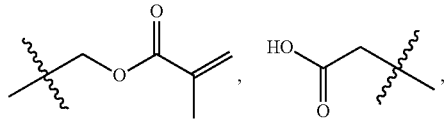

-continued and t=0.

Non-limiting examples of monomers of Formula (II) can be represented by

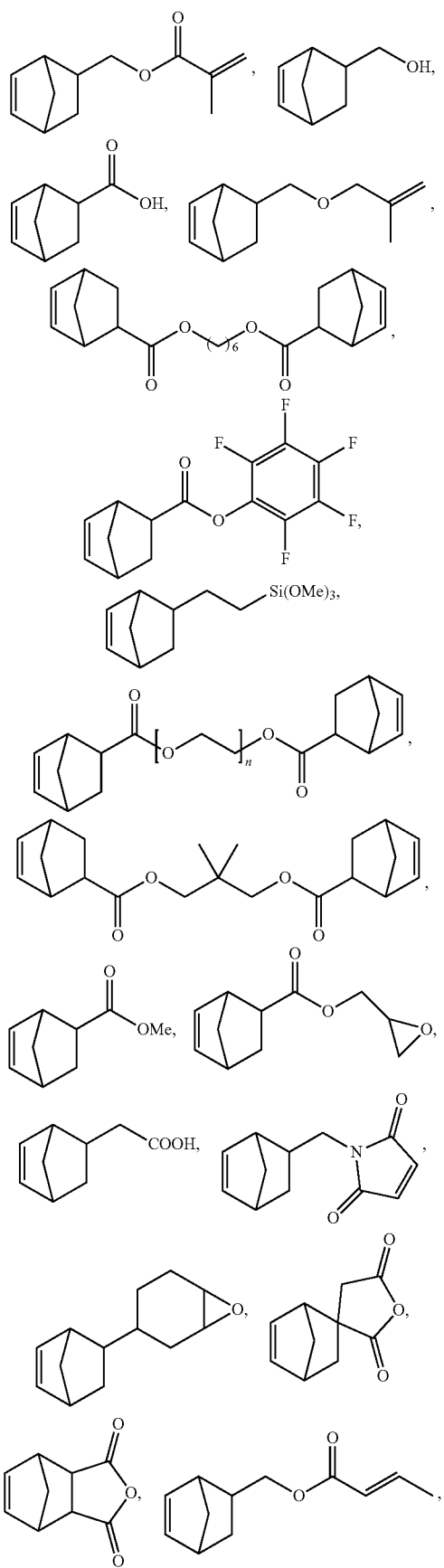
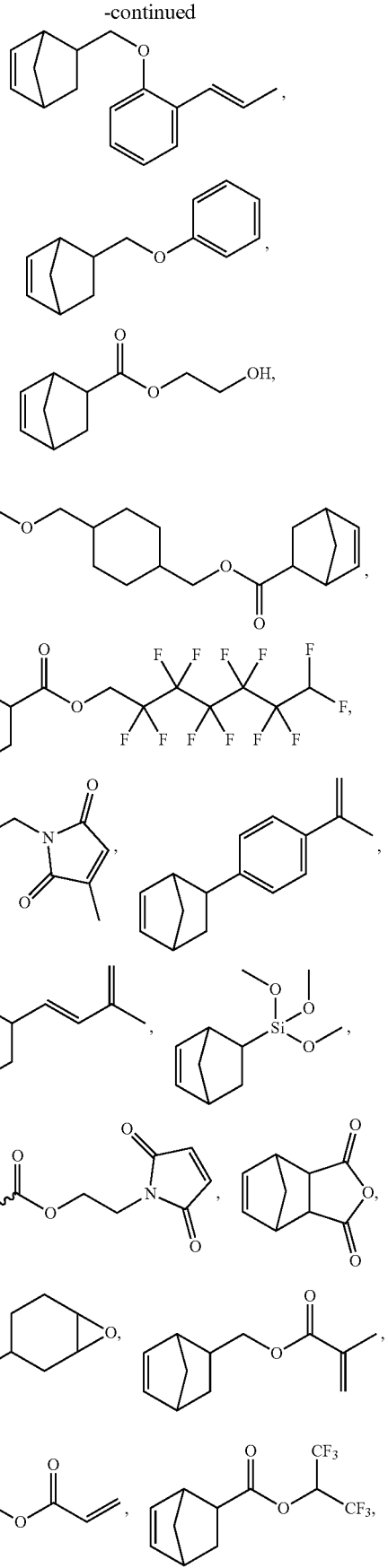

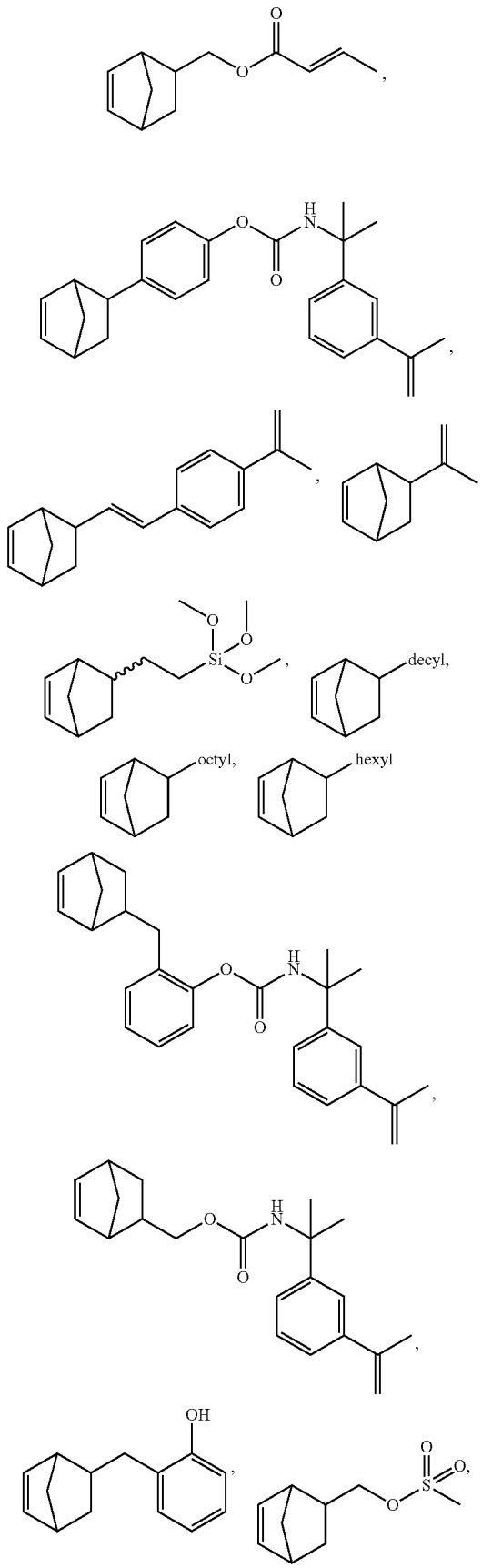
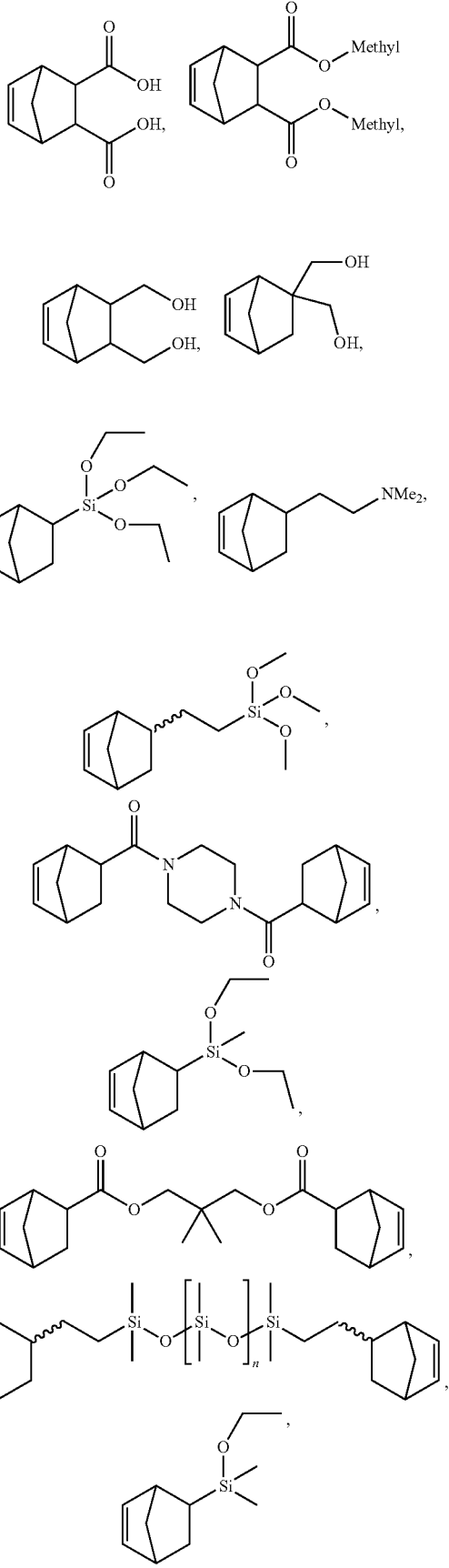

-continued

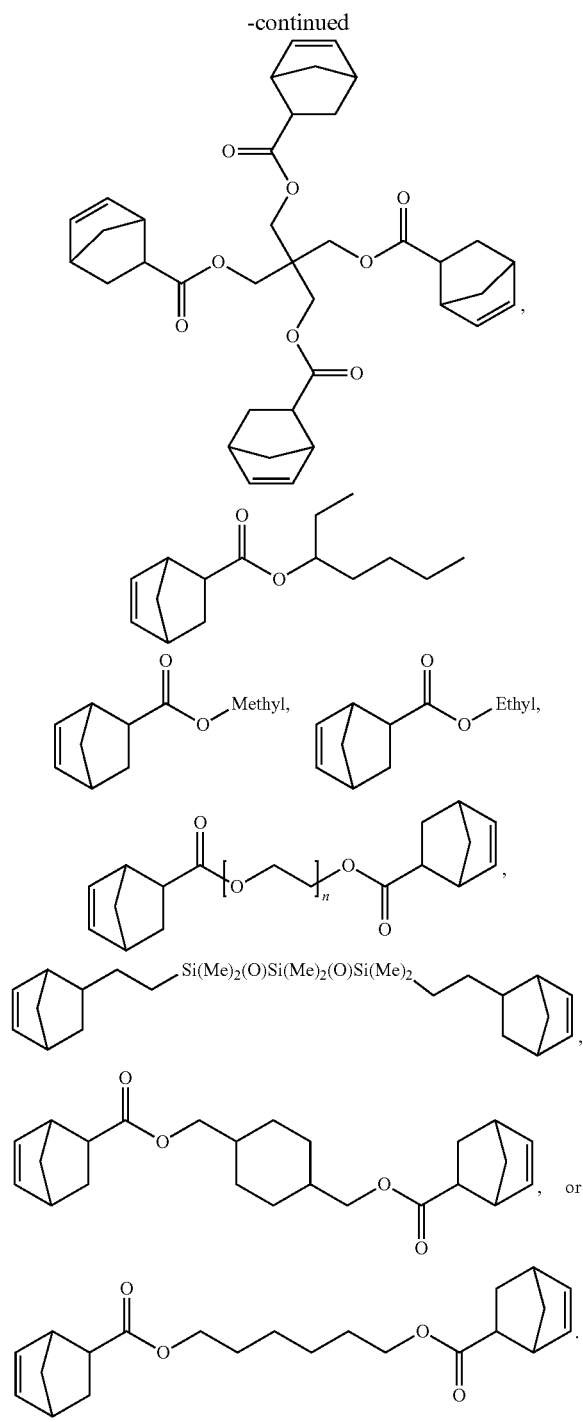

In one embodiment of the invention, the cyclic olefin is represented by the structure of Formula (III):

Formula (III)

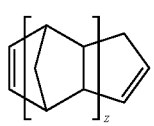

wherein z is 0, 1, 2 or 3.

In one embodiment of the invention, the cyclic olefin is represented by the structure of Formula (III), wherein z is 1 or 2.

In one embodiment of the invention, the cyclic olefin is represented by the structure of Formula (III), wherein z is 2.

Non-limiting examples of monomers of Formula (III) can be represented by

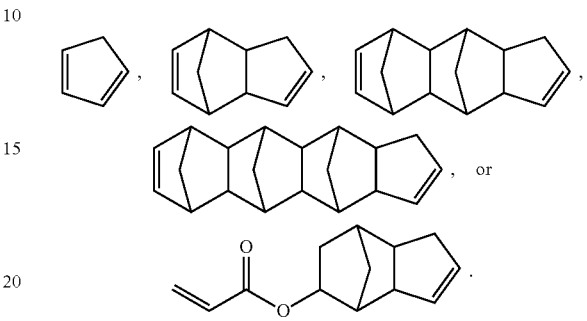

Examples of cyclic olefins thus include, without limitation, dicyclopentadiene; tricyclopentadiene, tetracyclopentadiene; norbornene; 5-isobutyl-2-norbornene; 5,6-dimethyl-2-norbornene; 5-phenyl-2-norbornene; 5-benzyl-2-norbornene; 5-acetyl-2-norbornene; 5-methoxycarbonyl-2-norbornene; 5-ethoxycarbonyl-2-norbornene; 5-methyl-5-methoxycarbonyl-2-norbornene; 5-cyano-2-norbornene; 5,5,6-trimethyl-2-norbornene; endo,exo-5,6-dimethoxy-2-norbornene; endo,endo-5,6-dimethoxy-2-norbornene; endo,exo-5-6-dimethoxycarbonyl-2-norbornene; endo,endo-5,6-dimethoxycarbonyl-2-norbornene; norbornadiene; tricycloundecene; tetracyclododecene; 8-methoxycarbonyl-tetracyclododecene; 8-cyanotetracyclododecene; $C_1$-$C_{12}$ hydrocarbyl substituted norbornenes such as 5-methyl-2-norbornene; 5-ethyl-2-norbornene; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like; $C_2$-$C_{12}$ hydrocarbyl substituted tetracyclododecenes such as 8-methyl-tetracyclododeca-3-ene; 8-ethyl-tetracyclododeca-3-ene; 8-butyl-tetracyclododeca-3-ene; 8-hexyl-tetracyclododeca-3-ene; 8-octyl-2-tetracyclododeca-3-ene; 8-decyl-2-tetracyclododeca-3-ene; 8-dodecyl-2-tetracyclododeca-3-ene; 8-vinyl-tetracyclododeca-3-ene; 8-ethylidene-2-tetracyclododeca-3-ene; 8-isopropenyl-tetracyclododeca-3-ene; 5-propenyl-tetracyclododeca-3-ene; 5-butenyl-tetracyclododeca-3-ene.

It is well understood by one of skill in the art that bicyclic and polycyclic olefins as disclosed herein may consist of a variety of structural isomers and/or stereoisomers, any and all of which are suitable for use in the present invention. Any reference herein to such bicyclic and polycyclic olefins unless specifically stated, includes mixtures of any and all such structural isomers and/or stereoisomers.

Linear Olefins

The linear olefins used in the invention, may be optionally substituted, optionally heteroatom-containing, mono-unsaturated, or multi-unsaturated.

In one embodiment of the invention, the linear olefin is represented by the structure of Formula (IV) in which $R^c$ and $R^d$ may be in a cis or trans configuration:

Formula (IV)

wherein:
- $R^c$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;
- $R^d$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;
- $R^f$ is OH, OR$^k$, NR$^g$R$^h$, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$cycloalkenyl;
- $R^h$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^i$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^j$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^k$ is optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^l$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^m$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^n$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;
- $R^o$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl; and
- $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl.

In one embodiment of the invention, the linear olefins are represented by the structure of Formula (IV) wherein:
- $R^c$ is H, optionally substituted linear or branched $C_{1-12}$ alkyl, optionally substituted linear or branched $C_{2-12}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;
- $R^d$ is H, optionally substituted linear or branched $C_{1-12}$ alkyl, optionally substituted linear or branched $C_{2-12}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;
- $R^f$ is OH, OR$^k$, NR$^g$R$^h$, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;
- $R^g$ is H, optionally substituted linear or branched $C_{1-12}$ alkyl, optionally substituted $C_{5-7}$ cycloalkyl, optionally substituted heterocycle, optionally substituted $C_{6-10}$ aryl, optionally substituted linear or branched $C_{2-12}$ alkenyl, —C(O)-(optionally substituted $C_{6-10}$ aryl), —C(O)-(optionally substituted linear or branched $C_{2-12}$ alkenyl), or optionally substituted $C_{5-12}$ cycloalkenyl;
- $R^h$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^i$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^j$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^k$ is optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^l$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^m$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^n$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^o$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl; and $R^p$ is H, optionally substituted linear or branched $C_{1-12}$ alkyl, optionally substituted $C_{5-7}$ cycloalkyl, optionally substituted heterocycle, optionally substituted $C_{6-10}$ aryl or optionally substituted $C_{5-12}$ cycloalkenyl.

In one embodiment of the invention, the linear olefins are represented by Formula (IV) wherein:

$R^c$ is H, optionally substituted linear or branched $C_{1-6}$ alkyl, optionally substituted linear or branched $C_{2-6}$ alkenyl, halogen, —C(O)$R^f$, —CH$_2$—C(O)$R^f$, —O$R^g$, —CH$_2$—O$R^g$, CN, NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl);

$R^d$ is H, optionally substituted linear or branched $C_{1-6}$ alkyl, optionally substituted linear or branched $C_{2-6}$ alkenyl, halogen, —C(O)$R^f$, —CH$_2$—C(O)$R^f$, —O$R^g$, —CH$_2$—O$R^g$, CN, NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{5-7}$ cycloalkyl, —CH$_2$-(optionally substituted $C_{5-7}$ cycloalkyl), optionally substituted $C_{6-10}$ aryl, —CH$_2$-(optionally substituted $C_{6-10}$ aryl), optionally substituted $C_{5-12}$ cycloalkenyl, —CH$_2$-(optionally substituted $C_{5-12}$ cycloalkenyl);

$R^f$ is OH, O$R^k$, N$R^g$$R^h$, optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl;

$R^g$ is H, optionally substituted linear or branched $C_{1-6}$ alkyl, optionally substituted $C_{5-7}$ cycloalkyl, optionally substituted heterocycle, optionally substituted $C_{6-10}$ aryl, optionally substituted linear or branched $C_{2-6}$ alkenyl, —C(O)-(optionally substituted $C_{6-10}$ aryl), —C(O)-(optionally substituted linear or branched $C_{2-6}$ alkenyl), or optionally substituted $C_{5-7}$ cycloalkenyl;

$R^h$ is H, optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl; and $R^k$ is optionally substituted linear or branched $C_{1-6}$ alkyl, optionally substituted $C_{5-7}$ cycloalkyl, optionally substituted heterocycle, optionally substituted $C_{6-10}$ aryl or optionally substituted $C_{5-12}$ cycloalkenyl.

In one embodiment of the invention, the linear olefins are represented by Formula (IV) wherein:

$R^c$ is H,

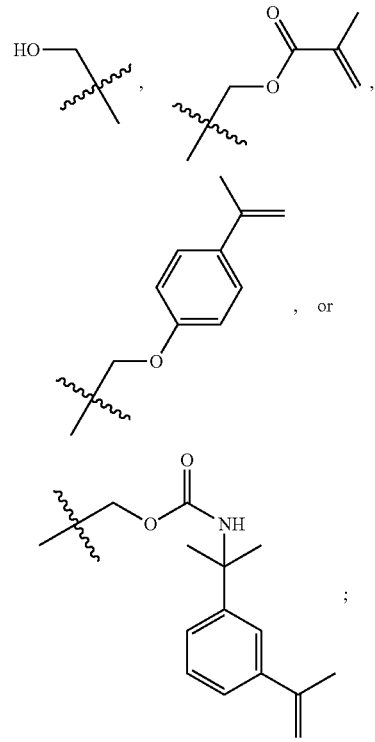

and $R^d$ is Halogen

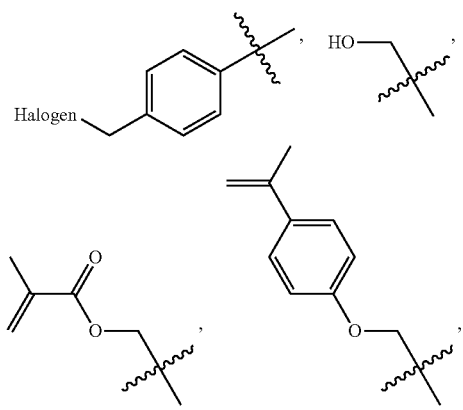

-continued
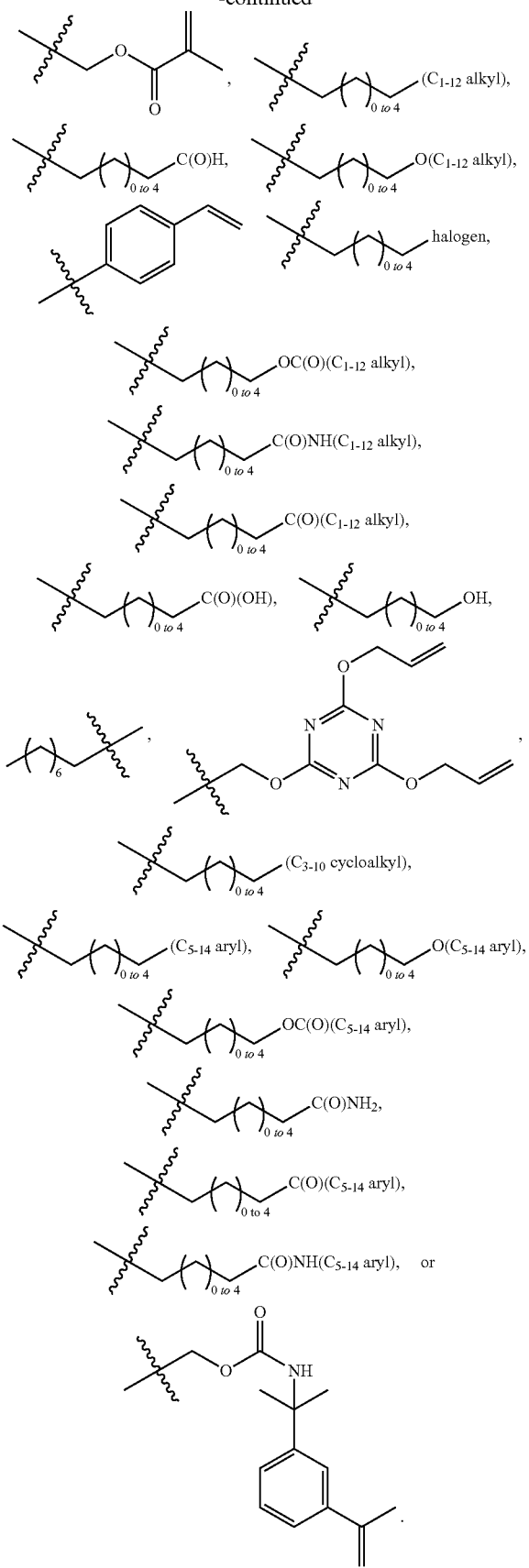
Non-limiting examples of Formula (IV) can be represented by
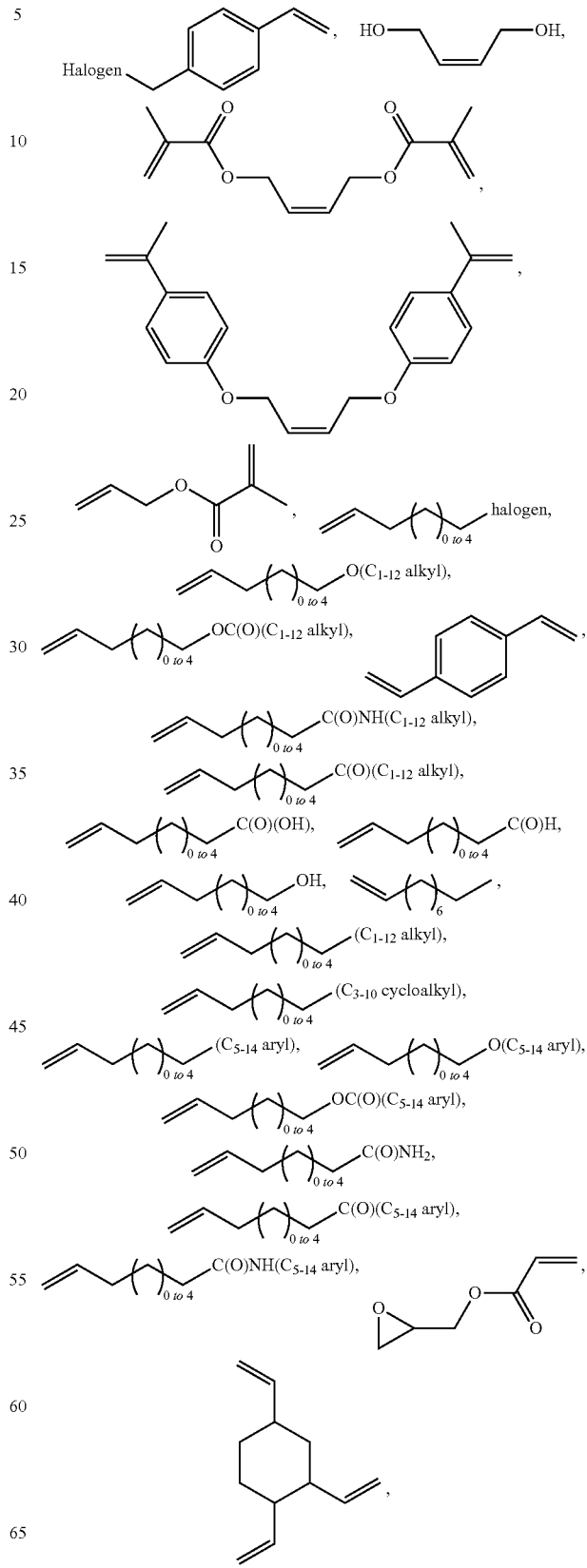

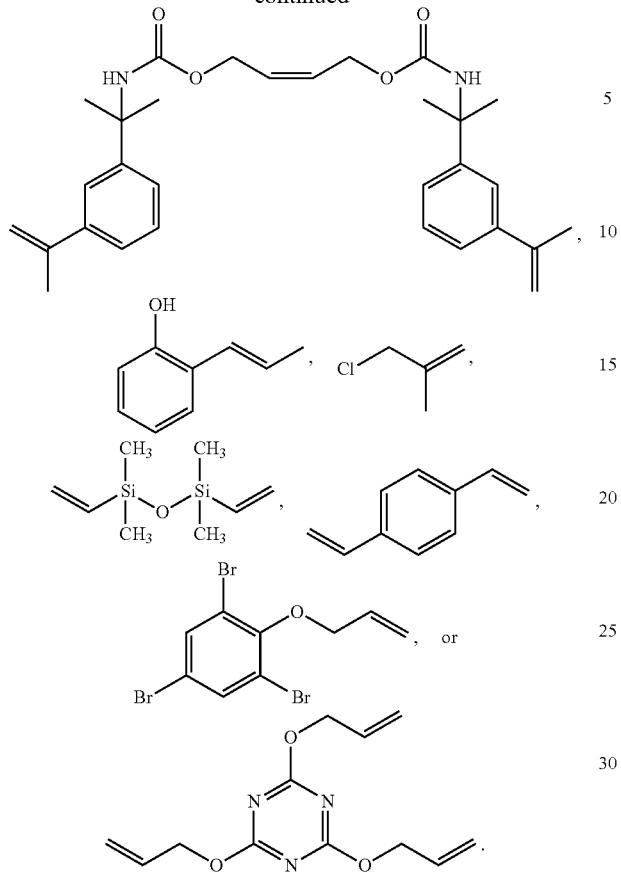

In separate embodiments, a coating composition of the invention, composition may as its olefinic component may comprise, consist essentially or, or consist of, at least one cyclic olefin represented selected from the group consisting of Formulae (I) and (II); at least one cyclic olefin selected from the group consisting of Formulae (I) and (III), or at least one cyclic olefin selected from the group consisting of Formulae (II) and (III). A coating composition of the invention may contain only cyclic monomers of Formula (I), (II) and (III) or mixtures thereof, or as just mentioned, may contain at least one particular cyclic olefin selected from one of Formula (I), (II) and (III), but not contain a linear olefin of Formula (IV). In a coating composition of the invention, the olefinic component may comprise, consist essentially or, or consist of, 0-100%, preferably 25-100%, most preferably 50-100% or 70-85% of at least one cyclic olefin of Formula (I); 0-100%, preferably 20-80% or 15-50% of at least one cyclic olefin of Formula (II); 0-100%, preferably 10-80% or 20-75% of at least one cyclic olefin of Formula (III); and 0-20%, preferably 0-10% or 1-5% of at least one linear olefin of Formula (IV), such the olefins making up the olefinic component add to 100% of that component of a coating composition of the invention.

Metal Carbene Olefin Metathesis Catalysts

The metal carbene olefin metathesis catalysts, suitable for catalyzing the ring opening metathesis polymerizations of the cyclic olefins of the invention are represented by the general structure of Formula (1)

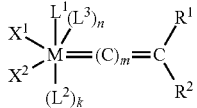

Formula (1)

wherein:
M is a Group 8 transition metal; generally, M is ruthenium or osmium; typically, M is ruthenium;
$L^1$, $L^2$ and $L^3$ are independently neutral electron donor ligands;
n is 0 or 1; typically, n is 0;
m is 0, 1 or 2; typically, m is 0;
k is 0 or 1; typically, k is 1;
$X^1$ and $X^2$ are independently anionic ligands; generally, $X^1$ and $X^2$ are independently halogen, trifluoroacetate, per-fluorophenols or together they can form a nitrate; typically, $X^1$ and $X^2$ are independently Cl, Br, I or F; and
$R^1$ and $R^2$ are independently hydrogen, optionally substituted hydrocarbyl, optionally substituted heteroatom-containing hydrocarbyl; typically, $R^1$ is hydrogen and $R^2$ is optionally substituted phenyl, $C_1$-$C_6$ alkyl or substituted 1-propenyl; or $R^1$ and $R^2$ are linked together to form one or more cyclic groups, such as a substituted indenylidene, specifically 3-phenylindenylid-1-ene.

In one embodiment, $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently optionally substituted: $C_{6-10}$ aryl or $C_1$-$C_{10}$ alkyl, or $C_{3-10}$ cycloalkyl. In the most preferred, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bus), tricyclopentylphosphine ($PCp_3$), tricyclohexylphosphine ($PCy_3$), triisopropylphosphine (P-i-$Pr_3$), trioctylphosphine ($POct_3$), triisobutylphosphine, (P-i-Bus), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$).

In one embodiment, $L^1$ is

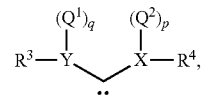

wherein X and Y are independently C, $CR^{3a}$, N, O, S, or P; only one of X or Y can be C or $CR^{3a}$; typically, X and Y are independently N; $Q^1$, $Q^2$, $R^3$, $R^{3a}$ and $R^4$ are independently hydrogen optionally substituted hydrocarbyl, optionally substituted heteroatom-containing hydrocarbyl; generally, $Q^1$, $Q^2$, $R^3$, $R^{3a}$ and $R^4$ are optionally linked to X or to Y via a linker such as optionally substituted hydrocarbylene, optionally substituted heteroatom-containing hydrocarbylene, or —(CO)—; typically $Q^1$, $Q^2$, $R^3$, $R^{3a}$ and $R^4$ are directly linked to X or to Y; and p is 0, when X is O or S, p is 1, when X is N, P or $CR^{3a}$, and p is 2, when X is C; q is 0, when Y is 0 or S, q is 1, when Y is N, P or $CR^{3a}$, and q is 2, when X is C.

In one embodiment, $L^1$ is

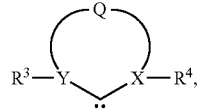

wherein Q is a two-atom linkage having the structure $-[CR^{11}R^{12}]_s-[CR^{13}R^{14}]_t-$ or $-[CR^{11}=CR^{13}]-$; typically Q is $-[CR^{11}R^{12}]_s-[CR^{13}R^{14}]_t-$, wherein $R^{11}$, $R^{12}$, $R^{13}$, and $R^{14}$ are independently hydrogen, optionally substituted hydrocarbyl, optionally substituted heteroatom-containing hydrocarbyl; typically $R^{11}$, $R^{12}$, $R^{13}$ and $R^{14}$ are independently hydrogen, optionally substituted $C_1$-$C_{12}$ alkyl, optionally substituted $C_1$-$C_{12}$ heteroalkyl, optionally substituted $C_5$-$C_{14}$ aryl; "s" and "t" are independently 1 or 2; typically, "s" and "t" are independently 1; or any two of $R^{11}$, $R^{12}$, $R^{13}$, and $R^{14}$ are optionally linked together and can form an optionally substituted, saturated or unsaturated polycyclic ring structure.

In one embodiment, $L^1$ is

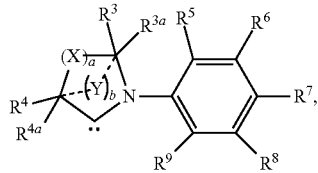

wherein:
X is $-CR^{1a}R^{2a}-$;
a is 1 or 2;
$R^{1a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, or together with $R^{2a}$ forms an optionally substituted spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;
$R^{2a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$ or together with $R^{1a}$ forms a spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;
Y is $-CR^{1b}R^{2b}-$;
b is 0, 1 or 2;
$R^{1b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, or together with $R^{2b}$ forms a five-, six-, or ten-membered cycloalkyl or heterocyclic ring, with the carbon atom to which they are attached;
$R^{2b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, or together with $R^{1b}$ forms a five-, six-, or ten-membered cycloalkyl or heterocyclic ring, with the carbon atom to which they are attached;
$R^3$ is H, optionally substituted $C_{1-24}$ alkyl, halogen, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{3a}$ can form an optionally substituted spiro monocyclic or spiro polycyclic $C_{3-10}$ cycloalkyl;
$R^{3a}$ is H, optionally substituted $C_{1-24}$ alkyl, halogen, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^3$ can form an optionally substituted spiro monocyclic or spiro polycyclic $C_{3-10}$ cycloalkyl;
$R^4$ is H, optionally substituted $C_{1-24}$ alkyl, halogen, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{4a}$ can form an optionally substituted spiro monocyclic or spiro polycyclic $C_{3-10}$ cycloalkyl;
$R^{4a}$ is H, optionally substituted $C_{1-24}$ alkyl, halogen, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^4$ can form an optionally substituted spiro monocyclic or spiro polycyclic $C_{3-10}$ cycloalkyl;
$R^5$ is H, optionally substituted $C_{1-24}$ alkyl, halogen $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ can form an optionally substituted polycyclic ring;
$R^6$ is H, optionally substituted $C_{1-24}$ alkyl, halogen, $-C(O)R^{21}$, $-OR^{22}$, CN, $-NR^{23}R^{24}$, $NO_2$, $-CF_3$, $-S(O)_xR^{25}$, $-P(O)(OH)_2$, $-OP(O)(OH)_2$, $-SR^{27}$, optionally substituted heterocycle, optionally substituted $C_{3-8}$ cycloalkyl, optionally substituted $C_{5-24}$ aryl, optionally substituted $C_{3-12}$ cycloalkenyl or together with $R^5$ or together with $R^7$ can form an optionally substituted polycyclic ring;

$R^7$ is H, optionally substituted $C_{1-24}$ alkyl, halogen, —C(O)$R^{21}$, —O$R^{22}$, CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ or together with $R^7$ can form an optionally substituted polycyclic ring;

$R^8$ is H, optionally substituted $C_{1-24}$ alkyl, halogen —C(O)$R^{21}$, —O$R^{22}$, CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{21}$, —O$R^{22}$, CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^8$ can form a polycyclic ring;

$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{25}$ is H, optionally substituted $C_{1-24}$ alkyl, O$R^{22}$, —N$R^{23}R^{24}$, optionally substituted heterocycle, optionally substituted $C_{3-8}$ cycloalkyl, optionally substituted $C_{5-24}$ aryl or optionally substituted $C_{3-12}$ cycloalkenyl;

$R^{26}$ is optionally substituted $C_{1-24}$ alkyl, optionally substituted $C_{3-8}$cycloalkyl, optionally substituted heterocycle, optionally substituted $C_{5-24}$ aryl or optionally substituted $C_{3-12}$ cycloalkenyl;

$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

x is 1 or 2; and with the provisos a. when a is 2, then the "X—X" bond can be saturated or unsaturated;

b. when b is 2, the "Y—Y" bond can be saturated or unsaturated;

c. when a is 2, and the "X—X" bond is unsaturated, then $R^{2a}$ is nil;

d. when b is 1, then $R^{3a}$ and $R^{4a}$ are both nil;

e. when b is 2, then $R^{3a}$ and $R^{4a}$ are both nil;

f. when b is 2, and the "Y—Y" bond is unsaturated, then $R^{2b}$ is nil.

In one embodiment, $L^1$ is

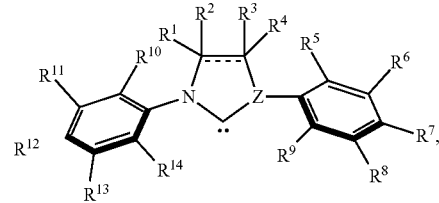

wherein:

Z is N or C$R^{32}$;

$R^1$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl or optionally substituted $C_{3-8}$ cycloalkenyl or together with $R^2$ or together with $R^1$ can form a polycyclic ring or together with $R^4$ can form a spiro compound;

$R^4$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a spiro compound or together with $R^2$ or together with $R^1$ can form a polycyclic ring;

$R^5$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_x R^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^1$ can form an optionally substituted polycyclic ring;

$R^{11}$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{10}$ or together with $R^{12}$ can form an optionally substituted polycyclic ring;

$R^{12}$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{32}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{25}$ is OH, OR$^{30}$, NR$^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, OR$^{26}$, —NR$^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

In one embodiment, $L^1$ is

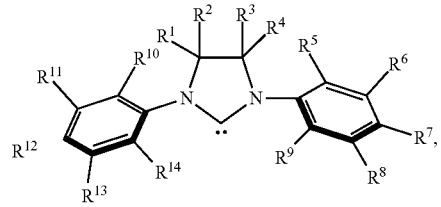

wherein:

$R^1$ is H, optionally substituted $C_{1-12}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-12}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-12}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{6-10}$ aryl or optionally substituted $C_{3-8}$ cycloalkenyl or together with $R^2$ or together with $R^1$ can form a polycyclic ring or together with $R^4$ can form a spiro compound;

$R^4$ is H, optionally substituted $C_{1-24}$ alkyl, halogen, —C(O)$R^{25}$, —OR$^{26}$, CN, —NR$^{27}R^{28}$, NO$_2$, —CF$_3$, —S(O)$_x R^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with R³ can form a spiro compound or together with R² or together with R¹ can form a polycyclic ring;

R⁵ is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl, optionally substituted $C_{3-8}$ cycloalkenyl, or together with R⁶ can form an optionally substituted polycyclic ring;

R⁶ is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl, optionally substituted $C_{3-8}$ cycloalkenyl, or together with R⁵ or together with R⁷ can form an optionally substituted polycyclic ring;

R⁷ is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl optionally substituted $C_{3-8}$ cycloalkenyl, or together with R⁶ or together with R⁸ can form an optionally substituted polycyclic ring;

R⁸ is H, optionally substituted $C_{1-24}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{3-10}$ cycloalkyl, optionally substituted $C_{6-10}$ aryl, optionally substituted $C_{3-8}$ cycloalkenyl, or together with R⁷ or together with R⁹ can form an optionally substituted polycyclic ring;

R⁹ is H, optionally substituted $C_{1-24}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{3-10}$ cycloalkyl, optionally substituted $C_{6-10}$ aryl, optionally substituted $C_{5-7}$ cycloalkenyl, or together with R⁸ can form an optionally substituted polycyclic ring;

R¹⁰ is H, optionally substituted $C_{1-24}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl, optionally substituted $C_{3-8}$ cycloalkenyl, or together with R¹¹ can form an optionally substituted polycyclic ring;

R¹¹ is H, optionally substituted $C_{1-124}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl, optionally substituted $C_{3-8}$ cycloalkenyl or together with R¹⁰ or together with R¹² can form an optionally substituted polycyclic ring;

R¹² is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{3-10}$ cycloalkyl, optionally substituted $C_{6-10}$ aryl, optionally substituted $C_{3-8}$ cycloalkenyl, or together with R¹¹ or together with R¹³ can form an optionally substituted polycyclic ring;

R¹³ is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{6-10}$ aryl, optionally substituted $C_{3-8}$ cycloalkenyl, or together with R¹⁴ or together with R¹² can form an optionally substituted polycyclic ring;

R¹⁴ is H, optionally substituted $C_{1-12}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{5-7}$ cycloalkyl, optionally substituted $C_{5-24}$ aryl, optionally substituted $C_{3-8}$ cycloalkenyl, or together with R¹³ can form a polycyclic ring;

R²⁵ is OH, OR³⁰, NR²⁷R²⁸, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

R²⁶ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

R²⁷ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

R²⁸ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

R²⁹ is H, optionally substituted $C_{1-12}$ alkyl, OR²⁶, —NR²⁷R²⁸, optionally substituted heterocycle, optionally substituted $C_{5-7}$ cycloalkyl, optionally substituted $C_{6-10}$ aryl or optionally substituted $C_{3-8}$ cycloalkenyl;

R³⁰ is optionally substituted $C_{1-12}$ alkyl, optionally substituted $C_{5-7}$cycloalkyl, optionally substituted heterocycle, optionally substituted $C_{6-10}$ aryl or optionally substituted $C_{3-8}$ cycloalkenyl;

R³¹ is H, optionally substituted $C_{1-12}$ alkyl, optionally substituted $C_{3-10}$ cycloalkyl, optionally substituted heterocycle, optionally substituted $C_{6-10}$ aryl or optionally substituted $C_{3-8}$ cycloalkenyl; and x is 1 or 2.

In one embodiment, L¹ is

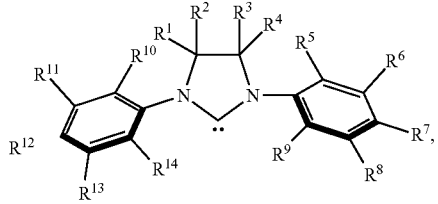

wherein:
R¹ is H, phenyl, methyl, ethyl, iso-propyl, n-propyl, n-butyl, tert-butyl, sec-butyl;
R² is H, phenyl, methyl, ethyl, iso-propyl, n-propyl, n-butyl, tert-butyl, sec-butyl;
R³ is H, phenyl, methyl, ethyl, iso-propyl, n-propyl, n-butyl, tert-butyl, sec-butyl;
R⁴ is H, phenyl, methyl, ethyl, iso-propyl, n-propyl, n-butyl, tert-butyl, sec-butyl;
R⁵ is H, methyl, ethyl, iso-propyl, n-propyl, n-butyl, tert-butyl, sec-butyl, F, optionally substituted phenyl, or together with R⁶ can form an optionally substituted polycyclic ring;

R⁶ is H, methyl, ethyl, iso-propyl, n-propyl, n-butyl, tert-butyl, sec-butyl, F, optionally substituted phenyl, or together with R or together with R⁷ can form an optionally substituted polycyclic ring;

R⁷ is H, methyl, ethyl, iso-propyl, n-propyl, n-butyl, tert-butyl, sec-butyl, optionally substituted phenyl, or together with R⁶ or together with R⁸ can form an optionally substituted polycyclic ring;

R⁸ is H, methyl, ethyl, iso-propyl, n-propyl, n-butyl, tert-butyl, sec-butyl, optionally substituted phenyl, or together with R⁷ or together with R⁹ can form an optionally substituted polycyclic ring;

R⁹ is H, methyl, ethyl, iso-propyl, n-propyl, n-butyl, tert-butyl, sec-butyl, F, optionally substituted phenyl, or together with R⁸ can form a polycyclic ring;

R¹⁰ is H, methyl, ethyl, iso-propyl, n-propyl, n-butyl, tert-butyl, sec-butyl, optionally substituted phenyl, or together with R¹¹ can form an optionally substituted polycyclic ring;

R¹¹ is H, methyl, ethyl, iso-propyl, n-propyl, n-butyl, tert-butyl, sec-butyl, optionally substituted phenyl, or together with R¹⁰ or together with R² can form an optionally substituted polycyclic ring;

R¹² is H, methyl, ethyl, iso-propyl, n-propyl, n-butyl, tert-butyl, sec-butyl, F, optionally substituted phenyl, or together with R¹¹ or together with R¹³ can form a polycyclic ring;

R¹³ is H, methyl, ethyl, iso-propyl, n-propyl, n-butyl, tert-butyl, sec-butyl, F, optionally substituted phenyl, or together with R¹² or together with R¹⁴ can form an optionally substituted polycyclic ring;

R¹⁴ is H, methyl, ethyl, iso-propyl, n-propyl, n-butyl, tert-butyl, sec-butyl, optionally substituted phenyl, or together with R¹³ can form an optionally substituted polycyclic ring.

In one embodiment, L² is

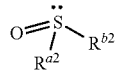

wherein: $R^{a2}$ is hydrogen, optionally substituted hydrocarbyl, optionally substituted heteroatom-containing hydrocarbyl; generally $R^{a2}$ is optionally substituted $C_1$-$C_{10}$ alkyl, optionally substituted $C_3$-$C_{10}$ cycloalkyl, optionally substituted $C_5$-$C_{24}$ aryl; typically $R^{a2}$ is methyl, ethyl, n-propyl, iso-propyl, n-butyl, tert-butyl, cyclohexyl or phenyl; and $R^{b2}$ is hydrogen, optionally substituted hydrocarbyl, optionally substituted heteroatom-containing hydrocarbyl; generally $R^{b2}$ is optionally substituted $C_1$-$C_{10}$ alkyl, optionally substituted $C_3$-$C_{10}$ cycloalkyl, optionally substituted $C_5$-$C_{24}$ aryl; typically $R^{b2}$ is methyl, ethyl, n-propyl, iso-propyl, n-butyl, tert-butyl, cyclohexyl or phenyl; or $R^{a2}$ and $R^{b2}$ are linked together to form a five or a six heterocyclic membered ring with the sulfoxide group [—S(O)—].

In one embodiment, L² is

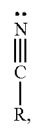

wherein: R is optionally substituted hydrocarbyl, optionally substituted heteroatom-containing hydrocarbyl; generally, R is optionally substituted $C_1$-$C_{10}$ alkyl, optionally substituted $C_3$-$C_{10}$ cycloalkyl, optionally substituted $C_5$-$C_{24}$ aryl; typically, R is methyl, ethyl, n-propyl, iso-propyl, n-butyl, tert-butyl, or phenyl.

In one embodiment, L² is

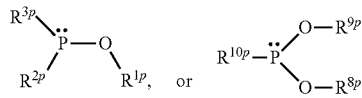

wherein: $R^{1p}$, $R^{2p}$, $R^{3p}$ are each independently optionally substituted $C_6$-$C_{10}$ aryl, or optionally substituted $C_1$-$C_{10}$ alkyl, or optionally substituted $C_3$-$C_{10}$ cycloalkyl. $R^{8p}$, $R^{9p}$, $R^{10p}$ are each independently optionally substituted $C_6$-$C_{10}$ aryl, or optionally substituted $C_1$-$C_{10}$ alkyl, or optionally substituted $C_3$-$C_{10}$ cycloalkyl.

In one embodiment, L² is: $PR^{H1}R^{H2}R^{H3}$, wherein: $R^{H1}$, $R^{H2}$, $R^{H3}$ are each independently optionally substituted $C_6$-$C_{10}$ aryl, or optionally substituted $C_1$-$C_{10}$ alkyl, or optionally substituted $C_3$-$C_{10}$ cycloalkyl. In one embodiment, $R^{H1}$ is methyl, ethyl, n-propyl, iso-propyl, n-butyl, tert-butyl, cyclohexyl, cyclopentyl or phenyl. In one embodiment, $R^{H2}$ is methyl, ethyl, n-propyl, iso-propyl, n-butyl, tert-butyl, cyclohexyl, cyclopentyl or phenyl. In one embodiment, $R^{H3}$ is methyl, ethyl, n-propyl, iso-propyl, n-butyl, tert-butyl, cyclohexyl, cyclopentyl or phenyl. In one embodiment, L² is :P(Cyclohexyl)₃, :P(Et)₂Ph, :P(Ph)₃.

In one embodiment, X¹ and X² are independently halogen, trifluoroacetate, per-fluorophenols or together they can form a nitrate; typically, X¹ and X² are independently Cl, Br, I or F. In a preferred embodiment, X¹ and X² are both Cl.

In one embodiment, R¹ is hydrogen and R² is optionally substituted phenyl, $C_1$-$C_6$ alkyl or substituted 1-propenyl; or R¹ and R² are linked together to form one or more cyclic groups, such as a substituted indenylidene, specifically 3-phenylindenylid-1-ene.

In another embodiment, R¹ is hydrogen and R² is 2-methyl-1-propenyl. In another embodiment, R¹ and R² form together a 3-phenylindenylid-1-ene. In another embodiment, R¹ is hydrogen and R² is phenyl.

In one embodiment, L² is

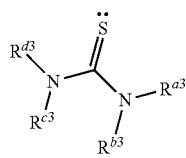

wherein: $R^{a3}$ is optionally substituted hydrocarbyl, optionally substituted heteroatom-containing hydrocarbyl; generally $R^{a3}$ is optionally substituted $C_1$-$C_{10}$ alkyl, optionally substituted $C_3$-$C_{10}$ cycloalkyl, optionally substituted $C_5$-$C_{24}$ aryl; typically $R^{a3}$ is methyl, ethyl, n-propyl, iso-propyl, n-butyl, tert-butyl, cyclohexyl, benzyl or phenyl; $R^{b3}$ is optionally substituted hydrocarbyl, optionally substituted heteroatom-containing hydrocarbyl; generally, $R^{b3}$ is optionally substituted $C_1$-$C_{10}$ alkyl, optionally substituted $C_3$-$C_{10}$ cycloalkyl, optionally substituted $C_5$-$C_{24}$ aryl; typically, $R^{b3}$ is methyl, ethyl, n-propyl, iso-propyl, n-butyl, tert-butyl, cyclohexyl, benzyl or phenyl; or $R^{a3}$ and $R^{b3}$ can be linked to form a five-, six- or seven-membered heterocycle ring with the nitrogen atom they are linked to; $R^{c3}$ is optionally substituted hydrocarbyl, optionally substituted heteroatom-containing hydrocarbyl; generally, $R^{c3}$ is optionally substituted $C_1$-$C_{10}$ alkyl, optionally substituted $C_3$-$C_{10}$ cycloalkyl, optionally substituted $C_5$-$C_{24}$ aryl; typically, $R^{c3}$ is methyl, ethyl, n-propyl, iso-propyl, n-butyl, tert-butyl, cyclohexyl, benzyl or phenyl; $R^{d3}$ is optionally substituted hydrocarbyl, optionally substituted heteroatom-containing hydrocarbyl; generally, $R^{d3}$ is optionally substituted $C_1$-$C_{10}$ alkyl, optionally substituted $C_3$-$C_{10}$ cycloalkyl, optionally substituted $C_5$-$C_{24}$ aryl; typically, $R^{d3}$ is methyl, ethyl, n-propyl, iso-propyl, n-butyl, tert-butyl, cyclohexyl, benzyl or phenyl; or $R^{c3}$ and $R^{d3}$ can be linked to form a five-, six- or seven-membered heterocycle ring with the nitrogen atom they are linked to; or $R^{b3}$ and $R^{c3}$ can be linked to form a five-, six- or seven-membered heterocycle ring with the nitrogen atoms they are linked to.

In one embodiment, the moiety

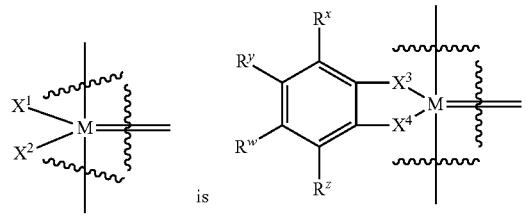

is wherein: $X^3$ and $X^4$ are independently O or S; typically, $X^3$ and $X^4$ are independently S; and $R^x$, $R^y$, $R^w$ and $R^z$ are independently hydrogen, halogen, optionally substituted hydrocarbyl, optionally substituted heteroatom-containing hydrocarbyl; generally $R^x$, $R^y$, $R^w$ and $R^z$ are independently hydrogen, halogen, optionally substituted $C_1$-$C_{12}$ alkyl, optionally substituted $C_3$-$C_{10}$ cycloalkyl, optionally substituted $C_5$-$C_{24}$ aryl; typically, $R^{x1}$, $R^y$, $R^w$ and $R^z$ are independently $C_1$-$C_6$ alkyl, hydrogen, optionally substituted phenyl, or halogen; or $R^{x1}$ and $R^y$ are linked together to form an optionally substituted bicyclic or polycyclic aryl; or $R^w$ and $R^z$ are linked together to form an optionally substituted bicyclic or polycyclic aryl; or $R^y$ and $R^w$ are linked together to form an optionally substituted bicyclic or polycyclic aryl.

In another embodiment the metal carbene olefin metathesis catalysts suitable for the ring opening of the monomers of the invention are represented by the general structure of Formula (2)

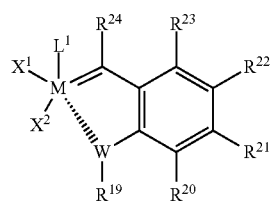

Formula (2)

wherein:
M is ruthenium;
$L^1$, $X^1$ and $X^2$ are as defined herein;
W is O, halogen, $NR^{33}$ or S;
$R^{19}$ is H, optionally substituted $C_{1-24}$ alkyl, $-C(R^{34})(R^{35})COOR^{36}$, $-C(R^{34})(R^{35})C(O)H$, $-C(R^{34})(R^{35})C(O)R^{37}$, $-C(R^{34})(R^{35})CR^{38}(OR^{39})(OR^{40})$, $-C(R^{34})(R^{35})C(O)NR^{41}R^{42}$, $-C(R^{34})(R^{35})C(O)NR^{41}OR^{40}$, $-C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, $OR^{30}$, $NR^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, $OR^{26}$, $-NR^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

In one embodiment the metal carbene olefin metathesis catalysts suitable for the ring opening of the monomers of the invention are represented by the general structure of Formula (2)

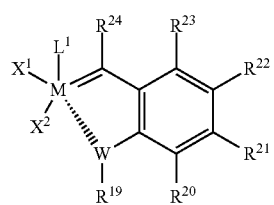

Formula (2)

wherein:
M is ruthenium;
$L^1$, $X^1$ and $X^2$ are as defined herein;
W is O, halogen, $NR^{33}$ or S;
$R^{19}$ is H, optionally substituted $C_{1-12}$ alkyl, —C($R^{34}$)($R^{35}$)COOR$^{36}$, —C($R^{34}$)($R^{35}$)C(O)H, —C($R^{34}$)($R^{35}$)C(O)R$^{37}$, —C($R^{34}$)($R^{35}$)CR$^{38}$(OR$^{39}$)(OR$^4$), —C($R^{34}$)($R^{35}$)C(O)NR$^{41}$R$^{42}$, —C($R^{34}$)($R^{35}$)C(O)NR$^{41}$OR$^{40}$, —C(O)R$^{25}$, optionally substituted heterocycle, optionally substituted $C_{5-7}$ cycloalkyl, optionally substituted $C_{6-10}$ aryl, optionally substituted $C_{3-8}$ cycloalkenyl, or when W is NR$^{33}$, then $R^{19}$ together with $R^{33}$ can form an optionally substituted heterocyclic ring or when W is halogen then $R^{19}$ is nil;

$R^{20}$ is H, optionally substituted $C_{1-12}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ can form a polycyclic ring;

$R^{21}$ is H, optionally substituted $C_{1-12}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{20}$ or together with $R^{22}$ can form a polycyclic ring;

$R^{22}$ is H, optionally substituted $C_{1-12}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ or together with $R^{23}$ can form a polycyclic ring;

$R^{23}$ is H, optionally substituted $C_{1-12}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{22}$ can form a polycyclic ring;

$R^{24}$ is H, optionally substituted $C_{1-12}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{5-7}$ cycloalkyl, optionally substituted $C_{6-10}$ aryl or optionally substituted $C_{3-8}$ cycloalkenyl;

$R^{25}$ is OH, OR$^{30}$, NR$^{27}$R$^{28}$, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{26}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{27}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{28}$ is H, optionally substituted $C_{1-12}$ alkyl, optionally substituted $C_{5-7}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-12}$ alkyl, OR$^{26}$, —NR$^{27}$R$^{28}$, optionally substituted heterocycle, optionally substituted $C_{5-7}$ cycloalkyl, optionally substituted $C_{6-10}$ aryl or optionally substituted $C_{3-8}$ cycloalkenyl;

$R^{30}$ is optionally substituted $C_{1-12}$ alkyl, optionally substituted $C_{5-7}$cycloalkyl, optionally substituted heterocycle, optionally substituted $C_{6-10}$ aryl or optionally substituted $C_{3-8}$ cycloalkenyl;

$R^{31}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{33}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{34}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{35}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{36}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{37}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-}$ cycloalkenyl;

$R^{38}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{39}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{40}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{41}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{42}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl; and x is 1 or 2.

In one embodiment, the metal carbene olefin metathesis catalyst is represented by the structure of Formula (2)

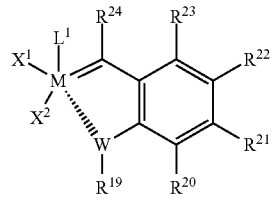

Formula (2)

wherein:

M is ruthenium;

$L^1$, $X^1$ and $X^2$ are as defined herein;

W is O;

$R^{19}$ is H, methyl, ethyl, n-propyl, iso-propyl, n-butyl, tert-butyl, cyclohexyl, cyclopentyl or phenyl;

$R^{20}$ is H, methyl, ethyl, n-propyl, iso-propyl, n-butyl, tert-butyl, cyclohexyl, cyclopentyl or phenyl;

$R^{21}$ is H, optionally substituted $C_{1-24}$ alkyl, halogen, —C(O)$R^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl or phenyl;

$R^{25}$ is OH, OR$^{30}$, NR$^{27}$R$^{28}$, methyl, ethyl, n-propyl, iso-propyl, n-butyl, tert-butyl, cyclohexyl, cyclopentyl or phenyl;

$R^{26}$ is H, methyl, ethyl, n-propyl, iso-propyl, n-butyl, tert-butyl, cyclohexyl, cyclopentyl or phenyl;

$R^{27}$ is H, methyl, ethyl, n-propyl, iso-propyl, n-butyl, tert-butyl, cyclohexyl, cyclopentyl or phenyl;

$R^{28}$ is H, methyl, ethyl, n-propyl, iso-propyl, n-butyl, tert-butyl, cyclohexyl, cyclopentyl or phenyl;

$R^{29}$ is H, methyl, ethyl, n-propyl, iso-propyl, n-butyl, tert-butyl, OR$^{26}$, —NR$^{27}$R$^{28}$, cyclohexyl, cyclopentyl or phenyl;

$R^{30}$ is methyl, ethyl, n-propyl, iso-propyl, n-butyl, tert-butyl, cyclohexyl, cyclopentyl or phenyl;

$R^{31}$ is H, methyl, ethyl, n-propyl, iso-propyl, n-butyl, tert-butyl, cyclohexyl, cyclopentyl or phenyl;

x is 1 or 2.

In one embodiment, wherein:

$L^1$ is

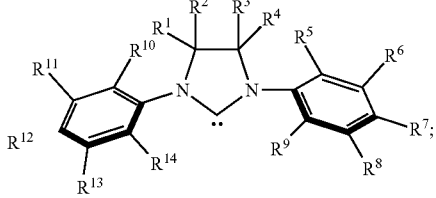

$R^1$ is H, phenyl, methyl, ethyl, iso-propyl, n-propyl, n-butyl, tert-butyl, sec-butyl;

$R^2$ is H, phenyl, methyl, ethyl, iso-propyl, n-propyl, n-butyl, tert-butyl, sec-butyl;

$R^3$ is H, phenyl, methyl, ethyl, iso-propyl, n-propyl, n-butyl, tert-butyl, sec-butyl;

$R^4$ is H, phenyl, methyl, ethyl, iso-propyl, n-propyl, n-butyl, tert-butyl, sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with R or together with $R^7$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with R⁷ or together with R⁹ can form an optionally substituted polycyclic ring;

R⁹ is H, methyl, ethyl, iso-propyl, n-propyl, n-butyl, tert-butyl, sec-butyl, F, optionally substituted phenyl, or together with R⁸ can form a polycyclic ring;

R¹⁰ is H, methyl, ethyl, iso-propyl, n-propyl, n-butyl, tert-butyl, sec-butyl, optionally substituted phenyl, or together with R¹ can form an optionally substituted polycyclic ring;

R¹¹ is H, methyl, ethyl, iso-propyl, n-propyl, n-butyl, tert-butyl, sec-butyl, optionally substituted phenyl, or together with R¹⁰ or together with R² can form an optionally substituted polycyclic ring;

R¹² is H, methyl, ethyl, iso-propyl, n-propyl, n-butyl, tert-butyl, sec-butyl, F, optionally substituted phenyl, or together with R¹ or together with R¹³ can form a polycyclic ring;

R¹³ is H, methyl, ethyl, iso-propyl, n-propyl, n-butyl, tert-butyl, sec-butyl, F, optionally substituted phenyl, or together with R¹² or together with R¹⁴ can form an optionally substituted polycyclic ring;

R¹⁴ is H, methyl, ethyl, iso-propyl, n-propyl, n-butyl, tert-butyl, sec-butyl, optionally substituted phenyl, or together with R¹³ can form an optionally substituted polycyclic ring.

R¹⁹ is H, methyl, ethyl, n-propyl, iso-propyl, n-butyl, tert-butyl, cyclohexyl, cyclopentyl or phenyl;

R²⁰ is H, methyl, ethyl, n-propyl, iso-propyl, n-butyl, tert-butyl, cyclohexyl, cyclopentyl or phenyl;

R²¹ is H, optionally substituted $C_{1-24}$ alkyl, halogen, —C(O)R²⁵, —OR²⁶, CN, —NR²⁷R²⁸, NO₂, —CF₃, —S(O)ₓR²⁹, —P(O)(OH)₂, —OP(O)(OH)₂, —SR³¹, optionally substituted heterocycle, optionally substituted $C_{3-10}$ cycloalkyl, optionally substituted $C_{5-24}$ aryl, optionally substituted $C_{3-8}$ cycloalkenyl or together with R²⁰ or together with R²² can form a polycyclic ring;

R²² is H, methyl, ethyl, n-propyl, iso-propyl, n-butyl, tert-butyl, cyclohexyl, cyclopentyl or phenyl;

R²³ is H, methyl, ethyl, n-propyl, iso-propyl, n-butyl, tert-butyl, cyclohexyl, cyclopentyl or phenyl;

R²⁴ is H, methyl, ethyl, n-propyl, iso-propyl, n-butyl, tert-butyl, cyclohexyl, cyclopentyl or phenyl;

R²⁵ is OH, OR³⁰, NR²⁷R²⁸, methyl, ethyl, n-propyl, iso-propyl, n-butyl, tert-butyl, cyclohexyl, cyclopentyl or phenyl;

R²⁶ is H, methyl, ethyl, n-propyl, iso-propyl, n-butyl, tert-butyl, cyclohexyl, cyclopentyl or phenyl;

R²⁷ is H, methyl, ethyl, n-propyl, iso-propyl, n-butyl, tert-butyl, cyclohexyl, cyclopentyl or phenyl;

R²⁸ is H, methyl, ethyl, n-propyl, iso-propyl, n-butyl, tert-butyl, cyclohexyl, cyclopentyl or phenyl;

R²⁹ is H, methyl, ethyl, n-propyl, iso-propyl, n-butyl, tert-butyl, OR²⁶, —NR²⁷R²⁸, cyclohexyl, cyclopentyl or phenyl;

R³⁰ is methyl, ethyl, n-propyl, iso-propyl, n-butyl, tert-butyl, cyclohexyl, cyclopentyl or phenyl;

R³¹ is H, methyl, ethyl, n-propyl, iso-propyl, n-butyl, tert-butyl, cyclohexyl, cyclopentyl or phenyl;

x is 1 or 2.

In one embodiment, L¹ is

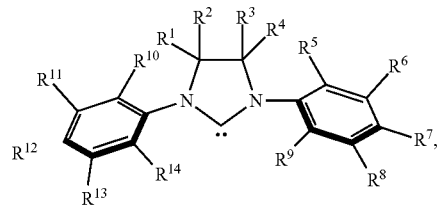

wherein:
R¹ is H;
R² is H;
R³ is H;
R⁴ is H;
R⁵ is H, methyl, iso-propyl;
R⁶ is H;
R⁷ is H, methyl;
R⁸ is H;
R⁹ is H, methyl, iso-propyl;
R¹⁰ is H, methyl, iso-propyl;
R¹¹ is H;
R¹² is H, methyl;
R¹³ is H;
R¹⁴ is H, methyl, iso-propyl;
X¹ and X² are Cl;
W is O;
R¹⁹ is iso-propyl;
R²⁰ is H;
R²¹ is H;
R²² is H;
R²³ is H; and
R²⁴ is H.

In some embodiments, the metal carbene olefin metathesis catalysts used in the invention can be represented by general structures:

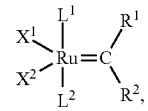

Formula (3)

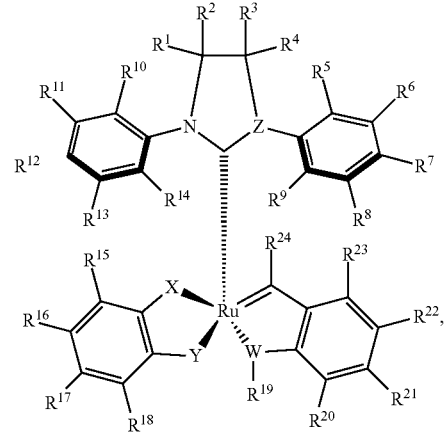

Formula (4)

Formula (6)
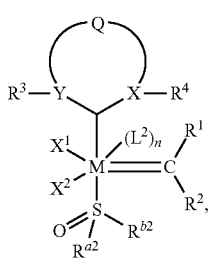
Formula (7)
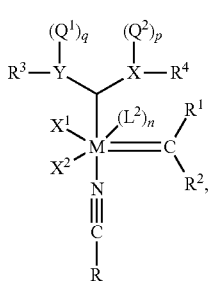
Formula (5)
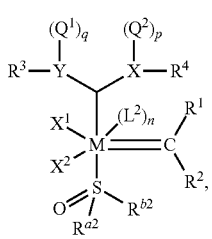
Formula (9)
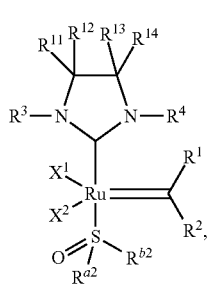
Formula (8)
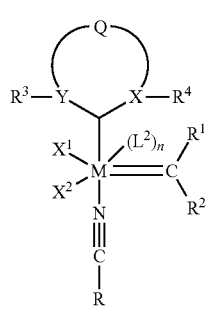
Formula (10)
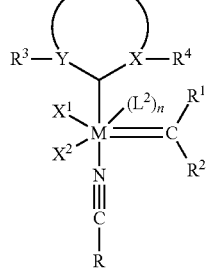
Formula (11)
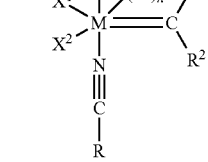
Formula (12)
Formula (13)
Formula (14)

Formula (15)
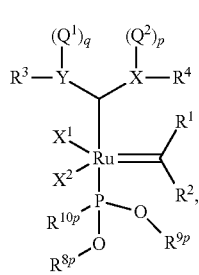
Formula (16)
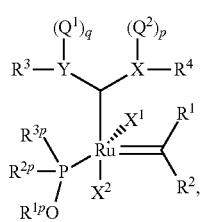
Formula (17)
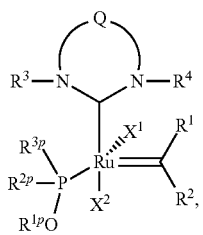
Formula (18)
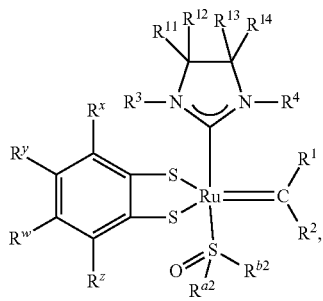
Formula (19)
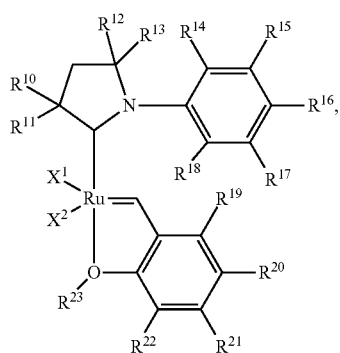
Formula (20)
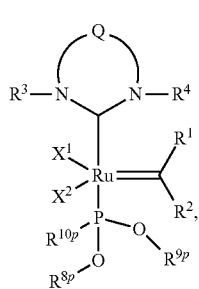
Formula (21)
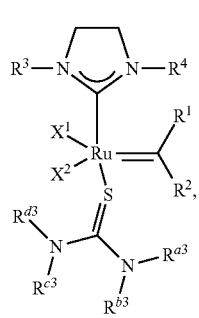
Formula (22)
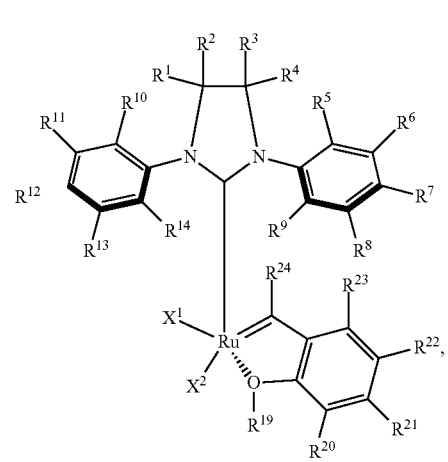
Formula (23)
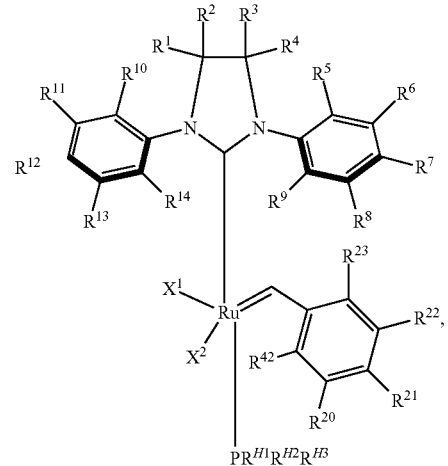

Formula (24)

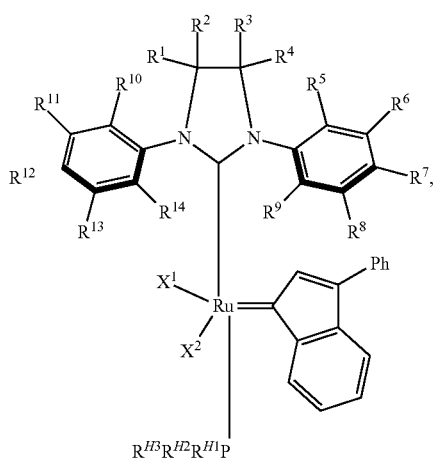

Formula (25)

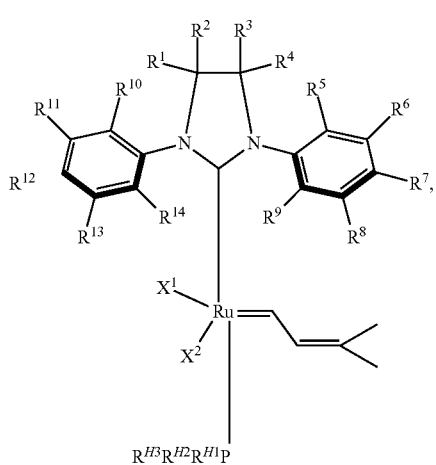

Formula (26)

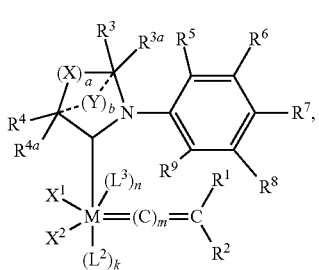

Formula (22)

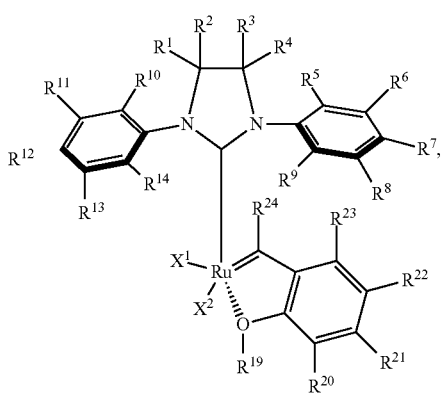

Formula (23)

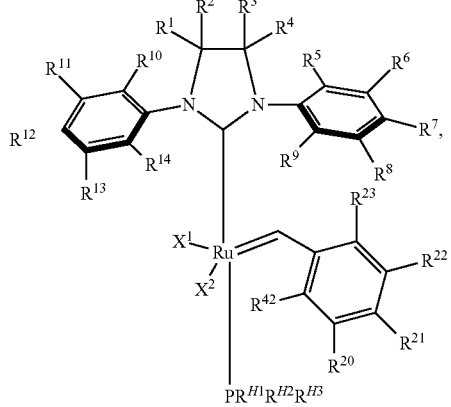

Formula (24)

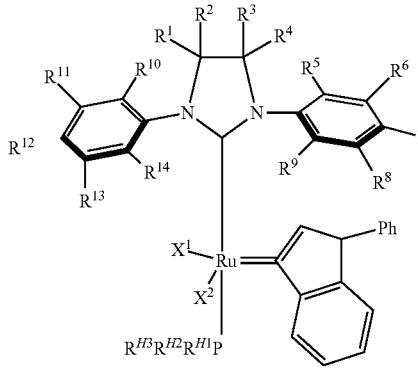

Formula (25)

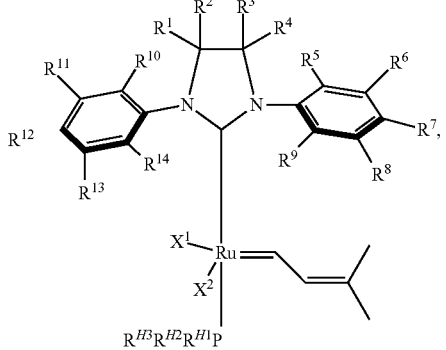

wherein Q, $Q^1$, $Q^2$, p, q, $X^1$, $X^2$, $X^3$, $X^4$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{20}$, $R^{21}$, $R^{22}$, $R^{23}$, $R^{24}$, $R^{a2}$, $R^{b2}$, $R^{a3}$, $R^{b3}$, $R^{c3}$, $R^{d3}$, $R^{1p}$, $R^{2p}$, $R^{3p}$, $R^{H1}$, $R^{H2}$, $R^{H3}$, $-(L^2)_n$- and $R^{42}$ are as defined herein.

Preferred metal carbene olefin metathesis catalysts used in the invention are encompassed by Formulae:

wherein $X^1$, $X^2$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{19}$, $R^{20}$, $R^{21}$, $R^{22}$, $R^{23}$, $R^{24}$, $R^{H1}$, $R^{H2}$, $R^{H3}$ and $R^{42}$ are as defined herein.
Most preferred metal carbene olefin metathesis catalysts used in the invention are encompassed by Formulae:
Formula (22)
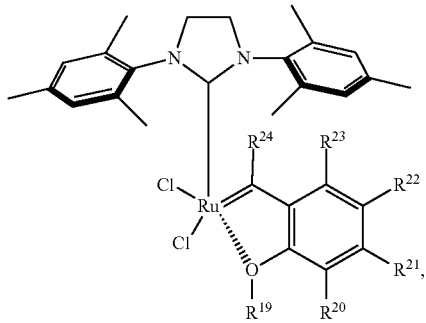
Formula (22)
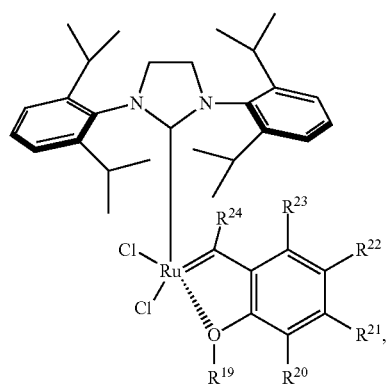
C627
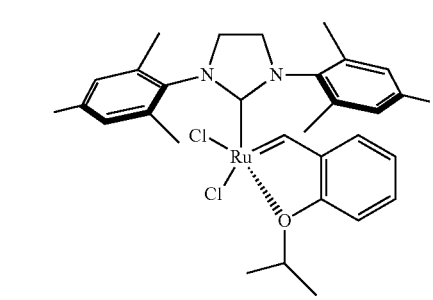
Formula (23)
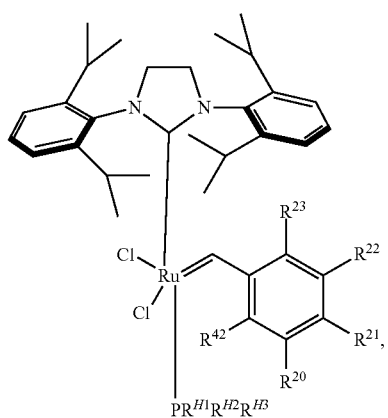
C835
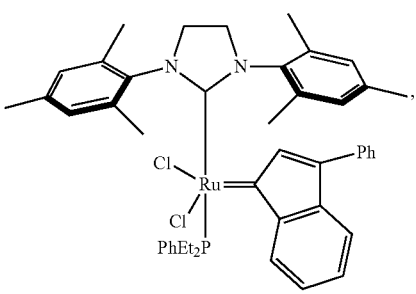
Formula (23)
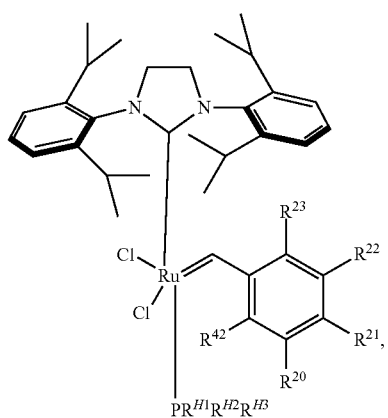
C848
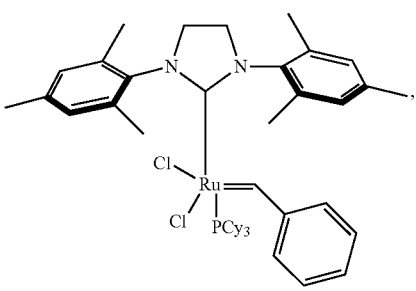
Formula (24)
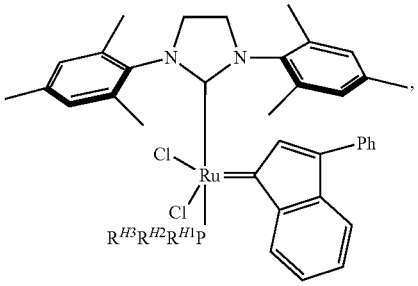
Formula (25)
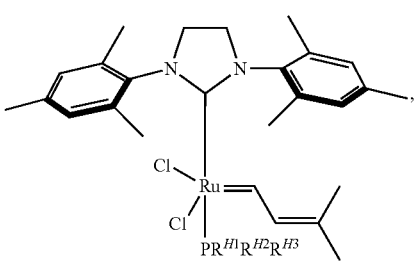

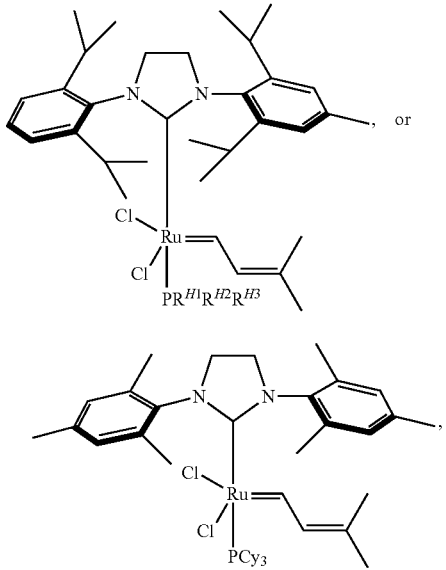

Formula (25), or

C827 wherein: $R^{19}, R^{20}, R^{21}, R^{22}, R^{23}, R^{24}$, Cy, $R^{H1}, R^{H2}, R^{H3}$ and $R^{42}$ are as defined herein.

It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of olefin to catalyst, the catalyst (the "olefin to catalyst ratio"), loading will generally be present in an amount that ranges from a low of about 10,000,000:1, 1,000,000:1, 500,000:1 or 200,00:1, to a high of about 100,000:1 60,000:1, 50,000:1, 45,000;1, 40,000:1, 30,000:1, 20,000:1, 10,000:1, 5,000:1, or 1,000:1.

Coating Compositions of the Invention

In one embodiment, the invention provides coating compositions comprising ring opening metathesis polymerization compositions, which comprise at least one cyclic olefin, and at least one metal carbene olefin metathesis catalyst. In a fast-cure coating composition of the invention the at least one metal carbene olefin metathesis catalysts is preferably a catalyst of Formula (1) where $L^1$ is

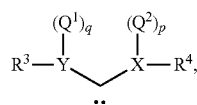

as defined above, and $L^2$ is a triarylphosphine and/or a catalyst of Formula (2) where $L^1$ is

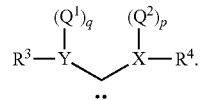

Preferred embodiments of $L^1$ and $L^2$ and catalyst containing them are described above and shown in the Examples.

The coating composition comprises at least one cyclic olefin represented by Formula (I), by Formula (II), and by Formula (III); may optionally contain a linear olefin represented by Formula (IV); and at least one metal carbene olefin metathesis catalyst represented by Formula (1), wherein Formulae (I), (II), (III), (IV) and (1) are as defined herein.

The coating composition comprises at least one cyclic olefin represented by Formula (I), by Formula (II), by Formula (III), and at least one metal carbene olefin metathesis catalyst represented by Formula (1), wherein Formulae (I), (II), (III), and (1) are as defined herein.

The coating composition comprises at least one cyclic olefin represented by Formula (I), and by Formula (II) and at least one metal carbene olefin metathesis catalyst represented by Formula (1), wherein Formulae (I), (II) and (1) are as defined herein.

The coating composition comprises at least one cyclic olefin represented by Formula (I), and by Formula (III), and at least one metal carbene olefin metathesis catalyst represented by Formula (1), wherein Formulae (I), (III) and (1) are as defined herein.

The coating composition comprises at least one cyclic olefin represented by Formula (II), and by Formula (III) and at least one metal carbene olefin metathesis catalyst represented by Formula (1), wherein Formulae (II), (III) and (1) are as defined herein.

The coating compositions of the invention contain at least one coating additives known in the art. Suitable coating additives may include, but are not limited to, gel modifiers, hardness modulators, impact modifiers, fillers, binders, thixotropes, rheology modifiers, dispersants, wetting agents, plasticizers, pigments, flame retardants, dyes, fibers, reinforcement materials, coupling agents, adhesion promoters, film formers, lubricants, and stabilizers such as, for example, antioxidants, antiozonants, UV absorbers, and UV light stabilizers and other stabilizers known in the art. Furthermore, the amount of an additive added to the resin compositions may vary, depending on the particular type of additive. The coating additive and the coating additive loading should not interfere with curing a coating composition of the invention. Care should be taken when using chemistries that are known to inhibit ring-opening polymerization. The concentration of the coating additives in the coating compositions typically ranges from, for example, 0.001-95 percent by weight, particularly, from 0.1-75 percent by weight, or even more particularly, from 1-60 percent by weight, 5-70 percent by weight, 10-60 percent by weight, or from 20-60 percent by weight.

Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers.

Suitable antioxidants or antiozonants include without limitation: primary antioxidants such as 2,6-di-tert-butyl-4-methylphenol (BHT); styrenated phenols, such as Wingstay® S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenols, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction products of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis(2,6-di-tertiary-butylphenol), e.g., Ethanox 4702 or Ethanox 4710; 1,3,5-tris(3,5-di-tert-butyl-4-hydroxybenzyl)isocyanurate, i.e., Good-rite 3114; 2,5-di-tert-amylhydroquinone; tert-butylhydroquinone; 1,6-hexamethylene bis(3-(3,5-di-tert-butyl-4-hydroxyphenylpropionate), such as Irganox 259; octadecyl-3,5-di-tert-butyl-4-hydroxyhydrocinnamate, i.e., Irganox 1076; diphenylamine; 4,4'-diemthoxydiphenylamine; secondary antioxidants such as tris(nonylphenylphosphite); bis(2,4-di-tert-butyl)pentaerythritol)diphosphate; distearyl pentaerythritol diphosphite; phosphited phenols and bisphenols, such as Naugard 492; phosphite/phenolic antioxidant blends, such as Irganox B215; di-n-octadecyl(3,5-di-tert-butyl-4-hydroxybenzyl)phosphonate, such as Irganox 1093; tetrakis(2,4-di-tert-butylphenyl)4,4'-biphenylylenediphosphonite; esters of thiodipropionic acid such as Irganox PS 802, Irganox PS 800, and Cyanox MTDP. Such materials are normally employed in the compositions of the invention at levels of about 0.10%-10% percent by weight, or more preferably at levels of about 0.1%-5% percent by weight.

As mentioned above, UV absorbers and UV light stabilizers are two examples of the type of stabilizers which may be used in a coating composition of the invention. Suitable UV absorbers include nickel quenchers, benzophenones, benzotriazoles, benzyldene malonates, triazines, etc. Suitable UV light stabilizers include hindered amines, etc. The blend of various UV absorbers and UV light stabilizers are also suitable to provide protection against UV. Some suitable UV absorbers include 2-(2H-benzotriazol-2-yl)-p-cresol, 2-tert-Butyl-6-(5-chloro-2H-benzotriazol-2-yl)-4-methylphenol, and 2,2'-Methylenebis[6-(2H-benzotriazol-2-yl)-4-(1,1,3,3-tetramethylbutyl)phenol], 2-hydroxy-4-methoxybenzophenone and 2-hydroxy-4-octyloxybenzophenone, as 2-(4,6-Diphenyl-1,3,5-triazin-2-yl)-5-[(hexyl)oxy]-phenol; oxanilide UV absorbers such as N-(2-ethoxyphenyl)-N'-(2-ethylphenyl)oxamide, Dimethyl 2-(4-Methoxybenzylidene) malonate, bis(1,2,2,6,6-pentamethyl-4-piperidyl) sebacate, methyl 1,2,2,6,6-pentamethyl-4-piperidyl sebacate, bis(1,2,2,6,6-pentamethyl-4-pperidyl)sebacate, bis(1-octyloxy-2,2,6,6-tetramethyl-4-piperidyl) sebacate, LOWILITE® Q84 and POLYBATCH® LLUVS 110, Tinuvin 1130, Tinuvin 171, Tinuvin 328, Tinuvin 384-2, Tinuvin 900, Tinuvin 928, Tinuvin 99, Tinuvin 5050, Tinuvin 5060, Tinuvin 5151, Tinuvin 5248, Tinuvin 5251, Tinuvin 5350, Tinuvin 123, Tinuvin 144, Tinuvin 152, Tinuvin 249, Tinuvin 292, Tinuvin 400, Tinuvin 405, Tinuvin 460, Tinuvin 477, Tinuvin 479 (BASF), Chimassorb 81, Chimassorb 944, Chimassorb 2020 (BASF), KEMISORB 10, KEMISORB 11, KEMISORB 111 (Chemipro Kasei Ksisha), BP-2, BP-3, BP-6, BP-9 (Dalian Richfortune Chemicals), Ultra V 301 (Dover, ICI Industries), Grandsorb BP-1, Grandsorb BP-2, Grandsorb BP-4, Grandsorb BP-6 (Hongkun Group), Speed-Block UV-6 (Lamsson), Maxgard 1000, Maxgard 300, Maxgard 400, Maxgard 500, Maxgard 600, Maxgard 700 (Lycus), Cyasorb UV-3346, Hostavin N 30 and the like. Such stabilizers can be used as individual components or in combination with other stabilizers known in the art for coating compositions. Such materials are normally employed in the compositions of the invention at levels of about 0.10 wt % to 10 wt %, but more preferably at levels of about 0.1 wt % to 5 wt %.

Suitable fillers include, for example, microparticulate density modulators, such as, microspheres, or macroparticulate density modulators, for example: glass or ceramic beads. Other suitable fillers are inorganic fillers such as, for example, aluminum powder, aluminum flakes (e.g., aluminum flake paste), glass flakes, micaceous iron oxide, calcium carbonate, dolomite, silicas, silicates, talc, kaolin, mica, feldspar, barium sulfate and wollastonites, carbon nanotubes, graphene. Preferred inorganic fillers include aluminum powder, aluminum flakes, micaceous iron oxide, mica, glass fibers, wollastonite, calcium carbonate, silica and mixtures thereof, with flake-like fillers also being preferred. Preferably, the filler is aluminum powder or aluminum flakes (e.g., aluminum flake paste), or alloys thereof. The aluminum powder or aluminum flake may be used alone or in combination with other fillers, such as those mentioned previously. For example, aluminum flake paste may be used alone or in combination with micaceous iron oxide. The fillers, particularly the preferred fillers, may be present in the coating compositions of the invention in any suitable amount, such as about 0.01 to about 95 percent by weight, about 1 to about 95 percent by weight, about 5 to about 95 percent by weight, about 1 to about 30 percent by weight, preferably about 0.01 to about 25 percent by weight, preferably about 10 about 80 percent by weight, preferably about 5 about 70 percent by weight, preferably about 10 about 60 percent by weight, preferably about 20 about 50 percent by weight, and most preferably about 15 to about 40 percent by weight. The aluminum flakes may have a particle size ranging from about 2 to about 50 microns, preferably about 5 to about 30 microns, most preferably about 10 to about 20 microns. Metallic flakes such as zinc, aluminum, magnesium, nickel, etc. can be added as inorganic fillers to coatings as sacrificial anodes to provide cathodic protection. They can also be used in combination with electrically conducting fillers as taught in U.S. Pat. No. 7,794,626 to provide galvanic anti-corrosion protection to the substrates.

Suitable dyes or pigments include MO 02294 black, MO-80406BV-Yellow from Chromaflo, and white pigment powder TI-PURE from Dupont.

Suitable adhesion promoters include isocyantes and their derivatives; phosphorous containing compounds such as phosphoric acids and phosphate ester containing compounds; sulfonic acid, sulfonate and sulfate containing compounds; carboxylic acid and carboxylate containing compounds; maleic-modified esters; organofunctional silanes; organometallic compounds such as zirconates, zircono aluminates and titanates; chlorinated olefins, etc. Some suitable adhesion promoters are carbamic acid [3-(triethoxysilyl)propyl]-bicyclo[2.2.1]hept-5-en-2-ylmethyl ester (NBCbSi), 3-(trimethoxysilyl)propyl methacrylate, [(5-bicyclo[2.2.1]hept-2-enyl)ethyl]trimethoxysilane, 5-bicyclo[2.2.1]hept-2-enyl)methyldichlorosilane, (5-bicyclo[2.2.1]hept-2-enyl)triethoxysilane, (5-bicyclo[2.2.1]hept-2-enyl)methyldiethoxysilane, (5-bicyclo[2.2.1]hept-2-enyl)dimethylethoxysilane, (3-acryloxypropyl)trimethoxysilane, n-(2-aminoethyl)-3-aminopropyltrimethoxysilane, (3-triethoxysilyl)propylsuccinic anhydride, 2-(3,4-epoxycyclohexyl)ethyltriethoxysilane, ((chloromethyl)phenylethyl)trimethoxysilane, 3-(guanidinyl)propyltrimethoxysilane, n,n-bis(2-hydroxyethyl)-3-aminopropyltriethoxysilane, styrylethyltrimethoxysilane, methacryloxymethyltrimethoxysilane, vinyltriethoxysilane, ureidopropyltriethoxysilane, 3-isocyanatopropyltriethoxysilane, triethoxysilyl modified poly-1,2-butadiene, bis(methyldiethoxysilylpropyl)amine, [2-(3-cyclohexenyl)ethyl]triethoxysilane, hexadecafluorododec-11-en-1-yltrimethoxysilane or mixtures of 2-hydroxyethyl bicyclo[2.2.1]hept-2-ene-5-carboxylate (HENB). Other typical adhesion promoters include coupling agents such as organosilanes (3-isocyanatopropyl triethoxysilane, bicyclo[2.2.1]hept-5-en-2-yl)ethyltrimethoxysilane), organozirconates, organotitanates (Manchem® products (Manchem® Zircoaluminates) (FedChem, LLC) (e.g., Manchem® A, Manchem® APG-X, Manchem® APG-1, Manchem® APG-2, Manchem® APG-3, Manchem® C, Manchem® CPG, Manchem® CPM, Manchem® F, Manchem® FPM, Manchem® M, Manchem® S, Manchem® 376, Manchem® 441) and Kenrich Petrochemicals products such as KR 55 (Titanium IV tetrakis(bis 2-propenolato methyl)-1-butanolato adduct 2 moles (di-tridecyl)hydrogen phosphite), KZ® TPPJ (Zirconium IV (2-ethyl, 2-propenolatomethyl)1,3-propanediolato, cyclo bis 2-dimethylamino pyrophosphato-O, adduct with 2 moles of methanesulfonic acid), KZ® 55 (Zirconium IV tetrakis 2,2(bis-2 propenolatomethyl)butanolato, adduct with 2 moles of di-tridecyl, hydrogen phosphite); phosphate and phosphate esters-containing resins (Sipomer PAM products from Solvay) (e.g., Sipomer PAM-100 (Phosphate esters of polyethylene glycol monomethacrylate), Sipomer PAM-200). Also other Sipomer products from Solvay containing other polar functional groups such as Sipomer WAM products, Sipomer WAM II products, Sipomer COPS-1 products, Sipomer D-CEA, Sipomer BEM, Sipomer IBOA, Sipomer IBOMA, Sipomer SEM-25); carboxylic acid and anhydride-containing resins (Nucrel from DuPont (ethylene acrylic acid copolymer), Escor EAA copolymers from ExxonMobil Chemicals, POLYBOND (acrylic acid grafted polypropylene) from Addivant. Anhydride-containing resins such as FG1901, FG1924 (SEBS grafted with maleic anhydride) from Kraton, ROYALTUF 485, ROYALTUF 498 (EPDM polymers modified with maleic anhydride) from Addivant); isocyanate-containing resins (hexamethylene diisocyanate (HDI); 5-isocyanato-1-(isocyanatomethyl)-1,3,3-trimethyl-cyclohexane (commonly known as isophorone diisocyanate or IPDI); tetramethylxylene diisocyanate (TMXDI), methylene diphenyl diisocyanate (MDI—which may comprise any mixture of its three isomers 2,2'-MDI, 2,4'-MDI, and 4,4'-MDI); 4,4'methylene bis(cyclohexyl isocyanate) (H12MDI); hexamethylene-diisocyanatetrimer (HDIt); toluene diisocyanate (TDI—which may comprise any mixture of 2,4-TDI and 2,6-TDI); 2-biphenylyl isocyanate; 4-benzylphenyl isocyanate; toluene diisocyanates; PM200 (poly MDI), Lupranate® (poly MDI from BASF), Krasol® isocyanate terminated polybutadiene prepolymers, Krasol® LBD2000 (TDI based), Krasol® LBD3000 (TDI based), Krasol® NN-22 (MDI based), Krasol® NN-23 (MDI based), Krasol® NN-25 (MDI based); MDI prepolymer (Lupranate® 5080); liquid carbodiimide modified 4,4'-MDI (Lupranate® MM103); liquid MDI (Lupranate® MI); liquid MDI (e.g., Mondur® ML or Mondur® MLQ, which is a 50/50 blend of 4,4'-MDI and 2,4-MDI), or 2-hydroxyethyl acrylate (HEA) and liquid MDI (Mondur® MLQ), or 9-decen-1-ol and liquid MDI (Mondur® MLQ), or oleyl alcohol and liquid MDI (Mondur® MLQ). The ratio between the alcohol and the liquid MDI varies from 1:1 to 1:10; bicyclo[2.2.1]hept-5-ene-2-carboxylic acid, and 2-[[[[4-[(4-isocyanatophenyl)methyl]phenyl]amino]carbonyl]oxy]ethyl ester); chlorinated polyolefins such as Eastman CP 343-1, CP343-3, CP515-2, CP-164-1 (Eastman Chemical); Hardlen 13LP (Advanced Polymer); KEPRADH 949, 951, 958, 980, 982 (Kito Chemical); Lanco Intercoat VPP 154, 555 (Lubrizol); HARDLEN 15-LP, BS-40, CY-1132, CY-9122P, CY-9124P; TRAPYLEN 112X, 130X, 135X, 137X, 138S (Tramaco); Special-Primer PP 7560 (Worlee).

Suitable rheology modifiers and anti-settling agents include inorganic and organic rheology modifiers. Inorganic rheology modifiers include clays and organoclays of hectorite, bentonite, attapulgite, kaoline, pyrophilite and talc; minerals such as fumed silica, precipitated silica, precipitated calcium carbonate, and montmorillonite, metal organic gellants such as zirconates, aluminates. Organic rheology modifiers include castor oil derivatives, modified polyurea, polyamides, calcium sulfonates, cellulose, shydrophobic ethoxylated urethane resins, Examples of suitable rheology modifiers include fumed silica such as Cab-O-Sil TS610, TS720 from Cabot Corp and AEROSIL 972, AEROSIL 974 from Evonik, organoclay such as BENTOLITE L-10, BENTOLITE-WH, CLAYTONE 40, CLAYTONE AF, MINERAL COLLOID BP, Caramite 7303 from BYK Chemie, USA; Bentonite 149, Betonite 329, Bentonite 331, Bentonite 344 from Brentag Specialties, Attagel from BASF and the like, polyaminoamide phosphate, high molecular weight carboxylic acid salts of polyamine amides, and alkylene amine salts of an unsaturated fatty acid, all available from BYK Chemie USA as ANTI TERRA™, polyamide modified castor oil derivatives such as Luvotix ZH5, Luvitix ZH50 from Lehmann & Voss; micronized amide wax such as Crayvallac SUPER from Arkema.

A coating composition of the invention may contain additives such as dispersants/dispersing agents (surfactants) known in the art. Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinic acid, disodium alkyl amido polyethoxy sulfosuccinate, tetrasodium N-(1,2-dicarboxy ethyl)-N-oxtadecyl sulfosuccinnamate, disodium N-octasulfosuccinnamate, sulfated cthoxvlated nonylphenol, 2-amino-2-methyl-1-propanol, and the like.

The compositions of this invention containing functional monomers may be optionally formulated with other reactive chemistries to form co-cured coatings. The co-curing process may form interpenetrating polymer networks; for example, a co-cured polyurethane can form from a polyol and a diisocyanate; a co-cured epoxy can form from a bisepoxide and a hardener such as an anhydride, amine, or thiol. Care should be taken when using chemistries that are known to inhibit ring-opening polymerization. Copolymeric coatings may be formed if bifunctional monomers are incorporated; for example, isocyanate- or alcohol-containing olefinic comonomers can copolymerize urethanes with the compositions of the invention, and epoxide-containing comonomers can copolymerize epoxies with the compositions of the invention. Other polymers such as polysiloxanes, polyureas, and acrylics can be incorporated into the compositions of the invention.

EMBODIMENTS OF THE INVENTION

In one embodiment the invention provides a method for coating at least a portion of at least one surface of a substrate with a coating composition, comprising contacting at least a portion of the at least one surface of the substrate with the coating composition, wherein the coating composition comprises at least one cyclic olefin at least one curing agent, such as a metal carbene olefin metathesis catalyst, and at least one coating additive; and subjecting the coated substrate to conditions effective to promote an olefin metathesis reaction of the at least one cyclic olefin in the presence of the at least one curing agent, e.g. a metal carbene olefin metathesis catalyst. The substrate surface is preferably a clean surface but coating compositions of the invention may also be applied to "dirtier" surfaces than conventional epoxy-based coating compositions. A method of the invention may also apply a UV resistance topcoat over the coatings to provide protection against UV degradation as known in the art. A method of the invention accordingly produces an article of manufacture coated with a cured coating composition of the invention.

The adhesion to the substrate can be achieved by priming the substrate with an adhesion promoter or by adding an adhesion promoter as a coating additive to the coating formulation or by substituting the cyclic olefins with functional groups which would facilitate the adhesion to the substrate.

In one embodiment the invention provides a method for coating a steel substrate material, comprising:
blasting the steel surface with blasting media according to SSPC SP10 standards;
optionally applying an adhesion promoter onto the steel surface evenly;
applying a coating composition comprising at least one cyclic olefin, at least one metal carbene metathesis catalyst, and at least one additive (preferably, aluminum powder or aluminum flakes);
curing the coating applied on the steel surface at a temperature between 5° C. to 150° C.

In one embodiment the invention provides a method for coating a steel substrate material, comprising:
blasting the steel surface with blasting media according to SSPC SP10 standards;
applying the optional adhesion promoter onto the steel surface evenly;
applying a coating composition comprising at least one cyclic olefin represented by Formula (I), by Formula (II), and by Formula (III); and optionally a linear olefin represented by Formula (IV)

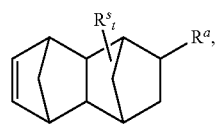

Formula (I)

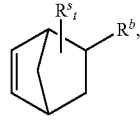

Formula (II)

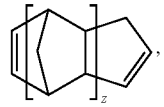

Formula (III)

$R^c \sim\!\!\!=\!\!\!\sim R^d$,

Formula (IV)

wherein:
$R^a$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, —CN, —NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR°R$^p$, —C(R$^h$)(R$^i$)C(O)NR°OR$^n$;

$R^b$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, —CN, —NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, spiro optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR°R$^p$, —C(R$^h$)(R$^i$)C(O)NR°OR$^n$;

$R^c$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C(R$^h$)(R$^i$)COOR$^j$, —C(R$^h$)(R$^i$)C(O)H, —C(R$^h$)(R$^i$)C(O)R$^k$, —C(R$^h$)(R$^i$)CR$^l$(OR$^m$)(OR$^n$), —C(R$^h$)(R$^i$)C(O)NR°R$^p$, —C(R$^h$)(R$^i$)C(O)NR°OR$^n$;

$R^d$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —OR$^g$, —CH$_2$—OR$^g$, CN, NO$_2$, —CF$_3$, —P(O)(OR$^h$)$_2$, —OP(O)(OR$^h$)$_2$, —S(O)$_2$OR$^h$, —OS(O)$_2$R$^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;

each $R^s$ is independently optionally substituted linear or branched $C_{1-24}$ alkyl, optionally substituted linear or branched $C_{2-24}$ alkenyl, halogen, —$C(O)R^f$, —$CH_2$—$C(O)R^f$, —$OR^g$, —$CH_2$—$OR^g$, —$CN$, —$NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, —$C(R^h)(R^i)C(O)NR^oOR^n$;

t is 0, 1, 2, 3, 4, 5 or 6;

R is OH, $OR^k$, $NR^gR^h$, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^k$ is optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl; and $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl or optionally substituted $C_{3-12}$ cycloalkenyl.

z is 0, 1, 2 or 3;

and at least one metal carbene metathesis catalyst, and at least one additive (preferably, aluminum powder or aluminum flakes); and curing the coating applied on the steel surface at a temperature between 5° C. to 150° C.

In one embodiment the invention provides a method for coating a steel substrate material, with a coating composition wherein the coating comprises at least one metal carbene olefin metathesis catalyst represented by Formula (1),

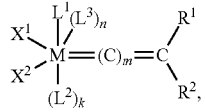

Formula (1)

wherein:

M is ruthenium;

$L^1$, $L^2$ and $L^3$ are independently neutral electron donor ligands;

n is 0 or 1;

m is 0, 1 or 2;

k is 0 or 1;

$X^1$ and $X^2$ are independently anionic ligands; and $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form one or more cyclic groups.

In one embodiment the invention provides a method for coating a steel substrate material, with a coating composition wherein the coating comprises at least one metal carbene olefin metathesis catalyst represented by Formula (1), wherein:

L is

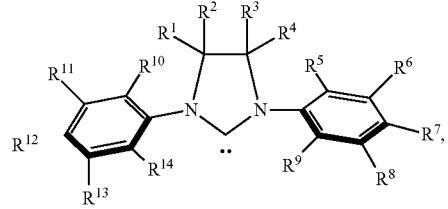

$R^1$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-24}$ alkyl, halogen, —$C(O)R^{25}$, —$OR^{26}$, CN, —$NR^{27}R^{28}$, —$NO_2$, —$CF_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl or together with R$^1$ can form a spiro compound or together with R$^3$ or together with R$^4$ can form a polycyclic ring;

R$^3$ is H, optionally substituted C$_{1-24}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl or optionally substituted C$_{3-8}$ cycloalkenyl or together with R$^2$ or together with R$^1$ can form a polycyclic ring or together with R$^4$ can form a spiro compound;

R$^4$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^3$ can form a spiro compound or together with R$^2$ or together with R$^1$ can form a polycyclic ring;

R$^5$ is H, optionally substituted C$_{1-24}$ alkyl, halogen, —C(O)R$^{25}$, —OR$^{26}$, CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^6$ can form an optionally substituted polycyclic ring;

R$^6$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^5$ or together with R$^7$ can form an optionally substituted polycyclic ring;

R$^7$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl optionally substituted C$_{3-8}$ cycloalkenyl, or together with R$^6$ or together with R$^8$ can form an optionally substituted polycyclic ring;

R$^8$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^7$ or together with R$^9$ can form an optionally substituted polycyclic ring;

R$^9$ is H, optionally substituted C$_{1-24}$ alkyl, halogen, —C(O)R$^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^8$ can form an optionally substituted polycyclic ring;

R$^{10}$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^1$ can form an optionally substituted polycyclic ring;

R$^{11}$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl or together with R$^{10}$ or together with R$^{12}$ can form an optionally substituted polycyclic ring;

R$^{12}$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^{11}$ or together with R$^{13}$ can form an optionally substituted polycyclic ring;

R$^{13}$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^{14}$ or together with R$^{12}$ can form an optionally substituted polycyclic ring;

R$^{14}$ is H, optionally substituted C$_{1-24}$ alkyl, halogen, —C(O)R$^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted C$_{3-10}$ cycloalkyl, optionally substituted C$_{5-24}$ aryl, optionally substituted C$_{3-8}$ cycloalkenyl, or together with R$^{13}$ can form a polycyclic ring;

R$^{25}$ is —OH, —OR$^{30}$, —NR$^{27}$R$^{28}$, optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl;

R$^{26}$ is H, optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl;

R$^{27}$ is H, optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl;

R$^{28}$ is H, optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl;

R$^{29}$ is H, optionally substituted C$_{1-24}$ alkyl, —OR$^{26}$, —NR$^{27}$R$^{28}$, optionally substituted heterocycle, optionally substituted C$_{3-10}$ cycloalkyl, optionally substituted C$_{5-24}$ aryl or optionally substituted C$_{3-8}$ cycloalkenyl;

R$^{30}$ is optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl;

R$^{31}$ is H, optionally substituted C$_{1-24}$ alkyl, optionally substituted C$_{3-10}$ cycloalkyl, optionally substituted heterocycle, optionally substituted C$_{5-24}$ aryl or optionally substituted C$_{3-8}$ cycloalkenyl; and x is 1 or 2.

In one embodiment the invention provides a method for coating a steel substrate material, with a coating composition wherein the coating comprises at least one metal carbene olefin metathesis catalyst represented by Formula (1), wherein: $L^2$ is $PR^{H1}R^{H2}R^{H3}$ wherein: $R^{H1}$, $R^{H2}$, $R^{H3}$ are each independently optionally substituted $C_6$-$C_{10}$ aryl, or optionally substituted $C_1$-$C_{10}$ alkyl, or optionally substituted $C_3$-$C_{10}$ cycloalkyl.

In one embodiment the invention provides a method for coating a steel substrate material, with a coating composition wherein the coating comprises at least one metal carbene olefin metathesis catalyst represented by Formula (1), wherein: $R^1$ is hydrogen and $R^2$ is optionally substituted phenyl, $C_{1-6}$ alkyl or substituted 1-propenyl; or $R^1$ and $R^2$ are linked together to form one or more cyclic groups, such as a substituted indenylidene, specifically 3-phenylindenylid-1-ene.

In one embodiment the invention provides a method for coating a steel substrate material, with a coating composition wherein the coating composition comprises at least one cyclic olefin represented by Formula (I), by Formula (II) and by Formula (III); a coating additive; and at least one metal carbene olefin metathesis catalyst represented by Formula (1).

In one embodiment the invention provides a method for coating a steel substrate material, with a coating composition wherein the coating composition comprises at least one cyclic olefin represented by Formula (I), and by Formula (II); a coating additive; and at least one metal carbene olefin metathesis catalyst represented by Formula (1).

In one embodiment the invention provides a method for coating a steel substrate material, with a coating composition wherein the coating composition comprises at least one cyclic olefin represented by Formula (I), and by Formula (III); a coating additive; and at least one metal carbene olefin metathesis catalyst represented by Formula (1).

In one embodiment the invention provides a method for coating a steel substrate material, with a coating composition wherein the coating composition comprises least one cyclic olefin represented by Formula (II), and by Formula (III); a coating additive; and at least one metal carbene olefin metathesis catalyst represented by Formula (1).

The substrates to be coated may be of any configuration, any weight, any size, any thickness, and/or any geometric shape. Furthermore, the substrates to be coated may be constructed of any material including but not limited to metal such as steel, stainless steel, aluminum, copper, metal alloys, iron, nickel, titanium, and silver as well as stone, plastics, rubbers, polymers, wood, ceramics, glass, carbon, brick, fabrics, cement, or concrete.

The substrate surfaces to be coated may be partially or fully coated.

Methods of Applying the Coating Compositions of the Invention

The coating compositions of the invention can be applied to the substrate material to be coated/protected by several methods. These methods include without limitation: spraying, brushing, dipping, or rolling.

In one embodiment of the invention, the coating composition can be applied on the substrate material to be coated with a paint brush.

In one embodiment of the invention, the coating composition can be sprayed on the substrate material to be coated with a film spray gun, a conventional spray gun, a plural component sprayer, a high-volume low pressure (HVLP) or an airless applicator.

It is to be understood that while the invention has been described in conjunction with specific embodiments thereof, the description above as well as the examples that follow are intended to illustrate and not limit the scope of the invention. Other aspects, advantages, and modifications within the scope of the invention will be apparent to those skilled in the art to which the invention pertains.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees Celsius [° C.] and pressure is at or near atmospheric. Weight percent (wt %) and percent by weight are used interchangeably herein. Weight percent of the cyclic olefin compositions were determined from the percent area values obtained by gas chromatography.

GC Method used: Column: DB-5, 30 m×250 µm×0.25 µm film thickness or equivalent 5% Phenyl methyl Siloxane; Manufacturer: Agilent; GC and column conditions: Injector temperature: 280° C., Detector temperature: 310° C.; Oven temperature: Starting temperature: 50° C., hold time: 0.5 minute; Ramp rate 20° C./min to 210° C.; Ramp rate 5° C./min to 240° C.; Ramp rate 20° C./min to 280° C. hold time 2.5 minutes; Carrier gas: Helium 23.5 mL/min; Split ratio: 20.0:1.0.

All glassware was oven dried and reactions were performed under ambient conditions unless otherwise noted. All solvents and reagents were purchased from commercial suppliers and used as received unless otherwise noted.

The ruthenium catalysts used in the experimental procedures were prepared using known methods.

Irganox® 1076 antioxidant (BASF) was used where indicated. Butylated hydroxytoluene (BHT) was used where indicated. Kraton 1901FG, CAB-O-SIL® Ultrabond, CAB-O-SIL TS610, CAB-O-SIL TS720 (Cabot corporation), 2-hydroxyethyl bicyclo[2.2.1]hept-2-ene-5-carboxylate (HENB) and liquid methylene diphenyl diisocyanate (MDI) (sold as Mondur® MLQ) were used where indicated.

DCPD (Ultrene® 99) was obtained from Cymetech Corporation. A representative lot of Ultrene® 99 comprised DCPD (99 wt %) and TCPD (1 wt %). A modified DCPD base resin containing 20-25 wt % TCPD (and small amounts of higher cyclopentadiene homologs) was prepared by heat treatment of Ultrene® 99 as described in U.S. Pat. No. 4,899,005.

TCPD was prepared as described in European Pat. No. EP0271007B2 and purified to greater than 95% by vacuum distillation.

A blend of HNB-DDA/TCPD (70/30) was prepared according to this procedure: 1-Octene (2.2 eq) and DCPD (1.0 eq) with small amounts of BHT were transferred to a reactor with rupture disk rating of 50 psi. The reactor was evacuated and refilled with nitrogen for 3 times. The solution was placed under maximum vacuum and the reactor was closed. The solution was gently stirred and heated up to 170° C., at which the solution was kept for 24 hours. The reactor was then cooled to room temperature. The lights, consisting of starting materials of 1-octene and DCPD, were flash-distilled at 70° C. under high vacuum. Flash distillation at 70-120° C. produced HNB enriched fraction. The fraction was further purified with metal-packed distillation column under high vacuum, yielding 98% pure HNB.

HNB (2.0 eq) and DCPD (1.0 eq) with small amounts of BHT were placed in a reactor with rupture disk rating of 50 psi. The solution underwent vacuum/nitrogen cycles 3 times. The solution was put under maximum vacuum and the reactor was closed. The mixture was heated to 170° C. with gentle stirring. The solution was kept at 170° C. for 20 hours and then cooled to room temperature. The unreacted HNB and DCPD were recovered by flash-distillation at 120° C. The HNB-DDA enriched fraction in TCPD was flash-distilled at 160-165° C.

NBCbSi was prepared according to Polymer Bulletin (1996) 37: 289-295.

HENB was prepared according to the following procedure: HEA (2-hydroxyethyl acrylate) (640 g, 1.0 mol eq.) was added to a 3 L round bottom flask containing toluene (1 kg). DCPD (dicyclopentadiene) (1.5 kg) was added to a separate 3 L round bottom flask, and the 3 L flask containing DCPD was affixed with a Vigreaux column and distillation head connected to the condenser. The 3 L flask containing HEA and toluene was connected to the condenser. The DCPD was heated to >160° C. under an inter atmosphere to "crack" the DCPD and form CPD (cyclopentadiene). The CPD (740 g, 2.0 mol eq.) was added dropwise to the HEA/toluene mixture at 10-40° C. under an inert atmosphere. Conversion of HEA to HENB (2-hydroxyethyl bicyclo[2.2.1]hept-2-ene-5-carboxylate) was monitored by GC (gas chromatography). Toluene and reformed DCPD (364 g) were removed from the reaction mixture by vacuum distillation to give the desired HENB product as a colorless liquid (1,004 g, quantitative yield, approx. 98% purity).

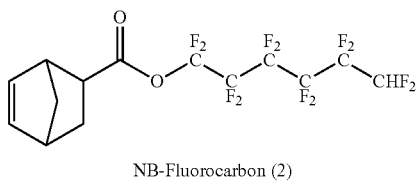 [SMILES: O=C(OC(F)(F)C(F)(F)C(F)(F)C(F)(F)C(F)(F)C(F)F)C1CC2C=CC1C2]

NB-Fluorocarbon (2)

2,2,3,3,4,4,5,5,6,6,7,7-Dodecafluoroheptyl bicyclo[2,2,1]hept-5-ene-2-carboxylate (39.5 g, 102 mmol) was placed in a 100 mL round-bottomed flask with a stir bar under nitrogen blanket. The flask was put into an ice water bath on the top of a magnetic stirrer. Cyclopentadiene (8.87 g, 134 mmol) was portion wise added to the acrylate in 2 hours. The mixture temperature elevated to 5-10° C. The ice/water bath was removed. The reaction was continued to stir through the night. Next day more cyclopentadiene (5 g, 76 mmol) was added. The reaction mixture was allowed to stir for another overnight. The product was purified by short path distillation under high vacuum (120 mtorr). Distillate at head temperature between 60-70° C. was collected. Yield: 42 g, 93%. Purity: 99% by GC.

A blend of ONB/TCPD (77/23) was prepared according to this procedure: 1-Decene (3 equivalents) and modified DCPD containing 20-25% tricyclopentadiene (1 equivalent) were combined in a 3-neck flask and heated to 160° C. on a heating mantle under an argon atmosphere for 12 hours. The temperature was increased to 170° C. for an additional 24 hours. After completion of the reaction, residual 1-decene and DCPD were removed from the reaction mixture by vacuum distillation at 70-80° C. Following removal of 1-decene and DCPD, the remaining mixture was heated to 100° C. and a 3:1 mixture of octyl norbornene:tricyclopentadiene was distilled overhead and collected as a homogeneous liquid. The collected octyl norbornene/tricyclopentadiene liquid mixture was treated with a small amount of butylated hydroxytoluene and stored under an argon atmosphere.

Low carbon steel of grade ASTM 4130 was purchased in 6"×6"×¼" panels from McMaster Carr. Each sheet was grit blasted using a working mix of G18/G25 steel grits. The blast profile was between 2-3 mils for every sample. After blasting, the steel substrate surface was cleaned with high pressure compressed air to remove particulates.

The following examples are to be considered as not being limiting of the invention as described herein and are instead provided as representative examples of compositions of the invention and methods for their use.

The following abbreviations are used in the examples:

| | |
|---|---|
| phr | weight in grams of the component per hundred grams of cyclic olefin composition |
| g | gram(s) |
| C827 | |

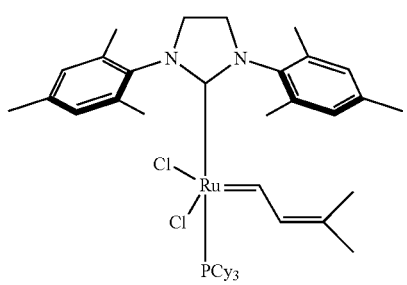

Dichloro[1,3-bis(2,4,6-trimethylphenyl)-2-imidazolidinylidene](3-methyl-2-butenylidene)(tricyclohexylphosphine) ruthenium(II) [CAS 253688-91-4]

C835

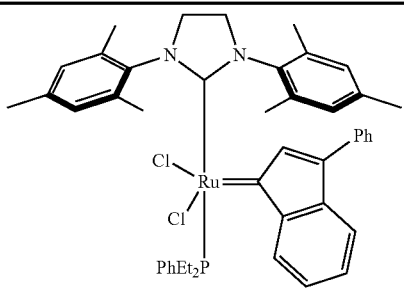

[1,3-bis-(2,4,6-trimethylphenyl)-2-imidazolidinylidene]dichloro (phenylindenylidene) (diethylphenylphosphine) ruthenium(II) [CAS 1624610-17-8]

C848

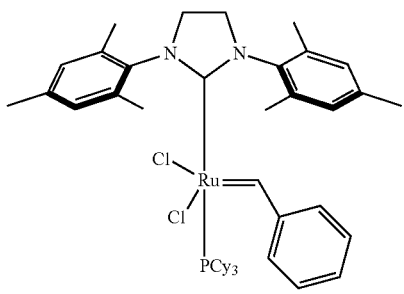

(1,3-Bis(2,4,6-trimethylphenyl)-2-imidazolidinylidene) dichloro (phenylmethylene)(tricyclohexylphosphine)ruthenium [CAS 246047-72-3]

C627

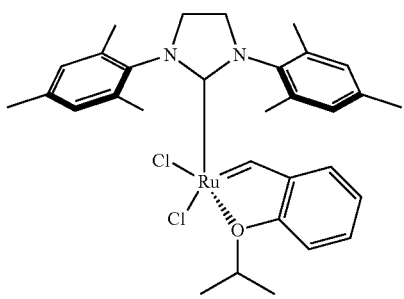

(1,3-Bis-(2,4,6-trimethylphenyl)-2-imidazolidinylidene) dichloro(o-isopropoxyphenylmethylene)ruthenium [CAS 301224-40-8]

C931

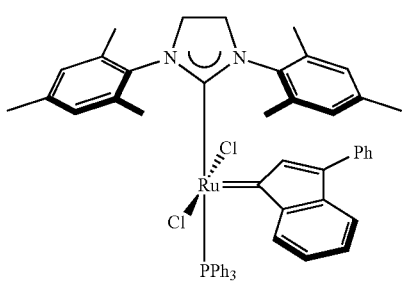

(1,3-Bis(2,4,6-trimethylphenyl)-2-imidazolidinylidene) dichloro (3-phenyl-1H-inden-1-ylidene)(triphenylphosphine)ruthenium [CAS 340810-50-6]

HENB

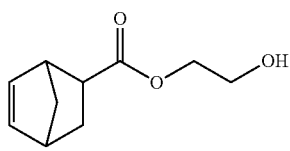 [SMILES: O=C(OCCO)C1CC2C=CC1C2]

2-hydroxyethyl bicyclo[2.2.1]hept-5-ene-2-carboxylate [CAS 37503-42-7]

-continued

NBCbSi

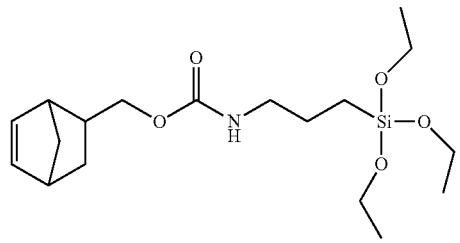 [SMILES: CCO[Si](CCCNC(=O)OCC1CC2C=CC1C2)(OCC)OCC]

carbamic acid, [3-(triethoxysilyl)propyl]-bicyclo[2.2.1]hept-5-en-2-ylmethyl ester [CAS 187161-66-6]

ENB-DDA

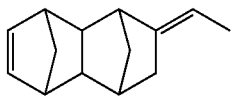

2-ethylidene-1,2,3,4,4a,5,8,8a-octahydro-1,4:5,8-Dimethanonaphthalene [CAS 38233-76-0]

TCPD

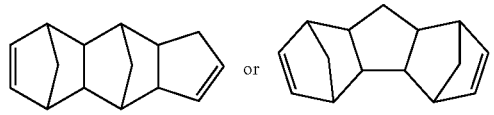

Tricyclopentadiene [CAS 7158-25-0]

ONB

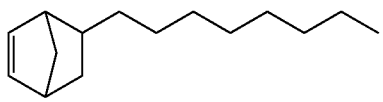

Octyl-norbornene [CAS 22094-84-4]

HNB-DDA

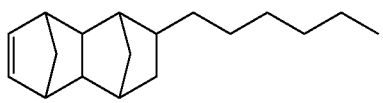 [SMILES: CCCCCCC1CC2CC1C1C3C=CC(C3)C21]

2-hexyl-1,2,3,4,4a,5,8,8a-octahydro-1,4:5,8-Dimethanonaphthalene [CAS 344396-70-9]

DCPD

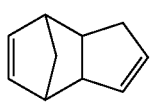

Dicyclopentadiene [CAS 77-73-6]

NB-Methanol

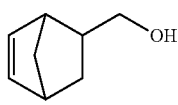

5-Norbornene-2-methanol [CAS 95-12-5]

NB-Dimethanol

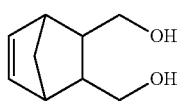 [SMILES: OCC1C2C=CC(C2)C1CO]

5-Norbornene-2-exo,3-exo-dimethanol [CAS 699-95-6]

NB-Epoxide

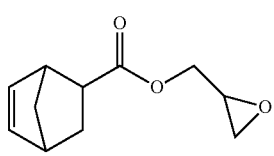 [SMILES: O=C(OCC1CO1)C1CC2C=CC1C2]

2-Hydroxyethyl bicyclo[2.2.1]hept-5-ene-2-carboxylate [CAS 37503-42-7]

| | |
|---|---|
| NB-Triethoxy Silane | 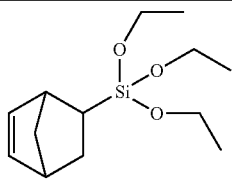 |
| | Norbornene Triethoxy Silane [CAS 18401-43-9] |
| NB-Fluorocarbon (1) | 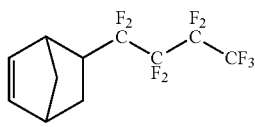 [SMILES: FC(F)(F)C(F)(F)C(F)(F)C(F)(F)C1CC2C=CC1C2] |
| | 5-(Perfluorobutyl)bicyclo[2.2.1]hept-2-ene [CAS 118777-97-2] |
| NB-Fluorocarbon (3) | 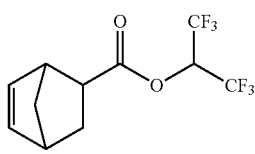 [SMILES: O=C(OC(C(F)(F)F)C(F)(F)F)C1CC2C=CC1C2] |
| | Bicyclo[2.2.1]hept-5-ene-2-carboxylic acid, 2,2,2-trifluoro-1-(trifluoromethyl)ethyl ester [CAS 391248-29-6] |

Coating Formulations Preparation

The coating formulations of the invention were prepared by starting with the preparation of the pre-catalyzed formulations: mixing the base monomer packages with the additives. The base monomer packages comprise at least one cyclic olefin of Formula (I), of Formula (II) and of Formula (III). The at least one metal carbene olefin metathesis catalyst was added to the mixture of monomer and additives to form the coating compositions as described herein.

The monomer compositions were prepared from mixtures of ENB-DDA/TCPD (70/30), HNB-DDA/TCPD (70/30), ONB/TCPD (77/23), and DCPD/TCPD (43/57) respectively, by combining specific amounts of these mixtures to obtain the desired ratios of individual monomers. The monomer mixtures of the invention were first mixed into a plastic cup with a magnetic stir bar for 5 min or overhead high-speed mixer for 1 min, depending on the target quantity of the base monomer packages, to prepare the base monomer packages. The compositions of the monomer packages [MP] are described in Table 1.

TABLE 1

Monomer package compositions [MP]

| [MP#] | MONOMERS [weight %] | | | | |
|---|---|---|---|---|---|
| | TCPD | HNB-DDA | ENB-DDA | ONB | DCPD |
| MP3 | 53 | 47 | — | — | — |
| MP4 | 27 | — | 35 | 38 | — |
| MP5 | 28 | — | 53 | 19 | — |
| MP6 | 30 | — | 70 | — | — |
| MP7 | 30 | 70 | — | — | — |
| MP8 | 27 | 35 | — | 38 | — |
| MP9 | 28 | 53 | — | 19 | — |
| MP10 | 27 | 28 | 14 | 31 | — |
| MP11 | 50 | — | — | 50 | — |

TABLE 1-continued

Monomer package compositions [MP]

| [MP#] | MONOMERS [weight %] | | | | |
|---|---|---|---|---|---|
| | TCPD | HNB-DDA | ENB-DDA | ONB | DCPD |
| MP12 | 57 | — | — | — | 43 |
| MP13 | 40.5 | — | — | 38 | 21.5 |
| MP14 | 24 | 25 | 13 | 28 | — |
| MP15 | 24 | 32 | — | 34 | — |

If additional co-monomers were used, they were added according to the compositions described in Table 2.

TABLE 2

Co-Monomer compositions [CM]

| [CM#] | Co-Monomer Type | Weight % |
|---|---|---|
| CM1 | NB-Methanol | 10 |
| CM2 | HENB | 10 |
| CM3 | NB-Epoxide | 10 |
| CM4 | NB-Dimethanol | 10 |
| CM5 | NB-Triethoxy Silane | 10 |
| CM6 | NB-Fluorocarbon 1 | 10 |
| CM7 | NB-Fluorocarbon 2 | 10 |
| CM8 | NB-Fluorocarbon 3 | 10 |

Additive packages, as described in Table 3, were added to the monomer/co-monomer packages to form the pre-catalyzed formulations, tabulated in Table 4. Irganox was first added to the monomer packages, followed by Kraton 1901 FG or CAB-O-SIL®. For formulations with Kraton 1901 FG, high-shear mixer was used at 3000-5000 rpm until formation of homogenous Kraton solution in the base monomer packages (45 min to 1.5 hours). For formulations with CAB-O-SIL®, high-speed overhead mixer with Cowles blade was used to disperse the fumed silica from 350-2000 rpm for 20-30 min, until no agglomerates were visually observed in the dispersions. Formulations with co-monomers were made by adding 10% by weight of the comonomer (the formulations contained only 90% of base monomer packages) using a high-speed mixer for 2-3 min at revolution speed between 600-800 rpm. The dispersant (W980 from BYK) or silane coupling agent (A174 from Momentive Performance Materials) or dicumyl peroxide (from Sigma-Aldrich) were then added. Then, fillers such as aluminum paste (STAPA 4 n.l. from EcKart Effect Pigments), micaceous iron oxide (MIOX SG from Kish Co.), aluminum powder (120 Atomized Aluminum Powder, from EcKart Effect Pigments) or ceramic microsphere (W-410 from 3M) were slowly added to the homogenized dispersions using plastic scoops or spatulas, while continuously mixing the formulations with a high-speed mixer at 850-1100 rpm, until addition of the fillers was complete. The formulations with the monomers, co-monomers, rheology modifiers, dispersants, coupling agents, peroxides and fillers were further mixed at 1800-2000 rpm for 15-20 min to ensure no agglomeration of rheology modifiers or fillers. Finally, HENB/MDI or NBCbSi were added to the mixtures followed by degassing with FlackTek high-speed mixer at revolution speed between 500-1600 rpm for 3 min.

The pre-catalyzed formulations were prepared at room temperature.

TABLE 4

Formulations [F]

| FORMULATIONS | Monomers | Co-Monomer | Additives |
|---|---|---|---|
| F3 | MP3 | — | AP3 |
| F4 | MP3 | — | AP4 |
| F5 | MP3 | — | AP5 |
| F6 | MP4 | — | AP6 |
| F7 | MP4 | — | AP7 |
| F8 | MP5 | — | AP6 |
| F9 | MP4 | — | AP11 |
| F10 | MP6 | — | AP8 |
| F11 | MP6 | — | AP9 |
| F12 | MP7 | — | AP8 |
| F13 | MP7 | — | AP9 |
| F14 | MP8 | — | AP6 |
| F15 | MP8 | — | AP7 |
| F16 | MP8 | — | AP12 |
| F17 | MP8 | — | AP13 |
| F18 | MP8 | — | AP14 |
| F19 | MP9 | — | AP12 |
| F20 | MP10 | — | AP7 |
| F21 | MP10 | — | AP12 |
| F22 | MP11 | — | AP7 |
| F23 | MP11 | — | AP12 |
| F24 | MP10 | — | AP15 |
| F25 | MP10 | — | AP16 |

TABLE 3

Additives and Fillers package compositions [AP]

ADDITIVES AND FILLERS [phr]

| [AP#] | Irganox 1076 | Kraton 1901FG | HENB:MDI 1:9 | CAB-O-Sil® Fumed Silica | NbCbSi | STAPA 4 n.l. Aluminum paste | Micaceous Iron Oxide (MIOX SG) | Ceramic Microsphere W-410 | Aluminum Powder | A174 Silane | Dicumyl peroxide | BYK W980 |
|---|---|---|---|---|---|---|---|---|---|---|---|---|
| AP2 | 0.93 | 1.86 | — | — | 0.46 | — | — | — | — | — | — | — |
| AP3 | 1 | 2 | — | — | — | — | — | — | — | — | — | — |
| AP4 | 1 | 2 | — | — | 0.5 | — | — | — | — | — | — | — |
| AP5 | 1 | 2 | 2 | — | 4 | — | — | — | — | — | — | — |
| AP6 | 1 | — | 2 | — | — | — | — | — | — | — | — | — |
| AP7 | 1 | — | 2 | — | 4 | — | — | — | — | — | — | — |
| AP8 | 1 | 5 | 2 | — | — | — | — | — | — | — | — | — |
| AP9 | 1 | 5 | 2 | — | 4 | — | — | — | — | — | — | — |
| AP10 | 1 | — | — | — | 4 | — | — | — | — | — | — | — |
| AP11 | 1 | — | 2 | 4 (Ultrabond) | 4 | — | — | — | — | — | — | — |
| AP12 | 1 | — | 2 | 6 (Ultrabond) | 4 | — | — | — | — | — | — | — |
| AP13 | 1 | — | 2 | 6 (TS720) | 4 | — | — | — | — | — | — | — |
| AP14 | 1 | — | 2 | 6 (TS610) | 4 | — | — | — | — | — | — | — |
| AP15 | 1 | — | 2 | 6 (TS720) | — | 45 | — | — | — | — | — | — |
| AP16 | 1 | — | 2 | 6 (TS720) | — | 45 | 59 | — | — | — | — | — |
| AP17 | 1 | — | 2 | 8 (TS720) | — | 45 | — | — | — | — | — | — |
| AP18 | 1 | — | — | 6 (TS720) | — | — | — | — | — | — | — | — |
| AP19 | 1 | — | 2 | 6 (TS720) | — | — | — | — | — | — | — | — |
| AP20 | 2 | — | 2 | 6 (TS720) | — | — | — | 72.79 | — | 0.5 | 1 | — |
| AP21 | 1 | 5 | 2 | — | — | — | — | — | 81 | — | — | 0.05 |
| AP22 | 1 | — | 2 | 6 (TS720) | — | 45 | — | — | — | — | — | 0.45 |
| AP23 | 1 | — | 2 | 6 (TS720) | — | — | 45 | — | — | — | — | 0.45 |
| AP24 | 2 | — | 2 | 6 (TS720) | — | 45 | — | — | — | 0.5 | 1 | — |
| AP25 | 2 | — | 2 | 6 (TS720) | — | — | 45 | — | — | 0.5 | 1 | — |
| AP27 | 1 | — | 2 | 6 (TS720) | — | 22.45 | — | — | — | — | — | 0.45 |
| AP28 | 1 | — | 2 | 6 (TS720) | — | 55.16 | — | — | — | — | — | 0.45 |
| AP29 | 1 | — | 2 | 6 (TS720) | — | — | — | 145.34 | — | 0.5 | 1 | — |
| AP30 | 1 | — | 2 | 6 (TS720) | — | — | — | — | 161.35 | — | — | 0.45 |
| AP31 | 1 | 5 | 2 | — | — | — | 144 | — | — | — | — | 0.05 |
| AP32 | 1 | 5 | 2 | — | — | — | 72 | — | — | — | — | 0.05 |
| AP33 | 1 | — | 2 | 2 (TS720) | — | 22.5 | 10 | — | — | — | — | — |

TABLE 4-continued

Formulations [F]

| FORMULATIONS | Monomers | Co-Monomer | Additives |
|---|---|---|---|
| F26 | MP12 | — | AP17 |
| F27 | MP13 | — | AP17 |
| F28 | MP10 | CM1 | AP18 |
| F29 | MP10 | CM2 | AP18 |
| F30 | MP10 | CM3 | AP18 |
| F31 | MP10 | CM4 | AP18 |
| F32 | MP10 | CM5 | AP18 |
| F33 | MP10 | CM6 | AP19 |
| F34 | MP10 | CM7 | AP19 |
| F35 | MP10 | CM8 | AP19 |
| F36 | MP8 | CM1 | AP18 |
| F37 | MP8 | CM2 | AP18 |
| F38 | MP8 | CM3 | AP18 |
| F39 | MP8 | CM4 | AP18 |
| F40 | MP8 | CM5 | AP18 |
| F41 | MP10 | — | AP20 |
| F42 | MP10 | — | AP21 |
| F43 | MP10 | — | AP22 |
| F44 | MP10 | — | AP27 |
| F45 | MP10 | — | AP29 |
| F46 | MP10 | — | AP30 |
| F47 | MP10 | — | AP31 |
| F48 | MP10 | — | AP32 |
| F49 | MP10 | — | AP19 |
| F50 | MP10 | — | AP23 |
| F51 | MP10 | — | AP25 |
| F52 | MP10 | — | AP24 |
| F53 | MP14 | — | AP25 |
| F54 | MP14 | — | AP24 |
| F55 | MP14 | — | AP26 |
| F56 | MP8 | — | AP25 |
| F57 | MP8 | — | AP24 |
| F58 | MP8 | — | AP26 |
| F59 | MP10 | CM5 | AP28 |
| F60 | MP10 | CM6 | AP28 |
| F61 | MP10 | CM7 | AP28 |
| F62 | MP10 | CM8 | AP28 |

Catalysts' suspensions (2 phr in mineral oil) were added to all the formulations of Table 4. Catalyst C827 was used in all the examples unless otherwise indicated. The catalyzed formulations were mixed and degassed simultaneously using FlackTek high-speed mixer for 30 seconds at 1000 rpm to form uncured coating compositions.

A few commercial samples of coatings were purchased and tested in the same conditions for comparison. These commercial formulations are described in Table 5. The commercial samples were prepared according to their manufacturers' guidelines, when applied on the metal panel substrates and tested in the adhesion pull-off tests.

TABLE 5

Comparison compositions

| FORMULATION | COMMERCIAL COMPOSITION |
|---|---|
| FA | Silicone based with ceramic fillers |
| FB | Phenolic epoxy with amines |
| FC | Phenolic epoxy with amines |
| FD | Phenolic epoxy with amines with glass flakes |

General Procedure for Coating Metal Substrate Panels

Metal Panel Surface Preparation (NACE SSPC SP10 Standard)

Carbon steel panels (6×6"×¼", 4"×4"×¼", 1"×8"×¼") were grit-blasted using steel grits according to NACE SSPC SP10 standard with a resulting surface profile of 2-3 mils. The uncured coating compositions were then applied onto the panels within 4 hours after sandblasting.

For low viscosity coating compositions, a yellow silicone tacky tape (from Airtech Industries) was used to build dams around the edges of the previously grit-blasted panels to prevent leakage. 12.50 g of coating composition were then dispensed onto the panels to achieve a theoretical wet film coating thickness of 30 mil. Formulations with higher viscosity (formulations with Kraton 1901FG, CAB-O-SIL) were applied directly onto the panels using a film applicator, with 20-25 mil wet film thickness. The coatings compositions were allowed to gel at ambient temperature for 30 min to 1 hour, then cured at 150° C. for 1 hour in an oven. Some examples using C931 catalyst were cured at room temperature.

The thickness of the dry film coatings was measured using an ultrasonic thickness gauge from Elcometer. A total of 3 measurements were taken on each coating.

Testing of the Sheet Steel Coated Panels

Pull-Off Adhesion Test According to ASTM D4541

This test method covers a procedure for evaluating the pull-off strength (commonly referred to as adhesion) of a coating system from metal substrates. The major components of a pull-off adhesion tester are a pressure source, a pressure gage and an actuator. During operation, the flat face of a pull stub (dolly) is adhered to the coating to be evaluated.

Prior to the adhesion test, an industrial grade 2K epoxy adhesive was prepared by mixing the 2 components in 10:4.4 ratio in a FlackTek SpeedMixer. Glass beads (0.5-0.6 mm) were incorporated into the adhesive to maintain the bond line thickness of the adhesive between the metal dollies and the cured coatings. Test areas were prepared on the cured coatings by scoring using a 14 mm diameter circular hole saw, such that 14 mm diameter isolated coating circles were formed with exposed steel surface around the circumference of the circles. Aluminum (14 mm) dollies were grit-blasted similar to the carbon steel substrates, while the coating circles were roughened using a sandpaper (100 grit).

The epoxy adhesive was then applied onto the roughened dollies to cover the roughened base of the dolly. The dollies were then carefully placed onto the coating circles, such that the dollies were exactly perpendicular to the substrate. Any excess adhesive was carefully removed to prevent adhesion onto the bare substrate surrounding the dolly. The coatings with the dollies were cured at 75° C. for 4 hours to ensure complete curing of the epoxy adhesive. Three test areas were used per coating. Using an automated PosiTest adhesion tester, the dollies were pulled from the coating. Adhesion strength was reported as average of three adhesion values required to completely detach the dollies from the coating.

Hot Water Immersion Test According to ASTM D870

This test covers the basic principles and operating procedures for testing water resistance of coatings by the partial or complete immersion of coated specimens in distilled or de-mineralized water at ambient or elevated temperatures.

The cured coatings were placed in an enclosed water bath. The water bath was then filled with deionized water to completely submerge the cured coatings. Temperature was increased to 95° C. After 7 days, the panels were removed from the water bath. Visual observations were made to identify changes in the coatings after the test. Also, pull-off adhesion test (ASTM D4541) was conducted on the panels according to procedure explained above. The adhesion performance data for the coated panels before and after hot water immersion are displayed in Table 7. Qualitative failure modes were recorded to identifyv mechanism of failure: A=adhesive failure of coating to steel substrate; C=cohesive failure of coating, G=adhesive or cohesive failure of epoxy glue between coating and dolly. The Pull-Off Strength data is expressed with a ranking system, as described in Table 6.

TABLE 6

Ranking System Used in Pull-Off Strength

| Ranking Value | Pull-off strength [psi] |
|---|---|
| AA | 2501-3000 |
| BB | 2001-2500 |
| CC | 1501-2000 |
| DD | 1001-1500 |
| EE | 0-1000 |

TABLE 7

Adhesion performance data

| FORMULATIONS | Initial Pull-off strength ranking | Initial Failure Mode | Hot water immersion Pull-off strength ranking | Hot water immersion Failure Mode |
|---|---|---|---|---|
| F3 | EE | A | EE | A |
| F4 | CC | G | DD | A |
| F5 | CC | Mixed A/G | BB | G |
| F6 | BB | G | BB | G |
| F7 | AA | G | BB | Mixed A/C/G |
| F8 | BB | G | DD | Mixed A/C/G |
| F9 | CC | G | CC | Mixed A/C/G |
| F10 | BB | G | CC | Mixed A/C/G |
| F11 | BB | G | CC | Mixed A/C/G |
| F12 | CC | G | CC | G |
| F13 | CC | G | BB | G |
| F14 | BB | G | BB | Mixed A/G |
| F15 | BB | G | BB | G |
| F16 | BB | Mixed C/G | BB | G |
| F17 | BB | G | BB | Mixed A/G |
| F18 | CC | G | BB | Mixed A/G |
| F19 | BB | G | BB | G |
| F20 | AA | G | BB | Mixed A/G |
| F21 | AA | G | BB | G |
| F22 | AA | G | AA | G |
| F23 | AA | G | AA | Mixed A/C/G |
| F24 | CC | Mixed C/G | BB | Mixed A/G |
| F25 | CC | C | DD | C |
| F26 | BB | Mixed C/G | CC | Mixed A/G |
| F27 | CC | C | CC | Mixed A/G |
| F28 | CC | Mixed A/C | CC | Mixed A/G |
| F29 | CC | Mixed A/C | CC | A |
| F30 | BB | Mixed A/G | CC | A |
| F31 | CC | Mixed A/G | CC | A |
| F32 | CC | A | CC | Mixed A/C/G |
| F33 | CC | G | BB | Mixed C/G |
| F34 | BB | G | BB | Mixed C/G |
| F35 | CC | G | BB | Mixed C/G |
| F36 | CC | Mixed A/C | CC | Mixed A/C |
| F37 | CC | Mixed A/G | CC | A |
| F38 | BB | Mixed A/C | DD | A |
| F39 | DD | A | DD | Mixed A/G |
| F40 | CC | A | CC | C |
| F41 | BB | G | CC | C |
| F42 | CC | G | CC | Mixed C/G |
| F43 | CC | C | CC | C |
| F44 | BB | C | BB | C |

TABLE 7-continued

Adhesion performance data

| FORMULATIONS | Initial Pull-off strength ranking | Initial Failure Mode | Hot water immersion Pull-off strength ranking | Hot water immersion Failure Mode |
|---|---|---|---|---|
| F45 | BB | G | DD | C |
| F46 | BB | A | DD | C |
| F49 | BB | G | BB | G |
| F50 | BB | C | EE | C |
| F51 | BB | C | CC | C |
| F52 | EE | C | DD | C |
| F56 | BB | C | DD | C |
| F57 | DD | C | DD | C |
| F59 | EE | C | EE | C |
| F60 | DD | C | CC | Mixed A/C |
| F61 | DD | C | DD | Mixed A/C |
| F62 | DD | C | CC | Mixed A/C |
| COMPARISON DATA | | | | |
| FA | EE | C | EE | C |
| FB | CC | C | DD | C |
| FC | BB | C | DD | C |
| FD | EE | C | EE | C |

Reverse Impact Strength (Effect of Rapid Deformation According to ASTM D2794

This test method shows effects of rapid impact on the integrity (resistance to cracking and delamination) of organic coatings. A Gardner Universal Impact tester, with maximum drop height of 48 in. and drop weight (combined ball and indenter) of 4 lb., was used to test the resistance of the cured coating to deformation. Care was taken to ensure that the drop weight falls freely through a calibrated vertical gravity tube (comes with a slot to raise and release the drop weight) attached to the impact tester. Select coating formulations and the commercial coatings were applied onto bare 3"×5"×0.032" carbon steel Q-panels using a film applicator at wet film thickness of 20 mil. The coating formulations and the commercial coatings were cured per procedure explained in previous sections and technical data sheets respectively. Once cured, the Q-panels were placed on the magnetic holder of the impact tester, such that the bare metal surface was in contact with the drop weight. Each time, the drop weight was raised to different heights in the gravity tube of the tester, starting from 25 in. mark on the gravity tube, and released onto the panels. The drop weight was released from different heights (above and below 25 in. (depending on the performance at 25 in.), until the coating did not show any damage (crazing, cracking, delamination). Reverse impact height of the coatings was recorded as the maximum height that damaged the coatings. Further, reverse impact strength of the coatings was calculated as maximum height to damage the coating×drop weight. Higher values (in-lb) indicated better impact performance. The reverse impact strength data is listed in Table 8. Several formulations exhibited much higher reverse impact strength than the comparative products.

TABLE 8

Reverse Impact Strength Data

| FORMULATION/ COMPARISON | Reverse Impact Strength (in-lb) |
|---|---|
| F24 | >196 |
| F25 | 10 |

TABLE 8-continued

Reverse Impact Strength Data

| FORMULATION/COMPARISON | Reverse Impact Strength (in-lb) |
|---|---|
| F26 | 4 |
| F26[a] | 10 |
| F26[b] | 6 |
| F27 | 30 |
| F27a | >196 |
| F27[b] | 116 |
| F43 | 12 |
| COMPARISON DATA | |
| FA | <4 |
| FB | <4 |
| FC | <4 |
| FD | <4 |

[a]Catalyst C931, cured at room temperature
[b]Catalyst C931, cured at 150° C. for 1 hour

Mandrel Bend Test According to ASTM D522

The following test provides a general procedure to test flexibility and resistance to crazing, cracking or delamination of organic coatings under strain or elongation.

Select coating formulations and the commercial coatings were applied onto grit-blasted 1"×8"×0.25" carbon steel strips using a film applicator with wet film thickness equal to 20 mil. All the coatings were cured per procedure described previously. A custom-made electrically driven hydraulic mandrel bend tester (Model FRMB1X-1HP from Partech) was used to bend the coated metal strips. Prior to using the instrument, the hydraulic reservoir of the machine was filled with approximately 9.5 gallons of medium weight petroleum-based hydraulic oil (R&O or AW32). 1 in. wide mandrels of different radii (3.5 in. (most aggressive)–50 in. (least aggressive)) were placed in the mandrel holder of the tester, one at a time. One coated metal strip was placed on the curved mandrel such that the coating was exposed to air and the grit-blasted metal side was in contact with the mandrel. To avoid slipping of the strips on the mandrels, the strips were bound tightly at one end with a "hold-down" bolt. The strips were mechanically bent on the different mandrels at a fixed speed, upon manually pulling the directional control valve of the machine. Results were recorded as the minimal mandrel radius that did not damage the coating. Lower mandrel radius value indicated better flexibility performance of coatings. The mandrel bend test data is listed in Table 9. Formulation F43 exhibited better flexibility with much lower mandrel bending radius than the comparative products.

TABLE 9

Mandrel Bending Performance

| FORMULATION/COMPARISON | Mandrel Radius (in) |
|---|---|
| F43 | 3.5 |
| COMPARISON DATA | |
| FA | 10 |
| FB | 10 |
| FC | 10 |
| FD | 10 |

Hot/Dry Heat Aging Test

Carbon steel panels (6"×6"×¼", 4"×4"×¼", 1"×8"×¼") were grit-blasted using steel grits according to NACE SSPC SP10 standard with a resulting surface profile of 2-3 mils. The uncured coating compositions were then applied onto the panels within 4 hours after sandblasting. The coatings were then cured at 150° C. for 1 hour unless indicated otherwise. The cured panels were then placed in a forced air oven subjected to heating continuously at 190° C. and 205° C. The panels were taken out of the oven and cooled down to room temperatures periodically for inspection. The time when first crack observed in the coatings was recorded.

TABLE 10

Hot/Dry Heat Aging Performance (190° C.)

| FORMULATION | Monmer | Co-Monomer | Additive Package | Filler | Days of First Crack Observed |
|---|---|---|---|---|---|
| F49 | MP10 | — | AP19 | None | 1 |
| F50 | MP10 | — | AP23 | 45 MIOX SG | 8 |
| F43 | MP10 | — | AP22 | 45 STAPA 4 n.l. Al Paste | >35 |
| F51 | MP10 | — | AP25 | 45 MIOX SG | 3 |
| F52 | MP10 | — | AP24 | 45 STAPA 4 n.l. Al Paste | >25 |
| F41 | MP10 | — | AP20 | 72.79 CM W-410 | 3 |
| F53 | MP14 | — | AP25 | 45 MIOX SG | 2 |
| F54 | MP14 | — | AP24 | 45 STAPA 4 n.l. Al Paste | >25 |
| F55 | MP14 | — | AP20 | 72.79 CM W-410 | 2 |
| F56 | MP8 | — | AP25 | 45 MIOX SG | 3 |
| F57 | MP8 | — | AP24 | 45 STAPA 4 n.l. Al Paste | >25 |
| F58 | MP8 | — | AP20 | 72.79 CM W-410 | 3 |

TABLE 11

Hot/Dry Heat Aging Performance (205° C.)

| FORMULATION | Monomer | Co-Monomer | Additive Package | Filler | Days of First Crack Observed |
|---|---|---|---|---|---|
| F49 | MP10 | — | AP19 | None | 1 |
| F42 | MP10 | — | AP21 | 81 Al Powder | 2 |
| F46 | MP10 | — | AP30 | 161.35 Al Powder | 5 |
| F48 | MP10 | — | AP32 | 72.79 Microsphere W-410 | 2 |
| F45 | MP10 | — | AP29 | 145.34 Microsphere W-410 | 2 |
| F47 | MP10 | — | AP31 | 144 MIOX SG | 2 |
| F44 | MP10 | — | AP27 | 22.45 STAPA 4 n.l. Al Paste | 5 |
| F43 | MP10 | — | AP22 | 45 STAPA 4 n.l. Al Paste | 19 |
| F24 | MP10 | — | AP15 | 45 STAPA 4 n.l. Al Paste | 28 |
| F25 | MP10 | — | AP16 | 45 STAPA 4 n.l. Al Paste + 59 MIOX SG | 55 |
| F26 | MP12 | — | AP17 | 45 STAPA 4 n.l. Al Paste | 55 |
| F27 | MP13 | — | AP17 | 45 STAPA 4 n.l. Al Paste | 42 |
| F32 | MP10 | CM5 | AP18 | None | 1 |
| F59 | MP10 | CM5 | AP28 | 55.16 STAPA 4 n.l. Al Paste | 19 |

TABLE 11-continued

Hot/Dry Heat Aging Performance (205° C.)

| FORMU-LATION | Monomer | Co-Monomer | Additive Package | Filler | Days of First Crack Observed |
|---|---|---|---|---|---|
| F33 | MP10 | CM6 | AP19 | None | 1 |
| F60 | MP10 | CM6 | AP28 | 55.16 STAPA 4 n.l. Al Paste | 27 |
| F34 | MP10 | CM7 | AP19 | None | 1 |
| F61 | MP10 | CM7 | AP28 | 55.16 STAPA 4 n.l. Al Paste | 19 |
| F35 | MP10 | CM8 | AP19 | None | 1 |
| F62 | MP10 | CM8 | AP28 | 55.16 STAPA 4 n.l. Al Paste | 19 |
| COMPARISON DATA | | | | | |
| FA | Silicone based with ceramic fillers | | | | >55 |
| FB | Phenolic epoxy with amines | | | | 33 |
| FC | Phenolic epoxy with amines | | | | 8 |
| FD | Phenolic epoxy with amines with glass flakes | | | | 19 |

Addition of fillers into the formulations generally improved the hot/dry heat aging performance of coatings. However, addition of STAPA 4 n.l. aluminum paste in formulations exhibited significant improvement of the hot/dry heat aging cracking performance of the coatings across broad monomer compositions.

QUV Test According to ASTM G154

In general, UV stability of the coating compositions can be improved by adding appropriate UV absorbers and UV light stabilizers to the coatings. Alternatively, a UV resistance topcoat can be applied over the coatings to provide protection against UV degradation. In addition, pigmentation and fillers can also improve UV resistance of a clear coating.

Monomer package composition MP3 was used in the test. Table 12 lists the composition of coatings with different fillers and pigmentation. The coatings were applied onto bare 3"×5"×0.032" carbon steel Q-panels using a film applicator. The coating formulations were cured at 150° C. for 1 hour per the procedure.

TABLE 12

Coating Compositions for QUV Test

| | Resin Only (MP3) | Al Flake Filler | Micaceous Iron Oxide Filler | Carbon Black Pigment |
|---|---|---|---|---|
| Fillers/Pigments (wt %) | None | STAPA 4 n.l. Al Paste (18.36 wt %) | MIOX SG (23.66 wt %) | MO 02294 black (1 wt %) |

The cured panels then were placed in a QUV test chamber for testing by a modified ASTM G154 cycle 1 method. The only modification from ASTM G154 cycle 1 was the cycle durations; UVA exposure was run for 12 hours and condensation was run for 2 hours per cycle. The panels were taken out after 22 cycles to check for changes in the coatings (discoloration, cracking, delamination). No cracking or delamination was observed but difference in discoloration was observed. Table 13 summarizes the results. Addition of fillers or pigmentation was shown to improve the UV resistance of the coatings.

TABLE 13

QUV Test Performance

| | Resin Only (MP3) | Al Flake Filler | Micaceous Iron Oxide Filler | Carbon Black Pigment |
|---|---|---|---|---|
| QUV Performance | Significant Yellowing | Slight Discoloration | Slight Discoloration | Slight Discoloration |

Plural Component Spray Experiment for Fast Cure System

A coating formulation composed of MP3 monomers in Table 1 and AP33 additive package in Table 2 was used as component A in the plural component spray experiment, whereas 0.15 wt % C627 catalyst and 0.65 wt % C931 catalyst in mineral oil suspension was used as component B in the plural component spray experiment. Binks Century External Mix Gel Coat System (Model CX2017HC) was used as the plural component spray equipment. The ratio of component A to component B is 100 to 3. The environmental condition during the plural component spray was 55° F. and 50% relative humidity. The article used for plural component spray coating was a carbon pipe of 2 inches in diameter and 12 inches in length. The surface preparation was sandblasted according to SSPC SP10 with a surface profile of 2-3 mils. A coating of 14-16 mils was applied onto the carbon steel pipe in one coat using the Binks plural component spray equipment. No sagging or dripping was observed after the liquid coating of high film thickness was applied onto the substrate. A rapid dry to touch time of less than 3 minutes was achieved through plural component spray in combination with the fast reacting catalysts and the spray coated article can be readily handled in less than 10 minutes.

In comparison, commercial phenolic epoxy coating systems such as those listed in Table 5 will need to pre-mix the two resin and curative components and spray via a conventional spray equipment. It will require at least 4-8 hours air dry for each coat to attain dry to touch status and require two coats to attain the required dry film thickness. In addition, these commercial phenolic epoxy coating systems have only 2 to 3 hours of pot-life once the resin and curative components are mixed. Furthermore, the unused mixed portion will need to be discarded, whereas the plural component spray system only mixes the resin and catalyst externally on demand and has no pot-life issue.

Adhesive Formulations Preparation

Adhesive coating formulations of the invention were prepared by starting with the preparation of the pre-catalyzed formulations: mixing the base monomer packages with the additives. The base monomer packages comprise at least one cyclic olefin of Formula (I), of Formula (II) and of Formula (III). Then at least one metal carbene olefin metathesis catalyst was added to the mixture of monomer and additives to form the coating compositions as described herein.

The monomer compositions were prepared from mixtures of TCPD/DCPD (25/75), TCPD/DCPD (40/60), TCPD/ONB/DCPD (57/30/13), and ONB/TCPD (60/40) respectively, by combining specific amounts of these mixtures to obtain the desired ratios of individual monomers. The monomer mixtures of the invention were first mixed into a plastic cup with a magnetic stir bar for 5 min or overhead high-speed mixer for 1 min, depending on the target quantity of the base monomer packages, to prepare the base monomer packages. The compositions of the monomer packages [MP] are described in Table 14.

TABLE 14

Monomer package compositions [MP]

| [MP#] | MONOMERS [weight %] | | |
|---|---|---|---|
| | TCPD | ONB | DCPD |
| MP60 | 25 | — | 75 |
| MP61 | 40 | — | 60 |
| MP62 | 40 | 60 | |
| MP63 | 57 | 30 | 13 |

Additive packages, as described in Table 15, were added to the monomer/co-monomer packages to form the pre-catalyzed formulations, tabulated in Table 16. Irganox was first added to the monomer packages, followed by Kraton 1901 FG or CAB-O-SIL® if utilized. For formulations with Kraton 1901 FG, high-shear mixer was used at 3000-5000 rpm until formation of homogenous Kraton solution in the base monomer packages (45 min to 1.5 hours). For formulations with CAB-O-SIL®, high-speed overhead mixer with Cowles blade was used to disperse the fumed silica from 350-2000 rpm for 20-30 min, until no agglomerates were visually observed in the dispersions. Finally, other additives were added to the mixtures followed by degassing with FlackTek high-speed mixer at revolution speed between 500-1600 rpm for 3 min.

Catalysts' suspensions containing 0.7 to 1.2 wt % ROMP catalyst in a white mineral oil carrier were added at 2 phr versus formulation weight to all the formulations of Table 16. Catalyst C827 was used in all the examples. The catalyzed formulations were mixed and degassed simultaneously using FlackTek high-speed mixer for 30 seconds at 1000 rpm to form uncured adhesive compositions.

TABLE 16

Formulations [F]

| FORMULATIONS [F#] | Monomers | Co-Monomer | Additives |
|---|---|---|---|
| F80 | MP61 | — | AP75 |
| F81 | MP62 | — | AP75 |
| F82 | MP63 | — | AP75 |
| F83 | MP61 | — | — |
| F84 | MP60 | — | — |
| F85 | MP60 | — | AP60 |
| F86 | MP60 | — | AP61 |
| F87 | MP60 | — | AP62 |
| F88 | MP60 | — | AP63 |
| F89 | MP60 | — | AP64 |
| F90 | MP60 | — | AP65 |
| F91 | MP60 | — | AP66 |
| F92 | MP60 | — | AP67 |
| F93 | MP60 | — | AP68 |
| F94 | MP60 | — | AP69 |
| F95 | MP60 | — | AP70 |
| F96 | MP60 | — | AP71 |
| F97 | MP60 | — | AP72 |
| F99 | MP60 | — | AP74 |

General Procedure for Preparing Lap Shear Specimens

Surface Preparation

The lap shear specimens were prepared in accordance to ASTM D 1102-05 and ASTM D3161. The lap shear panels were prepped by grit-blasted using steel grits before use. The thickness of the adhesive bonds was set at 0.005" by either glass beads, steel wire or shim tabs.

Once the lap shear specimen surface has been prepped, the formulations as described in Table 16 are applied to a surface described in Table 17.

TABLE 15

Additives and Fillers package compositions [AP]

| [AP#] | Ethanox 4702 | Irganox 1076 | Kraton G1651H | Triphenyl phosphine | CAB-O-Sil® Fumed Silica TS-610 | HENB:MDI 1:9 | Krazol NN32 | MDI | HENB silane | Allyl-trimethoxy-silane | KZ-55 | 3-Acryl-oxylpropyl trimethoxy-silane |
|---|---|---|---|---|---|---|---|---|---|---|---|---|
| AP60 | 2 | — | 4 | 0.05 | 4 | 2 | — | — | — | — | — | — |
| AP61 | 2 | — | 4 | 0.05 | 4 | 4 | — | — | — | — | — | — |
| AP62 | 2 | — | 4 | 0.05 | 4 | — | 1 | — | — | — | — | — |
| AP63 | 2 | — | 4 | 0.05 | 4 | — | 2 | — | — | — | — | — |
| AP64 | 2 | — | 4 | 0.05 | 4 | — | 4 | — | — | — | — | — |
| AP65 | 2 | — | 4 | 0.05 | 4 | — | 6 | — | — | — | — | — |
| AP66 | 2 | — | 4 | 0.05 | 4 | — | — | 1 | — | — | — | — |
| AP67 | 2 | — | 4 | 0.05 | 4 | — | — | — | 2 | — | — | — |
| AP68 | 2 | — | 4 | 0.05 | 4 | — | — | — | — | 1 | — | — |
| AP69 | 2 | — | 4 | 0.05 | 4 | — | — | — | — | 2 | — | — |
| AP70 | 2 | — | 4 | 0.05 | 4 | — | — | — | — | — | 1 | — |
| AP71 | 2 | — | 4 | 0.05 | 4 | — | — | — | — | — | 2 | — |
| AP72 | 2 | — | 4 | 0.05 | 4 | — | — | — | — | — | 4 | — |
| AP74 | 2 | — | 4 | 0.05 | 4 | — | — | — | — | — | — | 1 |
| AP75 | — | 1 | — | — | — | 6 | — | — | — | — | — | — |

TABLE 17

| Substrate Material [SU] | |
|---|---|
| Substrate [SU#] | Lab Shear Strength [psi] |
| SU1 | 6061 Aluminum |
| SU2 | A36 Steel |
| SU3 | Proxima ® Composite |
| SU4 | G10 |

The bonded lap shear samples for submitted to different cure profiles as described in Table 18.

TABLE 18

| | Cure Profile [CU] | | | |
|---|---|---|---|---|
| [CU#] | Stage 1 Cure Temp (° C.) | Stage 1 Cure Time (hr) | Stage 2 Cure Temp (° C.) | Stage 2 Cure Time (hr) |
| CU1 | 40 | 1 | 100 | 2 |
| CU2 | 40 | 1 | 180 | 2 |
| CU3 | — | — | 80 | 2 |
| CU4 | — | — | 120 | 2 |

Testing of the Lap Shear Specimens

Overhead Tensile Lap Shear Test According to ASTM D1102-05 or ASTM D3161

This test method covers a procedure for evaluating the overhead lap shear strength of bonded metal or plastic substrates. A universal testing machine with LabWorks software was used to collect the data. Lab shear strength was reported as average of three—five values required.

TABLE 19

| Ranking System Used in Lap Shear Strength | |
|---|---|
| Ranking Value | Lab Shear Strength [psi] |
| AA | 3501-4000 |
| BB | 3001-3500 |
| CC | 2501-3000 |
| DD | 2001-2500 |
| EE | 1501-2000 |
| FF | 0-1500 |

The adhesion performance data for the lap shear specimens are displayed in Table 20. The Pull-Off Strength data is expressed with a ranking system, as described in Table 19.

TABLE 20

| Lap shear performance data | | | |
|---|---|---|---|
| FORMULATIONS | Substrate | Cure | Lap shear strength ranking |
| F80 | SU1 | CU3 | DD |
| F80 | SU1 | CU4 | CC |
| F80 | SU2 | CU3 | DD |
| F80 | SU2 | CU4 | CC |
| F81 | SU1 | CU3 | FF |
| F81 | SU1 | CU4 | EE |
| F81 | SU2 | CU3 | FF |
| F81 | SU2 | CU4 | FF |
| F82 | SU1 | CU3 | EE |
| F82 | SU1 | CU4 | DD |
| F82 | SU2 | CU3 | DD |
| F82 | SU2 | CU4 | CC |
| F83 | SU1 | CU4 | FF |
| F84 | SU3 | CU1 | AA |
| F84 | SU4 | CU1 | FF |
| F98 | SU1 | CU2 | AA |
| F86 | SU1 | CU2 | CC |
| F89 | SU3 | CU1 | AA |
| F91 | SU3 | CU1 | AA |
| F88 | SU3 | CU1 | BB |
| F92 | SU3 | CU1 | AA |
| F93 | SU3 | CU1 | BB |
| F94 | SU3 | CU1 | FF |
| F99 | SU3 | CU1 | BB |
| F90 | SU3 | CU1 | AA |
| F93 | SU4 | CU1 | FF |
| F86 | SU4 | CU1 | DD |
| F85 | SU4 | CU1 | EE |
| F91 | SU4 | CU1 | FF |
| F96 | SU4 | CU1 | EE |
| F92 | SU4 | CU1 | FF |
| F87 | SU4 | CU1 | CC |
| F89 | SU4 | CU1 | AA |
| F95 | SU4 | CU1 | FF |
| F97 | SU4 | CU1 | FF |
| F88 | SU4 | CU1 | AA |

The claimed invention is:
1. A coating composition comprising:
5-99.999 wt. %, based on the total weight of the coating composition, of an olefinic resin composition; and
0.001 to 95 wt. %, based on the total weight of the coating composition, of an inorganic filler selected from aluminum powder or alloys thereof, aluminum flakes or alloys thereof, micaceous iron oxide, mica, glass fibers, glass flakes, wollastonite calcium carbonate, silica, talc, and mixtures thereof, wherein the olefinic resin composition comprises:
an olefinic component consisting of:
0-100 wt. %, based on the total weight of the olefinic component, of at least one cyclic olefin selected from the group consisting of Formulae (I), (II), and (III);
optionally, 0-20 wt. %, based on the total weight of the olefinic component, at least one linear olefin of Formula (IV);
wherein the wt. % of the olefins of Formulae (1), (II), (III), and optionally (IV) add to 100 wt. % of the olefinic component, and
at least one metal carbene olefin metathesis catalyst, present in an olefin to catalyst molar ratio of 10,000,000:1 to 1,000:1,
wherein the cyclic olefin of Formulae (I), (II), and (III), and the linear olefin of Formula (IV) have the following structures:

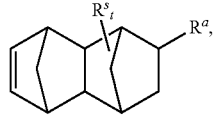

Formula (I)

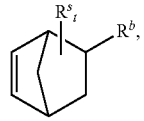

Formula (II)

-continued

Formula (III)

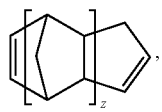

Formula (IV)

$R^c \sim\!\!\!\!\sim\!\!=\!\!\sim\!\!\!\!\sim R^d$, wherein:

$R^a$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —O$R^g$, —CH$_2$—O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C($R^h$)($R^i$)COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$, or $R^b$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —O$R^g$, —CH$_2$—O$R^g$, —CN, —NO$_2$, —CF$_3$, —P(O)(O$R^h$)$_2$, —OP(O)(O$R^h$)$_2$, —Si(O$R^k$)$_3$—S(O)$_2$O$R^h$, —OS(O)$_2$$R^h$, optionally substituted heterocycle, spiro optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C($R^h$)($R^i$)COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$;

$R^c$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —O$R^g$, —CH$_2$—O$R^g$, CN, NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C($R^h$)($R^i$) COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$;

$R^d$ is H, optionally substituted linear or branched $C_{1-24}$ alkyl, optionally substituted linear or branched $C_{2-24}$ alkenyl, halogen, —C(O)$R^f$, —CH$_2$—C(O)$R^f$, —O$R^g$, —CH$_2$—O$R^g$, CN, NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C($R^h$)($R^i$) COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$;

each $R^s$ is independently optionally substituted linear or branched $C_{1-24}$ alkyl, optionally substituted linear or branched $C_{2-24}$ alkenyl, halogen, —C(O)$R^f$, —CH$_2$—C(O)$R^f$, —O$R^g$, —CH$_2$—O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, —CH$_2$-(optionally substituted heterocycle), optionally substituted $C_{3-10}$ cycloalkyl, —CH$_2$-(optionally substituted $C_{3-10}$ cycloalkyl), optionally substituted $C_{5-24}$ aryl, —CH$_2$-(optionally substituted $C_{5-24}$ aryl), optionally substituted $C_{3-12}$ cycloalkenyl, —CH$_2$-(optionally substituted $C_{3-12}$ cycloalkenyl), C($R^h$)($R^i$)COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$$R^n$;

t is 0, 1, 2, 3, 4, 5, or 6;

$R^f$ is OH, O$R^k$, N$R^g$$R^h$, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^k$ is optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^p$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl; and z is 0, 1, 2, or 3.

2. The coating composition of claim 1, wherein:

$R^a$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, optionally substituted $C_{3-10}$ cycloalkyl, optionally substituted $C_{6-10}$ aryl, optionally substituted $C_{3-12}$ cycloalkenyl, or

$R^b$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, optionally substituted $C_{3-10}$ cycloalkyl, optionally substituted $C_{6-10}$ aryl, optionally substituted $C_{3-12}$ cycloalkenyl;

$R^c$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, optionally substituted $C_{3-10}$ cycloalkyl, optionally substituted $C_{6-10}$ aryl, optionally substituted $C_{3-12}$ cycloalkenyl;

$R^d$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2$$R^h$, optionally substituted heterocycle, optionally substituted $C_{3-10}$ cycloalkyl, optionally substituted $C_{6-10}$ aryl, optionally substituted $C_{3-12}$ cycloalkenyl;

t is 0;

$R^f$ is OH, O$R^k$, N$R^g R^h$, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^g$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^h$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

z is 2;

$R^i$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^j$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^k$ is optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^l$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^m$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^n$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^o$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl; and $R^p$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl.

3. The coating composition of claim 1, wherein
the cyclic olefin of formula (I) is ENB-DDA, HNB-DDA, or a mixture thereof;

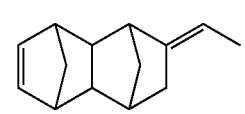

ENB-DDA

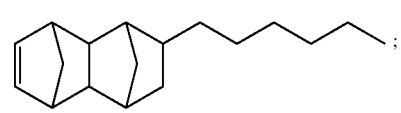

HNB-DDA

;

the cyclic olefin of formula (II) is HENB, NBCbSi, ONB, NB-methanol, NB-dimethanol, NB-epoxide, NB-triethoxysilane, NB-Fluorocarbon (1), NB-fluorocarbon (2), NB-fluorocarbon (3), or a mixture thereof

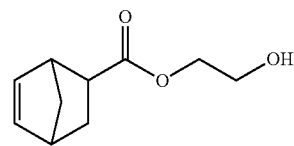

HENB

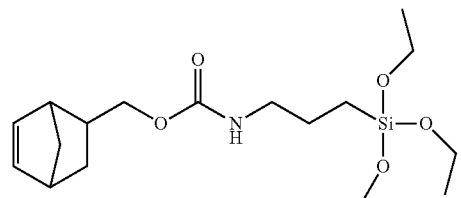

NBCbSi

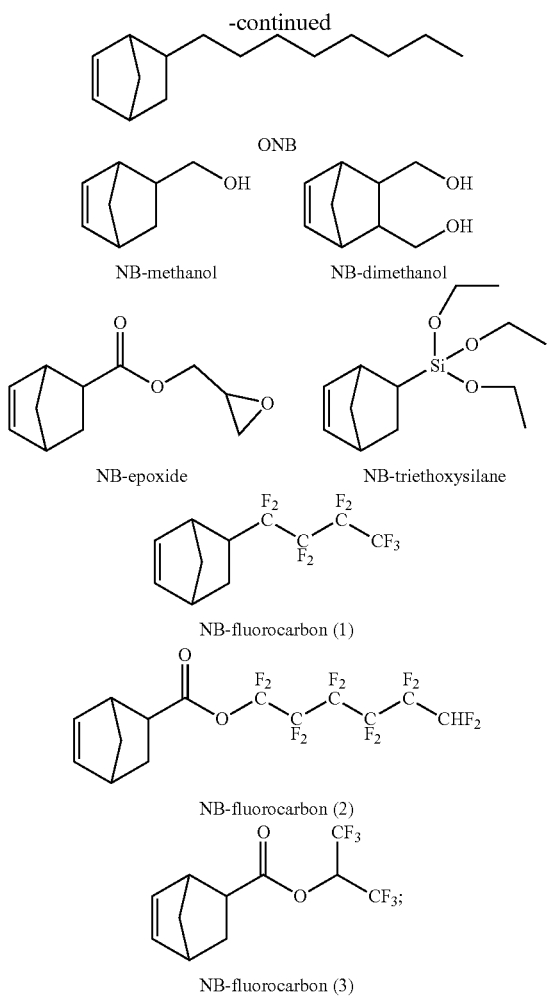

ONB

NB-methanol

NB-dimethanol

NB-epoxide

NB-triethoxysilane

NB-fluorocarbon (1)

NB-fluorocarbon (2)

NB-fluorocarbon (3)

and the cyclic olefin of formula (III) is tricyclopentadiene (TCPD), dicyclopentadiene (DCPD), or a mixture thereof.

4. The coating composition of claim 1, wherein the at least one metal carbene olefin metathesis catalyst has the structure of Formula (1):

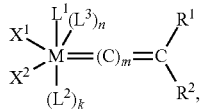

Formula (1)

wherein:

M is ruthenium;

$L^1$, $L^2$, and $L^3$ are independently neutral electron donor ligands;

n is 0 or 1;

m is 0, 1, or 2;

k is 0 or 1;

$X^1$ and $X^2$ are independently anionic ligands; and $R^1$ and $R^2$ are independently hydrogen, optionally substituted hydrocarbyl, optionally substituted heteroatom-containing hydrocarbyl; or $R^1$ and $R^2$ are linked together to form one or more cyclic groups.

5. The coating composition of claim 1, wherein the at least one metal carbene olefin metathesis catalyst has the structure of Formula (2):

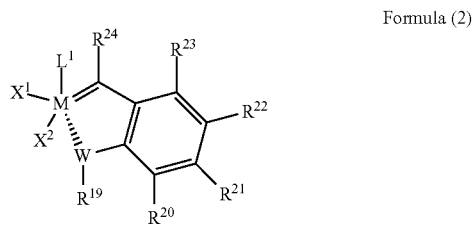

Formula (2)

wherein:

M is ruthenium;

$L^1$ is a neutral electron donor ligand;

$X^1$ and $X^2$ are independently anionic ligands;

W is O, halogen, $NR^{33}$ or S;

$R^{19}$ is H, optionally substituted $C_{1-24}$ alkyl, —$C(R^{34})(R^{35})COOR^{36}$, —$C(R^{34})(R^{35})C(O)H$, —$C(R^{34})(R^{35})C(O)R^{37}$, —$C(R^{34})(R^{35})CR^{38}(OR^{39})(OR^{40})$, —$C(R^{34})(R^{35})C(O)NR^{41}R^{42}$, —$C(R^{34})(R^{35})C(O)NR^{41}OR^{40}$, —$C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, $OR^{30}$, $NR^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, $OR^{26}$, $-NR^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

6. The coating composition of claim 1, wherein the coating composition comprises at least one cyclic olefin represented selected from the group consisting of both Formulae (I) and (II), both Formulae (I) and (III), and both Formulae (II) and (III).

7. The coating composition of claim 1, wherein the coating composition further comprises a coating additive is selected from the group consisting of a gel modifier, a hardness modulator, an impact modifier, an antioxidant, an antiozonant, a filler, a binder, a thixotrope, a rheology modifier, a dispersant, a wetting agent, a plasticizer, a pigment, a flame retardant, a dye, fibers, a reinforcement material, a coupling agent, a UV absorber, a UV light stabilizer, a film former, a lubricant, an adhesion promoter and mixtures thereof.

8. The coating composition of claim 1, wherein the inorganic filler is selected from aluminum powder or alloys thereof, aluminum flakes or alloys thereof, micaceous iron oxide, mica, and mixtures thereof.

9. The coating composition of claim 4, wherein:
$L^1$ is

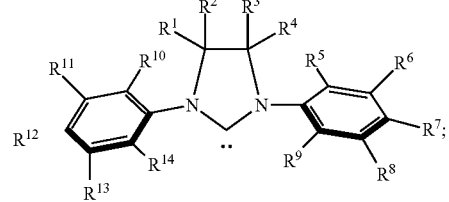

$R^1$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound, or together with $R^3$ or together with $R^4$ can form a polycyclic ring;

$R^2$ is H, optionally substituted $C_{1-24}$ alkyl, halogen, $-C(O)R^{25}$, $-OR^{26}$, CN, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound, or together with $R^3$ or together with $R^4$ can form a polycyclic ring;

$R^3$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ or together with $R^1$ can form a polycyclic ring, or together with $R^4$ can form a spiro compound;

$R^4$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a spiro compound, or together with $R^2$ or together with $R^1$ can form a polycyclic ring;

$R^5$ is H, optionally substituted $C_{1-24}$ alkyl, halogen, $-C(O)R^{25}$, $-OR^{26}$, CN, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, $-C(O)R^{25}$, $-OR^{26}$, CN, $-NR^{27}R^{28}$, $NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ can form an optionally substituted polycyclic ring;

$R^{11}$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{10}$ or together with $R^{12}$ can form an optionally substituted polycyclic ring;

$R^{12}$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, $-C(O)R^{25}$, $-OR^{26}$, $-CN$, $-NR^{27}R^{28}$, $-NO_2$, $-CF_3$, $-S(O)_xR^{29}$, $-P(O)(OH)_2$, $-OP(O)(OH)_2$, $-SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{25}$ is $-OH$, $-OR^{30}$, $-NR^{27}R^{28}$, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{29}$ is H, optionally substituted $C_{1-24}$ alkyl, $-OR^{26}$, $-NR^{27}R^{28}$, optionally substituted heterocycle, optionally substituted $C_{3-10}$ cycloalkyl, optionally substituted $C_{5-24}$ aryl, or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

10. The coating composition of claim 1, wherein the inorganic filler is selected from aluminum powder or alloys thereof, aluminum flakes or alloys thereof, micaceous iron oxide, and mixtures thereof.

11. An article of manufacture comprising a substrate coated with a cured coating composition wherein the coating composition is a coating composition of claim 1.

12. A method for coating a substrate material, comprising: optionally applying an adhesion promoter onto the substrate surface; applying onto the substrate surface a coating composition comprising the coating composition of claim 1; and curing the coating applied on the substrate surface.

13. The method of claim 12, wherein:

$R^a$ is H, optionally substituted linear or branched $C_{1-12}$ alkyl, optionally substituted linear or branched $C_{2-6}$ alkenyl, halogen, $-C(O)R^f$, $-OR^g$, $-CN$, $-NO_2$, $-CF_3$, $-P(O)(OR^h)_2$, $-OP(O)(OR^h)_2$, $-S(O)_2R^h$, $-OS(O)_2R^h$, optionally substituted heterocycle, optionally substituted $C_{3-10}$ cycloalkyl, optionally substituted $C_{6-10}$ aryl, optionally substituted $C_{3-12}$ cycloalkenyl, or

$R^b$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2R^h$, optionally substituted heterocycle, optionally substituted $C_{3-10}$ cycloalkyl, optionally substituted $C_{6-10}$ aryl, optionally substituted $C_{3-12}$ cycloalkenyl;

$R^c$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2R^h$, optionally substituted heterocycle, optionally substituted $C_{3-10}$ cycloalkyl, optionally substituted $C_{6-10}$ aryl, optionally substituted $C_{3-12}$ cycloalkenyl;

$R^d$ is H, optionally substituted linear or branched $C_{1-12}$ alkyl, optionally substituted linear or branched $C_{2-6}$ alkenyl, halogen, —C(O)$R^f$, —O$R^g$, —CN, —NO$_2$, —CF$_3$, —P(O)(O$R^h$)$_2$, —OP(O)(O$R^h$)$_2$, —S(O)$_2$O$R^h$, —OS(O)$_2R^h$, optionally substituted heterocycle, optionally substituted $C_{3-10}$ cycloalkyl, optionally substituted $C_{6-10}$ aryl, optionally substituted $C_{3-12}$ cycloalkenyl;

t is 0;

$R^f$ is OH, O$R^k$, N$R^gR^h$, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^g$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^h$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

z is 2;

$R^i$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^j$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^k$ is optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^l$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^m$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^n$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^o$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl; and $R^p$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl.

14. The method of claim 12 wherein
the cyclic olefin of formula (I) is ENB-DDA, HNB-DDA, or a mixture thereof

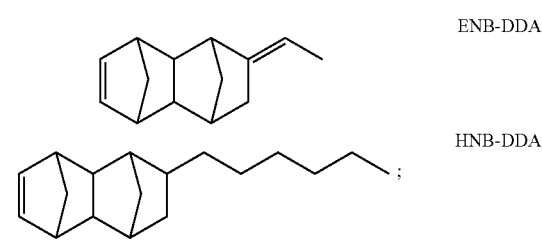

the cyclic olefin of formula (II) is HENB, NBCbSi, ONB, NB-methanol, NB-dimethanol, NB-epoxide, NB-triethoxysilane, NB-Fluorocarbon (1), NB-fluorocarbon (2), NB-fluorocarbon (3), or a mixture thereof

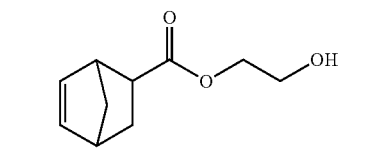

HENB

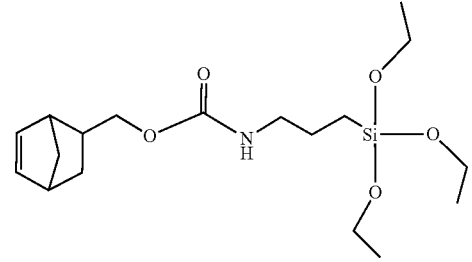

NBCbSi

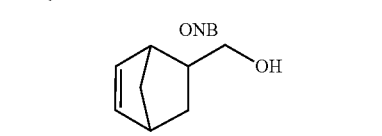

ONB

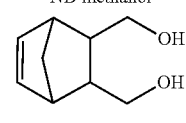

NB-methanol

NB-dimethanol

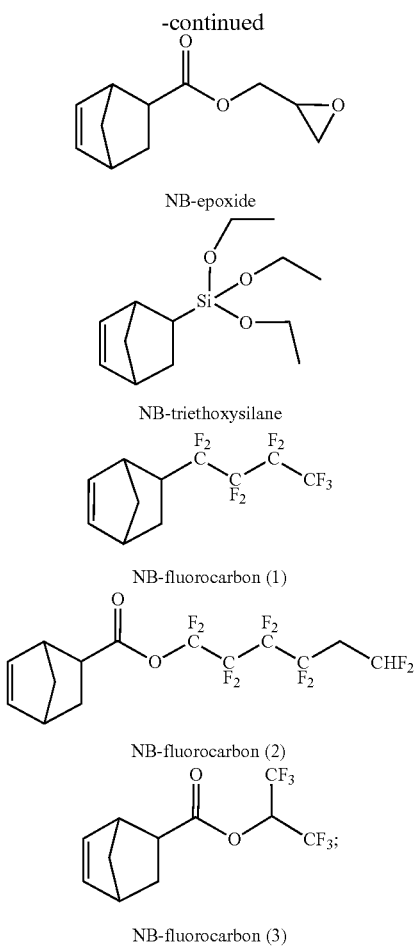

NB-epoxide

NB-triethoxysilane

NB-fluorocarbon (1)

NB-fluorocarbon (2)

NB-fluorocarbon (3)

and
the cyclic olefin of formula (III) is tricyclopentadiene (TCPD), dicyclopentadiene (DCPD), or a mixture thereof.

15. The method of claim 12, wherein the at least one metal carbene olefin metathesis catalyst has the structure of Formula (1):

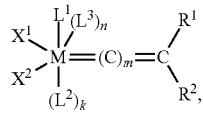

Formula (1)

wherein:
M is ruthenium;
$L^1$, $L^2$, and $L^3$ are independently neutral electron donor ligands;
n is 0 or 1;
m is 0, 1, or 2;
k is 0 or 1;
$X^1$ and $X^2$ are independently anionic ligands; and
$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form one or more cyclic groups.

16. The method of claim 15, wherein:
$L^1$ is

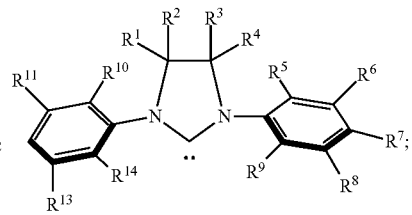

$R^1$ is H, optionally substituted $C_{1-24}$ alkyl, halogen, —C(O)$R^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound, or together with $R^3$ or together with $R^4$ can form a polycyclic ring;

$R^2$ is H, optionally substituted $C_{1-24}$ alkyl, halogen, —C(O)$R^{25}$, —OR$^{26}$, CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound, or together with $R^3$ or together with $R^4$ can form a polycyclic ring;

$R^3$ is H, optionally substituted $C_{1-24}$ alkyl, halogen, —C(O)$R^{25}$, —OR$^{26}$, CN, —NR$^{27}$R$^{28}$, NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ or together with $R^1$ can form a polycyclic ring, or together with $R^4$ can form a spiro compound;

$R^4$ is H, optionally substituted $C_{1-24}$ alkyl, halogen, —C(O)$R^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a spiro compound, or together with $R^2$ or together with $R^1$ can form a polycyclic ring;

$R^5$ is H, optionally substituted $C_{1-24}$ alkyl, halogen, —C(O)$R^{25}$, —OR$^{26}$, CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, —C(O)$R^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, —C(O)$R^{25}$, —OR$^{26}$, —CN, —NR$^{27}$R$^{28}$, —NO$_2$, —CF$_3$, —S(O)$_x$R$^{29}$, —P(O)(OH)$_2$, —OP(O)(OH)$_2$, —SR$^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ can form an optionally substituted polycyclic ring;

$R^{11}$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{10}$ or together with $R^{12}$ can form an optionally substituted polycyclic ring;

$R^{12}$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, —C(O)$R^{25}$, —O$R^{26}$, —CN, —N$R^{27}R^{28}$, —NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{25}$ is —OH, —O$R^{30}$, —N$R^{27}R^{28}$, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{29}$ is H, optionally substituted $C_{1-24}$ alkyl, —O$R^{26}$, —N$R^{27}R^{28}$, optionally substituted heterocycle, optionally substituted $C_{3-10}$ cycloalkyl, optionally substituted $C_{5-24}$ aryl, or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

17. The method of claim 15, wherein: $L^2$ is P$R^{H1}R^{H2}R^{H3}$ wherein: $R^{H1}$, $R^{H2}$, and $R^{H3}$ are each independently optionally substituted $C_6$-$C_{10}$ aryl, optionally substituted $C_1$-$C_{10}$ alkyl, or optionally substituted $C_3$-$C_{10}$ cycloalkyl.

18. The method of claim 15, wherein: $R^1$ is hydrogen and $R^2$ is phenyl; or $R^1$ is hydrogen and $R^2$ is 3-methyl-1-propenyl; or $R^1$ and $R^2$ are linked together to form 3-phenylindenylid-1-ene.

19. The method of claim 12, wherein the at least one metal carbene olefin metathesis catalyst has the structure of Formula (2):

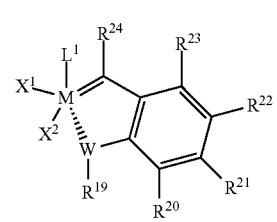

Formula (2)

wherein:

M is ruthenium;

$L^1$ is a neutral electron donor ligand;

$X^1$ and $X^2$ are independently anionic ligands;

W is O, halogen, N$R^{33}$ or S;

$R^{19}$ is H, optionally substituted $C_{1-24}$ alkyl, —C($R^{34}$)($R^{35}$) COO$R^{36}$, —C($R^{34}$)($R^{35}$)C(O)H, —C($R^{34}$)($R^{35}$)C(O)$R^{37}$, —C($R^{34}$)($R^{35}$)C$R^{38}$ (O$R^{39}$)(O$R^{40}$), —C($R^{34}$)($R^{35}$)C(O)N$R^{41}R^{42}$, —C($R^{34}$)($R^{35}$)C(O)N$R^{41}$O$R^{40}$, —C(O)$R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is N$R^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, —C(O)$R^{25}$, —O$R^{26}$, CN, —N$R^{27}R^{28}$, NO$_2$, —CF$_3$, —S(O)$_xR^{29}$, —P(O)(OH)$_2$, —OP(O)(OH)$_2$, —S$R^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, O$R^{30}$, N$R^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, O$R^{26}$, —N$R^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

20. The method of claim 12, wherein the coating composition comprises at least one cyclic olefin represented selected from the group consisting of both Formulae (I) and (II), both Formulae (I) and (III), and both Formulae (II) and (III).

21. The method of claim 12, wherein the coating composition further comprises a coating additive selected from the group consisting of a gel modifier, a hardness modulator, an impact modifier, an antioxidant, an antiozonant, a filler, a binder, a thixotrope, a rheology modifier, a dispersant, a wetting agent, a plasticizer, a pigment, a flame retardant, a dye, fibers, a reinforcement material, a coupling agent, a UV absorber, a UV light stabilizer, a film former, a lubricant, an adhesion promoter and mixtures thereof.

22. The method of claim 12, wherein the inorganic filler is selected from aluminum powder or alloys thereof, aluminum flakes or alloys thereof, micaceous iron oxide, mica, and mixtures thereof.

23. An article of manufacture produced by the method of claim 12.

24. The method of claim 12, wherein the coating applied on the substrate surface is cured at room temperature.

* * * * *